United States Patent
Mizuno et al.

[11] Patent Number: 6,082,197
[45] Date of Patent: Jul. 4, 2000

[54] ACCELERATION SENSOR

[75] Inventors: Jun Mizuno; Kay Nottmeyer, both of Higashi-Matsuyama, Japan

[73] Assignee: Zexel Corporation, Tokyo, Japan

[21] Appl. No.: 08/909,764

[22] Filed: Aug. 12, 1997

Related U.S. Application Data

[62] Division of application No. 08/575,229, Dec. 20, 1995.

[30] Foreign Application Priority Data

Dec. 20, 1994 [JP] Japan .................................. 6-317191
May 12, 1995 [JP] Japan .................................. 7-137413
Sep. 28, 1995 [JP] Japan .................................. 7-273755

[51] Int. Cl.[7] .................................................. G01P 15/08
[52] U.S. Cl. .................................... 73/514.36; 73/514.32
[58] Field of Search ........................... 73/514.02, 514.16, 73/514.18, 514.32, 514.36

[56] References Cited

U.S. PATENT DOCUMENTS

| | | | |
|---|---|---|---|
| 4,736,629 | 4/1988 | Cole | 73/514.36 |
| 5,220,835 | 6/1993 | Stefan | 73/514.36 |
| 5,349,858 | 9/1994 | Yagi et al. | |
| 5,415,040 | 5/1995 | Nottmeyer | 73/514.02 |
| 5,431,050 | 7/1995 | Yamada | 73/514.32 |
| 5,488,864 | 2/1996 | Stephan | 73/514.36 |
| 5,610,335 | 3/1997 | Shaw | 73/514.36 |

FOREIGN PATENT DOCUMENTS

| | | |
|---|---|---|
| 0 274 201 | 7/1988 | European Pat. Off. |
| 0 547 742 | 6/1993 | European Pat. Off. |
| 0 604 212 | 6/1994 | European Pat. Off. |
| 0 623 825 | 11/1994 | European Pat. Off. |
| 40 03 473 | 8/1991 | Germany |

OTHER PUBLICATIONS

Patents Abstracts of Japan, P–1432, Oct. 7, 1992, vol. 16/No. 483.
Patents Abstracts of Japan, P–1737, May 13, 1994, vol. 18/No. 253.
Patents Abstracts of Japan, P–1769, Jul. 13, 1994, vol. 18/No. 373.
Sensors and Actuators A, "Vacuum Packaging for Microsensors by Glass–Silicon Anodic Bonding", 43 (1994), 243–248 (no month).
Sensors and Actuators A, "A Novel Degree of Freedom Separation Technique in a Multi–Axis Accelerometer", 43 (1994), 120–127 (no month).

*Primary Examiner*—Christine K. Oda
*Attorney, Agent, or Firm*—Wenderoth, Lind & Ponack, L.L.P.

[57] ABSTRACT

In the sensor: torsion beams 7a, 7b are fixedly connected between the centers of opposite outer sides of central fixed board 1 and the corresponding centers of opposite inner sides of a window 5; electrodes 11a, 11b, 12a, 12b are mounted on a front and a rear surface of weight portions 9a, 9b; and, an outer cover 21, which is constructed of an upper and a lower board 17, 19 provided with electrodes 23a, 23b, 25a, 25b corresponding to the electrodes of the weight portions, is mounted on a side surface of an outer frame 15 in which both the central fixed board 1 and the weight board 3 are received, so that the central fixed board 1 is rotatably supported. It is possible to increase the length of each of the torsion beams 7a, 7b. These electrodes 11a, 11b, 12a, 12b may be produced through a single path in printing process.

6 Claims, 27 Drawing Sheets

(a)

(b)

ACCELERATION SENSOR

This application is a divisional of now abandoned application Ser. No. 08/575,229, filed Dec. 20, 1995.

BACKGROUND OF THE INVENTION

1. Field of the Invention

The present invention relates to an acceleration sensor used in a moving object such as vehicles and the like, and more particularly to an acceleration sensor capable of detecting the linear acceleration of the moving object based on variations in capacitance of a capacitor mounted on the moving body, and also to a multi-axis acceleration sensor capable of detecting the linear acceleration of the moving object in a plurality of directions and the angular velocity of the moving object, and further relates to the method of producing the acceleration sensors.

2. Description of the Prior Art

In recent years, in order to improve automobiles in safety and in amenity in their driving operation, there are provided various types of control systems such as active suspension systems, air-bag systems, anti-skid brake systems and the like. For these systems, the linear acceleration and the angular velocity of the automobiles are indispensable information, and, therefore detected by the use of acceleration sensors mounted on the automobiles.

Of these acceleration sensors, for example, one disclosed in Japanese Patent Laid-Open No. Hei 4-252961 is of a capacitor type constructed of a weight and a board member oppositely disposed from the weight. In operation, this one calculates variations in capacitance of the thus constructed capacitor to determine both the angular acceleration and the linear acceleration of the automobile. Disclosed in this Japanese Patent Laid-Open No. Hei 4-252961 are: an acceleration sensor permitting a weight to be displaced about the X axis or the Y axis; and, an acceleration sensor permitting the weight to be displaced about both the X and the Y axis.

Of these acceleration sensors, the former one is constructed of a flat rectangular weight and a frame-like base board (i.e., board member), the rectangular weight having a center or intermediate point of each of its opposite long sides supported by the frame-like base board through a supporting beam. In the acceleration sensor: the weight is slightly thinner than the base board; the supporting beam axially symmetrically supports the weight so as to permit the weight to be rotated to a limited extent on its center; in each of a front and a rear surface of the weight, there are provided a pair of fixed electrodes, the fixed electrodes being spaced apart from each other at predetermined intervals; and, disposed in each of a front and a rear surface of the frame-like base board is a plate of glass (i.e., glass plate), provided inside which glass plate are additional fixed electrodes corresponding in position to the above fixed electrodes, so that four capacitors in total are constructed of these fixed electrodes thus oppositely disposed from each other. In operation, when the weight is displaced about the X axis or the Y axis, the capacitors vary in capacitance. Such variations in capacitance of the capacitors are calculated to determine the angular acceleration and the linear acceleration of the moving object.

On the other hand, in the latter one of the acceleration sensors: a first through-hole is formed in a central portion of the frame-like base plate assuming a rectangular shape; a first frame-like weight, which is thinner than the base board, is disposed in the base board so as to be supported by the base board through a first supporting beam, which beam extends in a direction parallel to the Y axis passing through the center of gravity of the weight; a second flat weight, which assumes a rectangular shape extending in a direction parallel to the Y axis, is disposed in a second central through-hole of the first weight; and, the second weight is supported by the first weight through a second supporting beam, which beam extends in a direction parallel to the X axis passing through the center of gravity of the second weight. The first weight is capable of rotating on the Y axis (i.e., on the first supporting beam) to a limited extent relative to the base board, and has its long portion serve as a weight which is longer than the second through-hole in a direction parallel to the X axis. The second weight is capable of rotating on the X axis (i.e., on the second supporting beam) to a limited extent relative to the first weight. In each of the front and the rear surface of each of the first and the second weight, there are provided a pair of fixed electrodes, the fixed electrodes being spaced apart from each other at predetermined intervals. In each of the inner surfaces of the glass plates disposed in each of the front and rear side of the frame-like base plate, there are provided a plurality of additional fixed electrodes which are oppositely disposed from the above corresponding fixed electrodes to form six capacitors in total therebetween. When the first weight is displaced about the Y axis and the second weight is displaced about the X axis to produce a resultant displacement, each of the above capacitors vary in capacitance according to such resultant displacement. Consequently, it is possible to determine the angular acceleration and the linear acceleration of the moving body by calculating thus obtained variations in capacitance of these capacitors.

In the former one of the conventional acceleration sensors, the supporting beam is provided in the side surface of the weight so as to extend outward (i.e., toward the base board). Consequently, it is necessary for the former one to provide some space outside the side surface of the weight so as to receive the supporting beam therein, which makes it difficult to reduce the former one in size. When the supporting beam is reduced in length in order to realize the down-sizing of the former one, the thus shortened supporting beam is poor in fatigue strength, and, therefore is susceptible to cracks and fractures when the weight is displaced to stress the supporting beam.

On the other hand, in the latter one of the conventional acceleration sensors, there are provided the electrodes, which ones are formed in each of the first and the second weight separately. Consequently, in case that the electrodes are formed by the use of graphic arts, it is necessary for the electrodes to be formed in each of the first and the second weight separately, which complicates the manufacturing process of the electrodes. Further, since each of the electrodes requires its own wiring, the arrangement of such wiring is also complicated.

Still further, in the latter one of the conventional acceleration sensors: the first and the second weight are disposed in an inner and an outer position, respectively; these weights are different in size, and provided with the electrodes separately to form the capacitors therebetween: the first and the second weight are different in moment energy due to the difference in size therebetween; whereby, even when the first and the second weight are displaced with the same angular acceleration about the X axis and the Y axis, some errors are produced in variations of the capacities of the capacitors constructed of the electrodes. Consequently, as for the latter one of the conventional acceleration sensors, in order to realize a precision acceleration sensor, it is necessary in practice to additionally provide some measures for compensating for such errors in angular acceleration due to the difference in moment energy between the first and the second weight, the measures comprising: a proper redesigning of the supporting beam (i.e., by adjusting the supporting beam in diameter and like parameters to compensate for the errors); and, a suitable measurement circuit for compensating for the errors. However, such additional provision of the measures increases the manufacturing cost.

On the other hand, for example, in Japanese Patent Laid-Open No. Hei 4-252961, there is disclosed an acceleration sensor in which: a board-like weight made of electrically-conductive material is provided with an axle and mounted in the sensor so as to be rotatable on the axle; a fixed electrode is provided so as to be oppositely disposed from the weight, so that a capacitor is constructed of the weight and the fixed electrode; whereby, when the sensor is subjected to a linear acceleration, the weight rotates on its axle to cause the capacitor to vary in capacitance, the variation in capacitance of the capacitor being measured to determine the linear acceleration.

Another conventional acceleration sensor is disclosed in Japanese Patent Laid-Open No. Hei 5-256841, in which: a movable electrode is supported by a cantilever, and disposed between a pair of fixed electrodes to form a pair of capacitors therebetween. When the sensor is subjected to a linear acceleration, the movable electrode is displaced so that the capacitors vary in capacitance, whereby the linear acceleration is determined based on such variations in capacitance of the capacitors.

Three-dimensional movement of the moving object is represented by coordinates (i.e., of x, y and z positions) of the moving object in the three-dimensional space and angular velocities in rotational movement (i.e., pitching, yawing, rolling) of the moving object. In the above-mentioned various control systems of the automobiles, it is desirable to use all the above-mentioned parameters.

For example, in the above-mentioned active suspension system and the anti-skid brake system, both the linear acceleration and the angular acceleration are required.

Consequently, as for the acceleration sensor mounted on the automobile, it is desirable to use a single acceleration sensor which is capable of detecting the angular acceleration and the linear acceleration in each of a plurality of directions.

However, any of the above-mentioned conventional acceleration sensors is capable of detecting the linear acceleration in only one direction together with the angular acceleration. Consequently, when it is necessary to determine the angular acceleration and the linear acceleration of the moving object in three directions (i.e., in directions parallel to the X, Y and the Z axis) in the three-dimensional space, both a linear acceleration sensor and an angular acceleration sensor are required as to each of the directions, which makes the conventional acceleration sensor very disadvantageous from the economical point of view. Further, this increases the number of components of the conventional acceleration sensor, which makes the sensor poor in reliability.

SUMMARY OF THE INVENTION

It is an object of the present invention to provide an acceleration sensor which may be down-sized as a whole in an easy manner while preventing a supporting beam (i.e., torsion beam) thereof from failing.

It is another object of the present invention to provide an acceleration sensor in which: a plurality of electrodes forming a plurality of capacitors are produced in an easy manner; and, the sensor's wiring is simplified.

It is another object of the present invention to provide an acceleration sensor in which: both the angular acceleration and the linear acceleration of a moving object are precisely detected at low cost.

It is another object of the present invention to provide an acceleration sensor which is simple in construction and is capable of detecting both the linear acceleration in each of a plurality of directions and the angular velocity of the moving object.

It is another object of the present invention to provide an acceleration sensor which is capable of being micromachined and produced on a large-scale basis.

It is another object of the present invention to provide an acceleration sensor which is capable of detecting the linear acceleration in each of the greatest possible number of directions together with the angular acceleration thereof.

It is another object of the present invention to provide a method of producing an acceleration sensor which is improved in quality and yield in production.

It is another object of the present invention to provide an acceleration sensor which is capable of saving its installation space while providing a sufficient mounting area for its electrodes, the sensor being capable of detecting variations in capacitance of its capacitor and being excellent in sensitivity.

The above object of the present invention are accomplished by providing:

An acceleration sensor comprising:

a torsion beam outwardly extending from a center of each of opposite sides of a central fixed board so as to extend in a direction parallel to the X or the Y axis;

a weight board provided with a central window for receiving the central fixed board therein, a center of each of opposite inner sides of the central window being connected with a front end of the torsion beam to permit the weight board to rotate about a longitudinal axis of the torsion beam, i.e., to be displaced in a direction parallel to the Z axis so as to stress the torsion beam;

an outer cover for supporting the central fixed board, the outer cover being constructed of an upper and a lower board which are oppositely disposed from a front and a rear surface of the weight board, respectively;

a first electrode fixedly mounted on each of the front and the rear surface of the weight board;

a second electrode fixedly mounted on an inner surface of each of the upper and the lower board so as to be oppositely disposed from the first electrode mounted on the weight board, the second electrode being close to and oppositely disposed from the first electrode to form a capacitor therebetween, an output of which capacitor is calculated to determine both of angular acceleration on a longitudinal axis of the torsion beam and linear acceleration in a direction parallel to the Z axis; and the torsion beam being thin in width and having the substantially same thickness as that of the weight board.

In the acceleration sensor of the present invention having the above construction, according to the amount of angular acceleration or linear acceleration applied to the acceleration sensor, the weight board rotates on a longitudinal axis (i.e., on the X or the Y axis) of the torsion beam through the torsion beam, i.e., is displaced in a direction parallel to the Z axis through the torsion beam. Since the torsion beam is disposed between the central fixed board (which is disposed in a central portion of the central window of the weight board) and the inner surface of the central window of the weight board, it is possible to increase the entire length of the torsion beam when the central fixed board is reduced in height as viewed in FIG. 1, which improves the torsion beam in fatigue strength during its torsional operation. Particularly, since the torsion beam has the substantially same thickness as that of the weight board, the torsion beam is easily twisted when subjected to the moment energy of the weight board, and, therefore sufficiently improved in fatigue strength. On the other hand, the weight board is not provided with any additional component in its outer periphery, which makes it possible to down-size the acceleration sensor as a whole.

DESCRIPTION OF THE PREFERRED EMBODIMENTS

Hereinbelow, the present invention will be described in detail with reference to the accompanying drawings.

Now, a first aspect of the present invention will be described with reference to FIGS. 1 to 14.

Figure 1:
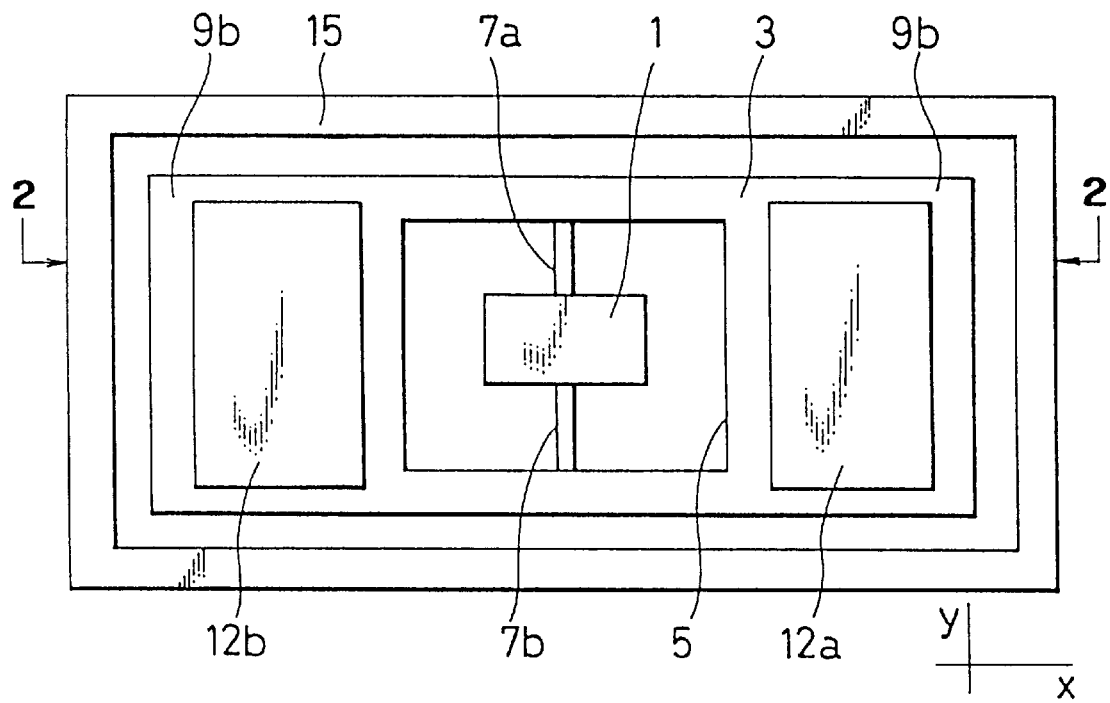
FIG. 1 is a plan view of an essential part of a first embodiment of the acceleration sensor according to a first aspect of the present invention.
Figure 2:
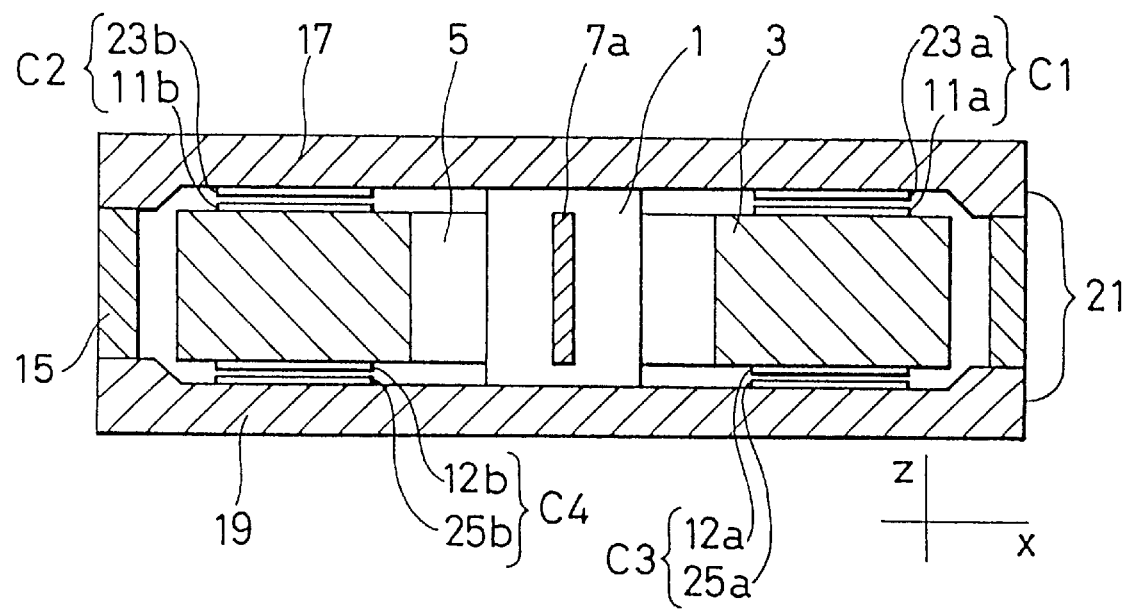
FIG. 2 is a cross-sectional view of the essential part of the acceleration sensor of the present invention, taken along the line A—A of FIG. 1.

FIG. 1 shows an essential inner part of a first embodiment of an acceleration sensor according to the first aspect of the present invention. FIG. 2 shows a cross-sectional view of the acceleration sensor, taken along the line A—A of FIG. 1. As shown in FIGS. 1 and 2, a central fixed board 1 is disposed in a central area of the acceleration sensor of the present invention. The fixed board 1 has a sufficient width along the X axis, is narrow in height as viewed in FIG. 1 (the width is measured in the Y axis), and is slightly larger in thickness than a weight board 3 (the thickness is measured in the Z axis) to permit a capacitor to be formed outside the weight board 3, the capacitor being perpendicular to the Z axis. Fixedly and integrally mounted on a center of each of opposite outer sides of the central fixed board 1 is an end portion of each of a pair of torsion beams 7a, 7b which extend in a direction parallel to the Y axis. In order to down-size the acceleration sensor of the present invention, it is desirable for the central fixed board 1 to have a sufficient rigidity and is sufficiently narrow in height as viewed in FIG. 1 (the height is measured in the Y axis).

The weight board 3 is provided with a window 5 in its central portion for receiving the central fixed board 1 therein. the other end portion of each of the torsion beams 7a, 7b is fixedly and integrally connected with a center of each of opposite inner sides of the window 5, the opposite sides being perpendicular to the Y axis. Consequently, fixedly and integrally connected through the torsion beams 7a, 7b are: the centers of the opposite outer sides of the central fixed board 1, the opposite outer sides being perpendicular to the Y axis; and, the centers of the opposite inner sides of the window 5 of the weight board 3, the opposite inner sides being perpendicular to the Y axis. Each of the torsion beams 7a, 7b is narrow in width (the width being measured in the X axis) while having the substantially same thickness as that of the weight board 3 (the thickness being measured in the Z axis). As a result, the torsion beams 7a, 7b has a sufficient resiliency about the Y axis, and, therefore is excellent in sensitivity to angular acceleration. On the other hand, the weight board 3 is provided with a pair of weight portions 9a, 9b in its opposite side portions adjacent to the window 5, the weight portions 9a, 9b being aligned in the X axis. The weight portion 9a has its opposite surfaces provided with a pair of electrodes 11a, 12a, the opposite surfaces being perpendicular to the Z axis. On the other hand, the weight portion 9b has its opposite surface provided with a pair of electrodes 11b, 12b, the opposite surfaces being perpendicular to the Z axis.

Incidentally, as for the central fixed board 1, weight board 3 and the torsion beams 7a, 7b, it is possible to integrally produce these components 1, 3, 7a, 7b at once from a single piece of board by using anisotropic etching techniques.

An outer frame 15 is disposed outside the weight board 3 to surround the same, and has the substantially same thickness as that of the weight board 3, the thickness being measured in the Z axis. Disposed in positions adjacent to opposite sides of the outer frame 15 are an upper board 17 and a lower board 19, the opposite sides being perpendicular to the Z axis. An outer cover 21 is constructed of these boards 17, 19. Each of the boards 17, 19 assumes a flat shape provided with an inner concave portion. Fixedly mounted on a bottom surface of each of the inner concave portions of the boards 17, 19 are additional electrodes 23a, 25a and 23b, 25b. The pair of the electrodes 23a and 25a correspond to the electrodes 11a and 12a of the weight portion 9a of the weight board 3, respectively. On the other hand, the other pair of the electrodes 23b and 25b correspond to the electrodes 11b and 12b of the other weight portion 9b of the weight board 3, respectively. As a result: a capacitor C1 is constructed of the electrodes 11a, 23a; a capacitor C2 is constructed of the electrodes 11b, 23b; a capacitor C3 is constructed of the electrodes 12a, 25a; and, a capacitor C4 is constructed of the electrodes 12b, 25b. A standard gap of each of the capacitors C1, C2, C3 and C4 is dependent on a depth between the bottom surfaces of the inner concave portions of the upper board 17 and the lower board 19. Incidentally, as is clear from FIG. 2, when the outer frame 15 has the same thickness as that of the central fixed board 1, it is possible to omit the provision of the inner concave portions in the upper and the lower board 17, 19. As for wiring to measurement circuits (not shown), for example, a predetermined number of through-holes may be formed in the upper board 17 or the lower board 19 to access the electrodes 23a, 23b or the electrodes 25a, 25b.

As shown in FIG. 2, the outer frame 15 is fixedly sandwiched between the upper board 17 and the lower board 19 so that the capacitors C1, C2, C3 and C4 are formed therebetween. At the same time, the central fixed board 1 is also fixedly sandwiched between the opposite concave portions of these boards 17, 19.

In operation, for example, when the acceleration sensor of the present invention is subjected to an angular acceleration about a longitudinal axis of the torsion beams 7a, 7b parallel to the Y axis, the weight board 3 rotates to an angular position on the longitudinal axis of the torsion beams 7a, 7b to twist these beams 7a, 7b against the resilient torsional resistance of the beams 7a, 7b, the angular position at which the weight board 3 stops its rotation corresponds to the moment energy of the weight board 3 having been subjected to the angular acceleration about the longitudinal axis of the torsion beams 7a, 7b. For example, at this time, when the gaps of the capacitors C1, C4 increase (i.e., when the capacitors C1, C4 decrease in capacitance), the gaps of the capacitors C2, C3 decrease (i.e., the capacitors C2, C3 increase in capacitance). On the other hand, when the weight board 3 rotates in the opposite direction from its neutral position, the opposite action takes place, i.e., the capacitors C1, C4 increase in capacitance and the capacitors C2, C3 decrease in capacitance. In the measurement circuits, variations in capacitance of the capacitors C1, C4 and C2, C3 are measured so that both the inclination of the weight board 3 and the inclination direction thereof are calculated, whereby the angular acceleration of the acceleration sensor of the present invention is calculated.

In the above embodiment of the present invention: the weight board 3 is provided with the window 5 in its central portion; the central fixed board 1 is disposed in a central area of the window 5; and, the torsion beams are fixedly and integrally mounted between the centers of the opposite inner surfaces of the window 5 of the weight board 3 and the corresponding centers of the opposite sides of the central fixed board 1. Consequently, when the central fixed board 1 is reduced in height as viewed in FIG. 1 so as to down-size the acceleration sensor as a whole, it is possible to increase the entire length (i.e., height as viewed in FIG. 1) of each of the torsion beams 7a, 7b in contrast with those of the conventional acceleration sensor in which the torsion beams are disposed outside the weight board. The torsion beams 7a, 7b thus increased in length are improved in fatigue strength during their twisting operation, which improves the acceleration sensor of the present invention in quality and reliability.

In the embodiment of the present invention, since it is possible to increase the entire length of each of the torsion beams 7a, 7b even when a distance between the outer peripheral surface of the weight board 3 and the corresponding inner peripheral surface of the outer frame 15 is defined to be as small as possible, it is possible to improve the acceleration sensor in sensitivity to the torsional operation of the torsion beams 7a, 7b, which makes it possible to down-size the acceleration sensor excellent in sensitivity.

Figure 3:
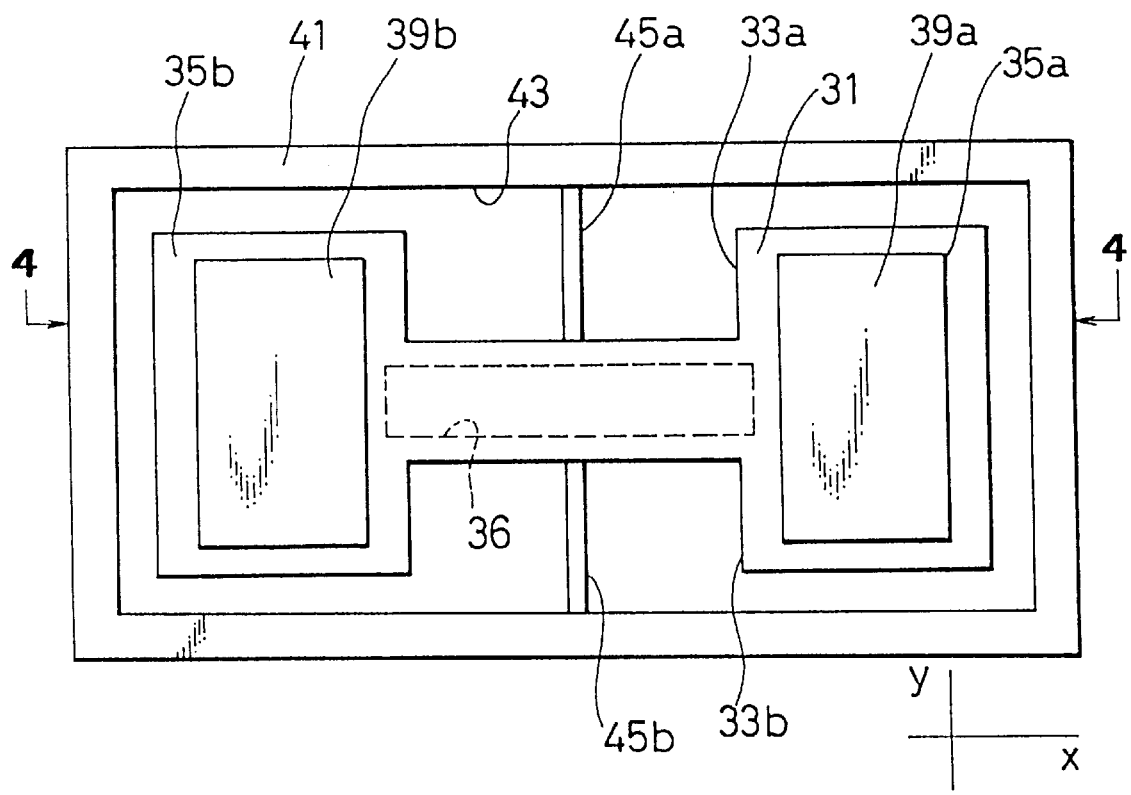
FIG. 3 is a a plan view of an essential part of a second embodiment of the acceleration sensor according to the first aspect of the present invention.
Figure 4:
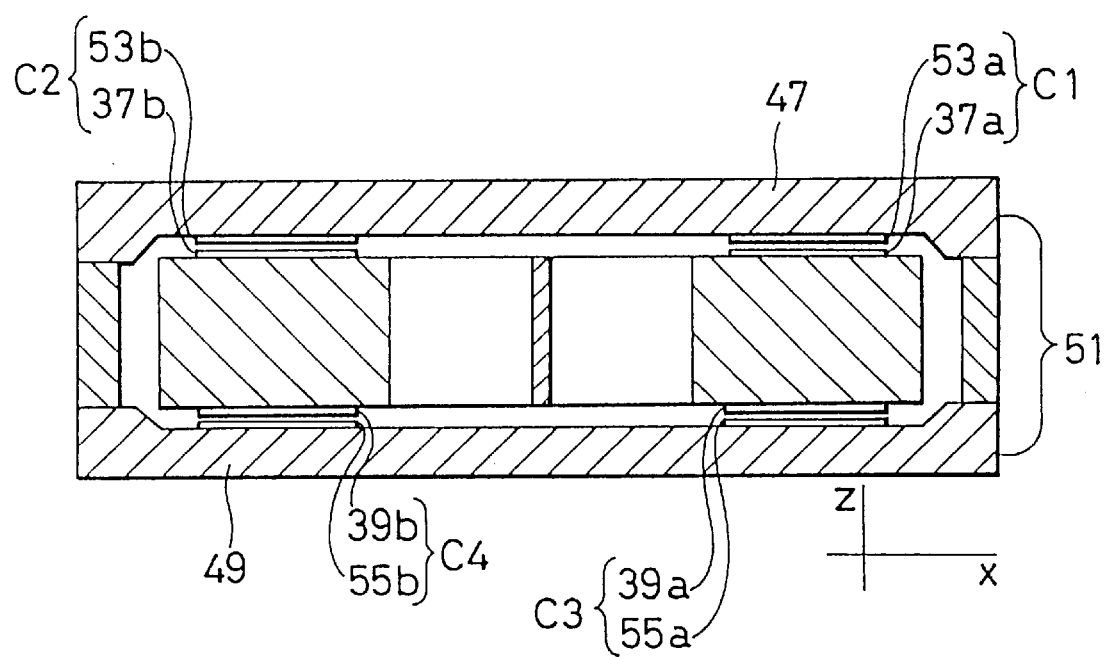
FIG. 4 is a cross-sectional view of the essential part of the acceleration sensor of the present invention, taken along the line A—A of FIG. 3.

FIG. 3 shows an essential part of a second embodiment of the acceleration sensor according to a first aspect of the present invention, and FIG. 4 shows a cross-sectional view of the acceleration sensor, taken along the line A—A of FIG. 3. The second embodiment will be described with reference to FIGS. 3 and 4, in which the weight board 31 is provided with a pair of opposite notch portions 33a, 33b in its central portion, the bottoms of the notch portions 33a, 33b being perpendicular to the Y axis. A center of each of the bottom of the notch portions 33a, 33b are fixedly connected with an end of each of the torsion beams 45a, 45b (described later). Integrally formed in positions adjacent to opposite sides of the notch portions 33a, 33b are a pair of the weight portions 35a, 35b which are aligned in the X axis, as shown in FIG. 3. A pair of the electrodes 37a, 39a are fixedly mounted on opposite sides of the weight portion 35a, the opposite sides being perpendicular to the Z axis. On the other hand, another pair of the electrodes 37b, 39b are fixedly mounted on opposite sides of the weight portion 35b, the opposite sides being perpendicular to the Z axis. Incidentally, in order to reduce in weight the acceleration sensor, it is also possible to form a through-hole in the central portion of the weight board 31, the through-hole being shown in dotted line in FIG. 3. The reduction in weight of the weight board 31 improves the acceleration sensor in responsibility to the twisting operation of the weight board 31.

The weight board 31 is disposed inside the the outer fixed frame 41. Formed in a central portion of the outer fixed frame 41 is the window 43 for receiving the weight board 31 therein. A center of each of opposite inner sides or surfaces of the window 43 is fixedly connected with the other end of each of the torsion beams 45a, 45b, the opposite inner sides or surfaces being perpendicular to the Y axis. Namely, the torsion beams 45a, 45b have their opposite ends fixedly connected or bonded to both the centers of the bottom surfaces of the notch portions 33a, 33b of the weight board 31 and the centers of the opposite inner sides or surfaces of the window 43 of the outer fixed frame 41. As is clear from FIG. 3, each of the torsion beams 45a, 45b is narrow in width (the width being measured in the X axis), while having the substantially same thickness as that of the weight board 31 (the thickness being measured in Z axis), as shown in FIG. 4. Consequently, the torsion beams 45a, 45b are excellent in resiliency during the twisting operation thereof and improved in sensitivity to the angular acceleration of the sensor.

Incidentally, it is possible to integrally produce the weight board 31, torsion beams 45a, 45b and the outer fixed frame 41 from a single board at once by using anisotropic etching techniques.

As shown in FIG. 4, the outer fixed frame 41 is fixedly sandwiched between the upper board 47 and the lower board 49. The outer cover 51 is constructed of these boards 47, 49. Each of the boards 47, 49 assumes a flat plate-like shape and is provided with the concave portion in its inner surface. A pair of electrodes 53a and 53b are fixedly mounted on the bottom of the concave portion of the upper board 47 to correspond to the electrodes 37a and 37b of the weight board 31, respectively. On the other hand, another pair of electrodes 55a and 55b are fixedly mounted on the bottom of the concave portion of the lower board 49 to correspond to the electrodes 39a and 39b of the weight board 32, respectively. As a result, the electrodes 37a, 53a forms the capacitor C1. The electrodes 37b, 53b forms the capacitor C2. The electrodes 39a, 55a forms the capacitor C3. The electrodes 39b, 55b forms the capacitor C4. A standard value of the gap in each of the capacitors C1, C2, C3 and C4 is dependent on a distance between the bottoms of the concave portions of the upper board 47 and the lower board 49. Incidentally, as is clear from FIG. 4, in case that the outer fixed fame 41 has at least the same thickness as that of the weight board 31, it is possible to omit the provision of the concave portion in each of the upper and the lower board 47, 49. As for wiring to the measurement circuits (not shown), a predetermined through-holes are formed in positions corresponding to those of the electrodes 53a, 53b, 55a, 55b of the upper and the lower board 47, 49 to permit the wiring to access these electrodes.

In operation, for example, when the acceleration sensor of the present invention is subjected to an angular acceleration about the longitudinal axis of the torsion beams 45a, 45b, the weight board 31 rotates about the longitudinal axis of the torsion beams 45a, 45b parallel to the Y axis to twist the beams 45a, 45b against their resiliency, so that the weight board stops at an angular position in which the moment energy of the weight board 31 balances the resilient torsional force exerted by the thus twisted torsion beams 45a, 45b. In this twisting operation of the torsion beams 45a, 45b, when the gap of each of the capacitors C1, C4 increases so that the capacitors C1, C4 decrease in capacitance, the capacitors C2, C3 increase in capacitance while decreasing the gaps thereof. On the other hand, when the weight board 31 rotates in the opposite direction about the longitudinal axis of the torsion beams 45a, 45b, the opposite action takes place. Namely, when the gap of each of the capacitors C1, C4 decreases so that the capacitors C1, C4 increase in capacitance, the capacitors C2, C3 decrease in capacitance while increasing the gaps thereof. In the measurement circuits, variations in capacitance of the capacitors C1, C2, C3, C4 are measured so that the inclination of the weight board 31 and the inclination direction thereof are calculated, whereby the angular acceleration, to which the acceleration sensor of the present invention is subjected, is determined.

As described above, in the embodiment of the present invention: the pair of the notch portions 33a, 33b are formed in the central portion of the weight board 31 so as to be aligned in the Y axis; and, the torsion beams 45a, 45b are integrally and fixedly mounted between the centers of the bottoms of these concave portions 33a, 33b and the centers of the opposite inner sides of the outer fixed frame 41. Consequently, when the depth of each of the concave portions 33a, 33b is increased to down-size the acceleration sensor as a whole, it is possible to increase the length of each of the torsion beams 45a, 45b in contrast with the case of the conventional acceleration sensor in which the torsion beams are disposed outside the weight board. Due to the above construction of the present invention, the torsion beams 45a, 45b are improved in fatigue strength during the twisting operation thereof, which improves the acceleration sensor of the present invention in quality and reliability.

Further, in the embodiment of the present invention having the above construction, since it is possible to increase the entire length of each of the torsion beams 45a, 45b even when a distance between the outer peripheral surface of the weight board 31 and the inner peripheral surface of the outer fixed frame 41 is not increased, it is possible to improve the acceleration sensor in sensitivity to the twisting operation of the torsion beams 45a, 45b, which makes it possible to down-size the acceleration sensor excellent in sensitivity.

Figure 5:
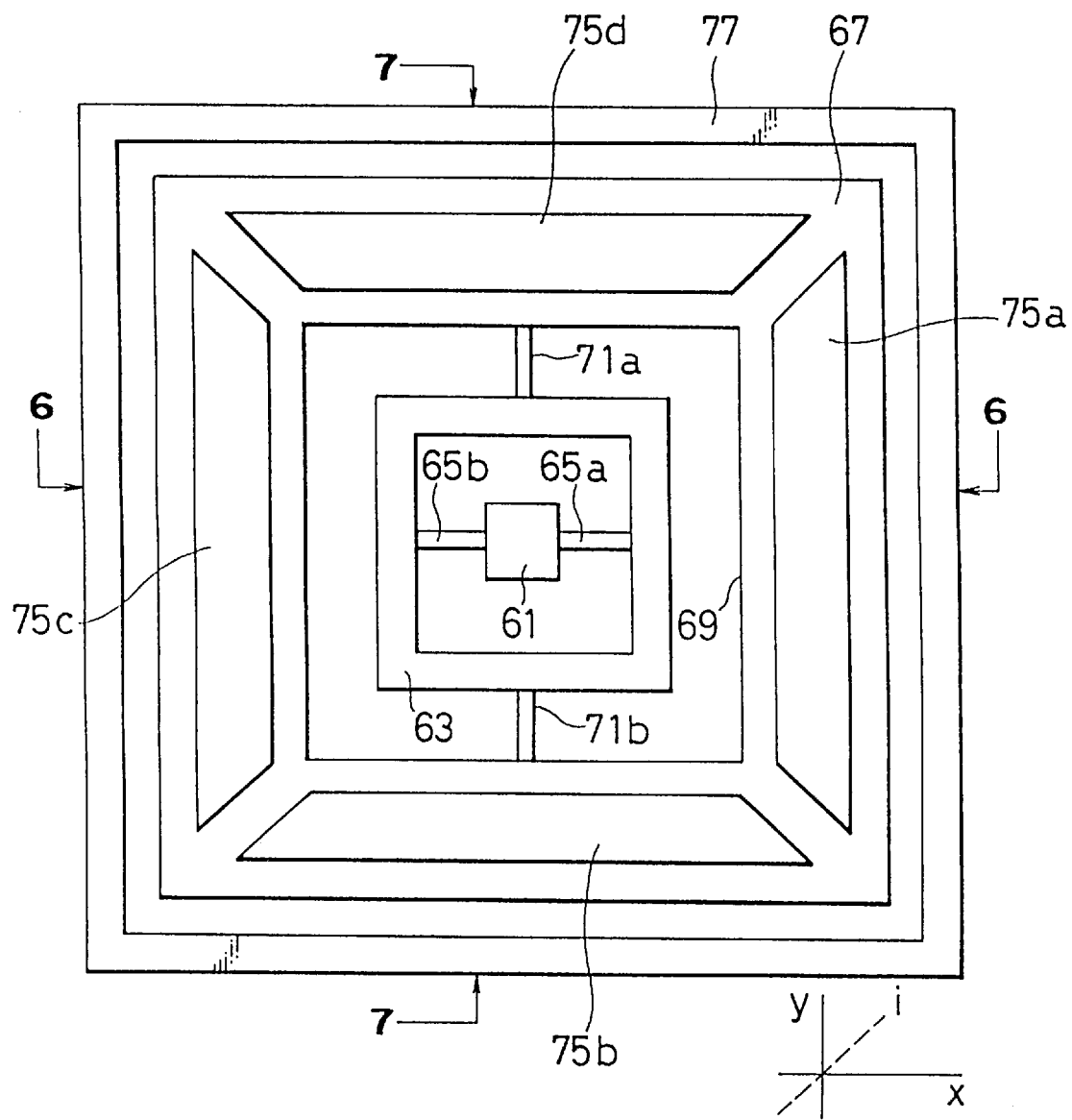
FIG. 5 is a plan view of an essential part of a third embodiment of the acceleration sensor according to the first aspect of the the present invention.
Figure 6:
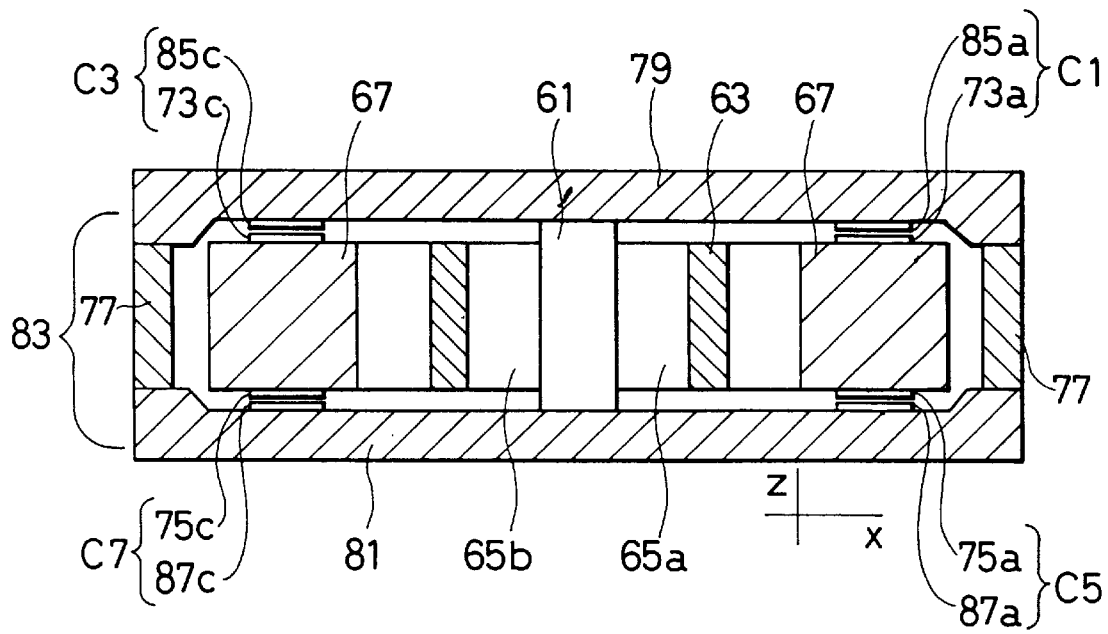
FIG. 6 is a cross-sectional view of the essential part of the acceleration sensor of the present invention, taken along the line A—A of FIG. 5.
Figure 7:
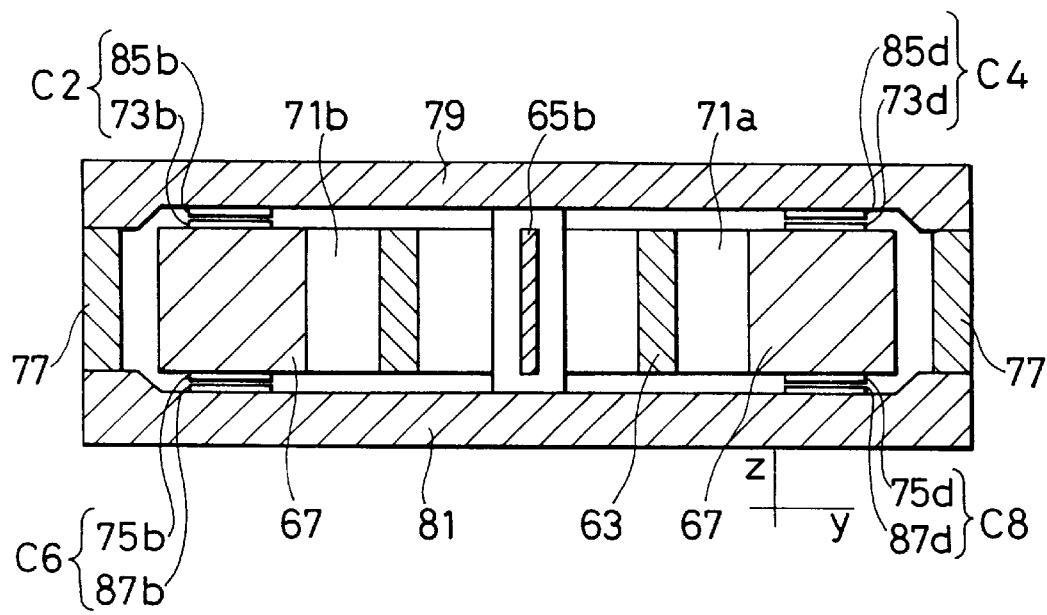
FIG. 7 is a cross-sectional view of the essential part of the acceleration sensor of the present invention, taken along the line B—B of FIG. 5.

FIG. 5 shows a third embodiment of the acceleration sensor according to the first aspect of the present invention. FIG. 6 shows a cross-sectional view of the acceleration sensor, taken along the line A—A of FIG. 5. FIG. 7 shows a cross-sectional view of the acceleration sensor, taken along the line B—B of FIG. 5. As shown in these drawings, the central fixed board 61 is disposed in a central area of the acceleration sensor, and assumes a flat plate-like shape being narrow in a direction parallel to each of the X and the Y axis. The central fixed board 61 is slightly larger in thickness than the weight board 67 to permit a plurality of capacitors to be formed outside the weight board 67, the thickness being measured in the Z axis, as shown in FIG. 6. The centers of opposite sides of the central fixed board 61 are fixedly and integrally connected to bonded to the ends of the torsion beams 65a, 65b, the opposite sides being perpendicular to the X axis. In order to down-size the acceleration sensor of the present invention, preferably, the central fixed board 61 has a sufficient rigidity and is narrow in a direction parallel to each of the X and the Y axis.

An additional frame 63 is disposed outside the central fixed board 61. The additional frame 63 is slightly smaller in thickness than that of the central fixed board 61 to provide the standard value of the gap for each of the capacitors, the thickness being measured in the Z axis. The centers of opposite inner sides of the additional frame 63 are fixedly and integrally connected or bonded to the ends of a pair of X-axis torsion beams 65a, 65b, the opposite inner sides being perpendicular to the X axis. Consequently, The X-axis torsion beams 65a, 65b have their opposite ends fixedly and integrally connected or bonded to both the centers of the opposite inner sides of the additional frame 63 and the centers of the opposite outer sides of the central fixed board 61, the opposite outer sides being perpendicular to the X axis. Each of the X-axis torsion beams 65a, 65b is narrow in a direction parallel to the Y axis, and has the substantially same thickness as that of the additional frame 63 to provide the standard value of the gap for each of the capacitors formed outside the weight board 67. Consequently, the X-axis torsion beams 65a, 65b is excellent in resiliency during the twisting operation thereof, and, therefore excellent in sensitivity to the angular acceleration. On the other hand, as shown in FIG. 5, the centers of opposite outer sides of the additional frame 63 are fixedly and integrally connected or bonded to the ends of a pair of Y-axis torsion beams 71a, 71b, the opposite outer sides being perpendicular to the Y axis.

The weight board 67 is disposed outside the additional frame 63, and provided with the window 69 for receiving both the central fixed board 61 and the additional frame 63 therein. The centers of opposite inner sides of the window 69 are fixedly and integrally connected or bonded to the other ends of the Y-axis torsion beams 71a, 71b, the opposite inner sides being perpendicular to the Y axis. In other words, the Y-axis torsion beams 71a, 71b are fixedly and integrally connected or bonded to both the centers of the opposite outer sides of the additional frame 63 and the centers of the opposite inner sides of the window 69 of the weight board 67. Each of the Y-axis torsion beams 71a, 71b is narrow in a direction parallel to the X axis, and has the substantially same thickness as that of the additional frame 63 to provide the standard value of the gap for each of the capacitors formed outside weight board 67, so that the Y-axis torsion beams are excellent in resiliency during the twisting operation thereof, which improves the acceleration sensor of the present invention in sensitivity to the angular acceleration.

On the other hand, as is clear from FIG. 5, the weight board 67 assumes a rectangular shape provided with four sides surrounding the window 69, each of which sides forms the weight portion. A plurality of electrodes 73a, 73b, 73c, 73d and 75a, 75b, 75c, 75d are provided in a front and a rear surface of each of these four sides of the weight board 67 so as to be perpendicular to the Z axis, as shown in FIG. 7.

Incidentally, it is possible to integrally produce the central fixed board 61, X-axis torsion beams 65a, 65b, additional frame 63, Y-axis torsion beams 71a, 71b, and the weight board 67 from a single board by using, for example, anisotropic etching techniques. All the X-axis torsion beams 65a, 65b, additional frame 63, Y-axis torsion beams 71a, 71b and the weight board 67 are equal to each other in thickness, the thickness being measured in the Z axis.

Disposed outside the weight board 67 is an outer frame 77 which is fixedly sandwiched between the upper board 79 and the lower board 81, as shown in FIG. 6. The outer cover 83 is constructed of these boards 79, 81. Each of these boards 79, 81 assumes a flat plate-like shape provided with the concave portion in its inner surface.

A pair of electrodes 85a and 85c are fixedly mounted on the bottom of the concave portion of the upper board 79 to correspond to the electrodes 73a and 73c of opposite weight portions of the weight board 67, respectively. These opposite weight portions are perpendicular to the X axis. On the other hand, another pair of electrodes 87a and 87c are fixedly mounted on the bottom of the concave portion of the lower board 81 to correspond to the electrodes 75a and 75c of opposite weight portions of the weight board 67, respectively. These opposite weight portions are perpendicular to the X axis. Further another pair of electrodes 85b and 85d are fixedly mounted on the the bottom of the concave portion of the upper board 79 to correspond to the electrodes 73b and 73d of opposite weight portions of the weight board 67, respectively. These opposite weight portions are perpendicular to the Y axis. On the other hand, still further another pair of electrodes 87b and 87d are fixedly mounted on the bottom of the concave portion of the lower board 81 to correspond to the electrodes 75b and 75d of opposite weight portions of the weight board 67, respectively. These opposite weight portions are perpendicular to the Y axis. As a result, the electrodes 73a, 85a forms the capacitor C1. The electrodes 73b, 85b forms the capacitor C2. The electrodes 73c, 85c forms the capacitor C3. The electrodes 73d, 85d forms the capacitor C4. The electrodes 75a, 87a forms the capacitor C5. The electrodes 75d, 87d forms the capacitor C6. The electrodes 75c, 87c forms the capacitor C7. The electrodes 75d, 87d forms the capacitor C8. A standard value of the gap in each of the capacitors C1, C2, C3, C4, C5, C6, C7 and C8 is dependent on a distance between the bottoms of the concave portions of the upper board 79 and the lower board 81, as viewed in FIG. 6. Incidentally, as is clear from FIG. 6, in case that the outer frame 77 is larger in thickness than that of the weight board 67 to have the same thickness as that of the central fixed board 61, it is possible to omit the provision of the concave portion in each of the upper and the lower board 79, 81. As for wiring to the measurement circuits (not shown), a predetermined number of throughholes are formed in positions corresponding to those of the electrodes 85a, 85b, 85c, 85d and 87a, 87b, 87c, 87d of the upper and the lower board 79, 81 to permit the wiring to access these electrodes.

In operation, for example, when the acceleration sensor of the present invention is subjected to an angular acceleration about the longitudinal axis of the X-axis torsion beams 65a, 65b parallel to the X axis, the weight board 67 rotates about the longitudinal axis of the X-axis torsion beams 65a, 65b parallel to the X axis to twist the beams 65a, 65b against their resiliency, so that the weight board 67 stops at an angular position in which the moment energy of the weight board 67 balances the resilient torsional force exerted by the thus twisted X-axis torsion beams 65a, 65b. In this twisting operation of the X-axis torsion beams 65a, 65b, when the gap of each of the capacitors C2, C8 increases so that these capacitors C2, C8 decrease in capacitance, the capacitors C4, C6 increase in capacitance while decreasing the gaps thereof. On the other hand, when the weight board 67 rotates in the opposite direction about the longitudinal axis of the X-axis torsion beams 65a, 65b, the opposite action takes place. Namely, when the gap of each of the capacitors C2, C8 decreases so that the capacitors C2, C8 increase in capacitance, the capacitors C4, C6 decrease in capacitance while increasing the gaps thereof. In the measurement circuits, variations in capacitance of the capacitors C2, C4, C6, C8 are measured so that the inclination of the weight board 67 and the inclination direction thereof are calculated, whereby the angular acceleration about the X axis, to which the acceleration sensor of the present invention is subjected, is determined.

On the other hand, for example, when the acceleration sensor of the present invention is subjected to an angular acceleration about the longitudinal axis of the Y-axis torsion beams 71a, 71b parallel to the Y axis, the weight board 67 rotates about the longitudinal axis of the Y-axis torsion beams 71a, 71b parallel to the Y axis to twist the beams 71a, 71b against their resiliency, so that the weight board 67 stops at an angular position in which the moment energy of the weight board 67 balances the resilient torsional force exerted by the thus twisted Y-axis torsion beams 71a, 71b. In this twisting operation of the Y-axis torsion beams 71a, 71b, when the gap of each of the capacitors C1, C7 increases so that these capacitors C1, C7 decrease in capacitance, the capacitors C3, C5 increase in capacitance while decreasing the gaps thereof. On the other hand, when the weight board 67 rotates in the opposite direction about the longitudinal axis of the Y-axis torsion beams 71a, 71b, the opposite action takes place. Namely, when the gap of each of the capacitors C1, C7 decreases so that the capacitors C1, C7 increase in capacitance, the capacitors C3, C5 decrease in capacitance while increasing the gaps thereof. In the measurement circuits, variations in capacitance of the capacitors C1, C3, C5, C7 are measured so that the inclination of the weight board 67 and the inclination direction thereof are calculated, whereby the angular acceleration about the Y axis, to which the acceleration sensor of the present invention is subjected, is determined.

Further, for example, when the acceleration sensor of the present invention is subjected to an angular acceleration about the i axis (shown in dotted line in FIG. 5, the i axis passing through an intersection point at which the longitudinal axis of the X-axis torsion beams 65a, 65b intersects with the longitudinal axis of the Y-axis torsion beams 71a, 71b, to bisect an angle defined by both the longitudinal axes), the weight board 67 rotates about the i axis to twist these beams 65a, 65b, 71a, 71b against their resiliency, so that the weight board 67 stops at an angular position in which the moment energy of the weight board 67 balances the resultant resilient torsional force exerted by the thus twisted X-axis and the Y-axis torsion beams 65a, 65b, 71a, 71b. In this twisting operation of the X-axis and the Y-axis torsion beams 65a, 65b, 71a, 71b, when the gap of each of the capacitors C1, C2, C7, C8 increases so that these capacitors C1, C2, C7, C8 decrease in capacitance, the capacitors C3, C4, C5, C6 increase in capacitance while decreasing the gaps thereof. On the other hand, when the weight board 67 rotates in the opposite direction about the i axis, the opposite action takes place. Namely, when the gap of each of the capacitors C1, C2, C7, C8 decreases so that the capacitors C1, C2, C7, C8 increase in capacitance, the capacitors C3, C4, C5, C6 decrease in capacitance while increasing the gaps thereof. In the measurement circuits, variations in capacitance of the capacitors C1, C2, C3, C4, C5, C6, C7 are measured so that the inclination of the weight board 67 and the inclination direction thereof are calculated, whereby the angular acceleration about the i axis, to which the acceleration sensor of the present invention is subjected, is determined.

As described above, in the embodiment of the present invention: the additional frame 63 is formed outside the central fixed board 61; provided between these components 61, 63 are the X-axis torsion beams 65a, 65b extending in the X axis; the weight board 67 provided with the window 69 in its central portion for receiving both the above components 61, 63 therein is formed outside the additional frame 63; provided between the weight board 67 and the additional frame 63 are the Y-axis torsion beams 71*a*, 71*b* extending in the Y axis; and, the weight board 67 assumes a suitable shape symmetric about both the longitudinal axes of these torsion beams 65*a*, 65*b*, 71*a*, 71*b*, and is provided with the electrodes 73*a* to 73*d* and 75*a* to 75*d* in its front and rear surfaces. Consequently, in production of each set of the electrodes 73*a* to 73*d* and 75*a* to 75*d* by using printing techniques, it is possible to produce a set of the electrodes 73*a* to 73*d* or a set of the electrodes 75*a* to 75*d* through a single printing path (i.e., a front-surface path for the latter set or a rear-surface path for the former set) in printing process, which makes it possible to simplify the manufacturing process of the acceleration sensor of the present invention. This also makes it possible to simplify the wiring work in production of the acceleration sensor. Further, when the acceleration sensor is subjected to the same amount of angular acceleration about each of the X and the Y axis simultaneously, the moment energy of the weight board 67 about the X axis is substantially equal to that of the weight board 67 about the Y axis. Namely, when the weight board 67 rotates at the same angular acceleration about each of the X and the Y axis simultaneously, it is possible to obtain a precise calculation result without involving any error with respect to each of the X and the Y axis. Consequently, in the acceleration sensor of the present invention, it is possible to omit a measurement circuit for compensating a possible error occurring in measurement of the angular acceleration, which makes it possible to produce a precision acceleration sensor at low cost.

Figure 8:
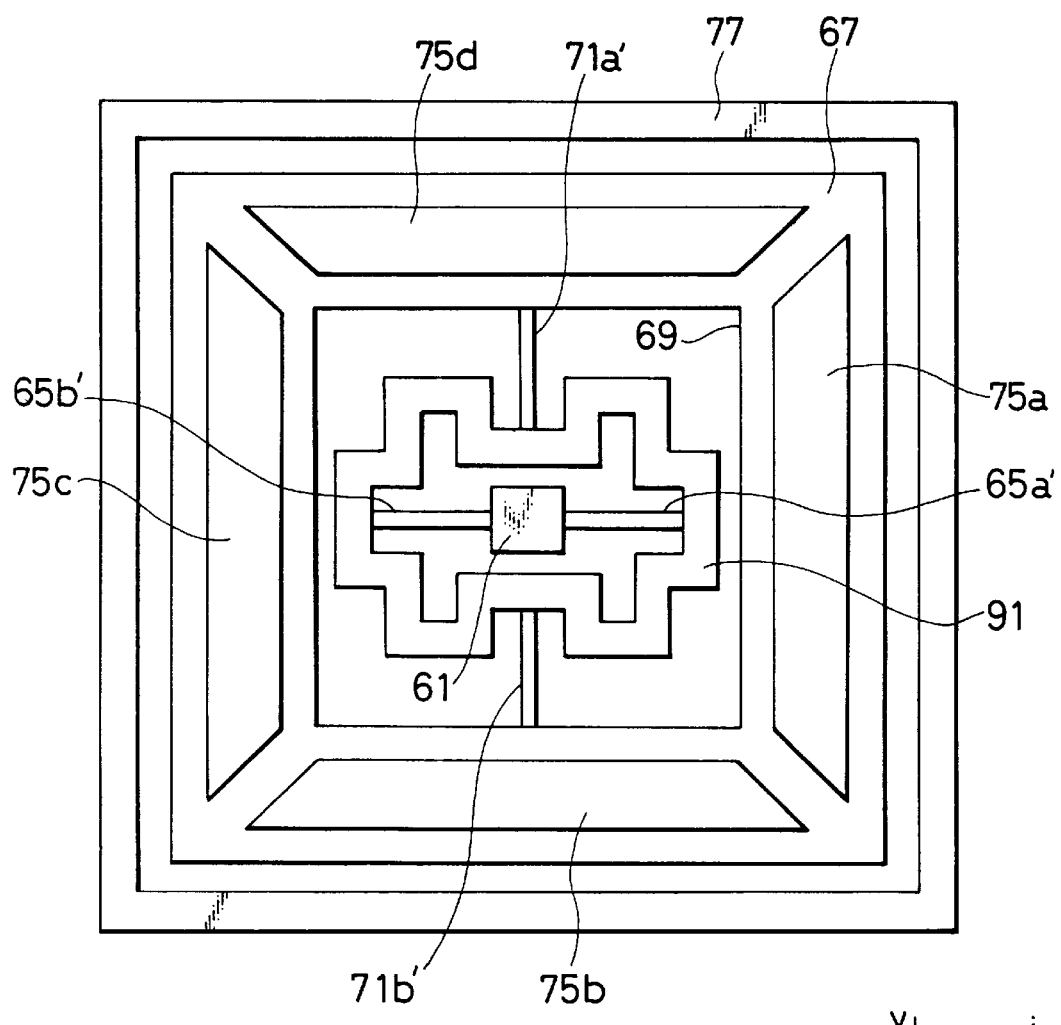
FIG. 8 is a plan view of an essential part of a modification of the third embodiment of the present invention shown in FIG. 5.
Figure 8:
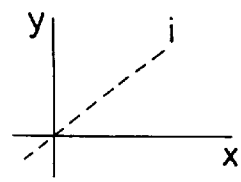

FIG. 8 shows a plan view of an essential part of a modification of the third embodiment of the acceleration sensor shown in FIG. 5. FIG. Incidentally, like reference characters apply to similar parts throughout FIGS. 5 to 8. This modification differs from the third embodiment shown in FIG. 5 in shape of the additional frame and in size or length of both the X-axis and the Y-axis torsion beams. As is clear from FIG. 8, in contrast with the additional frame 63 of the third embodiment shown in FIG. 5, the additional frame 91 of the modification shown in FIG. 8 has each of its opposite sides (which are perpendicular to the X axis) bulged outwardly in the center to increase a distance between an inner surface of the center and the corresponding outer surface of each of opposite sides (which are perpendicular to the X axis) of the central fixed board 61. Consequently, each of the X-axis torsion beams 65*a*' and 65*b*' fixedly and integrally connected or bonded between the central fixed board 61 and the additional frame 91 of the modification is larger in length than each of the X-axis torsion beams 65*a* and 65*b* of the third embodiment shown in FIG. 5, which makes the X-axis torsion beams of the modification more sensitive to the angular acceleration about the X axis and improves these X-axis torsion beams of modification in fatigue strength in their twisting operation. Further, in contrast with the additional frame 63 of the third embodiment shown in FIG. 5, the additional frame 91 of the modification has each of its the other opposite sides (which are perpendicular to the Y axis) bulged inwardly in the center to increase a distance between an outer surface of the center and the corresponding inner surface of opposite sides (which are perpendicular to the Y axis) of the window 69 of the weight board 67. Consequently, each of the Y-axis torsion beams 71*a*' and 71*b*' fixedly and integrally connected or bonded between the inner surfaces of the opposite sides of the window 69 and the corresponding outer surfaces of the centers of the additional frame 91 of the modification is larger in length than each of the Y-axis torsion beams 71*a* and 71*b* of the third embodiment shown in FIG. 5, which makes the Y-axis torsion beams of the modification more sensitive to the angular acceleration about the Y axis and improves these Y-axis torsion beams of modification in fatigue strength in their twisting operation.

Figure 9:
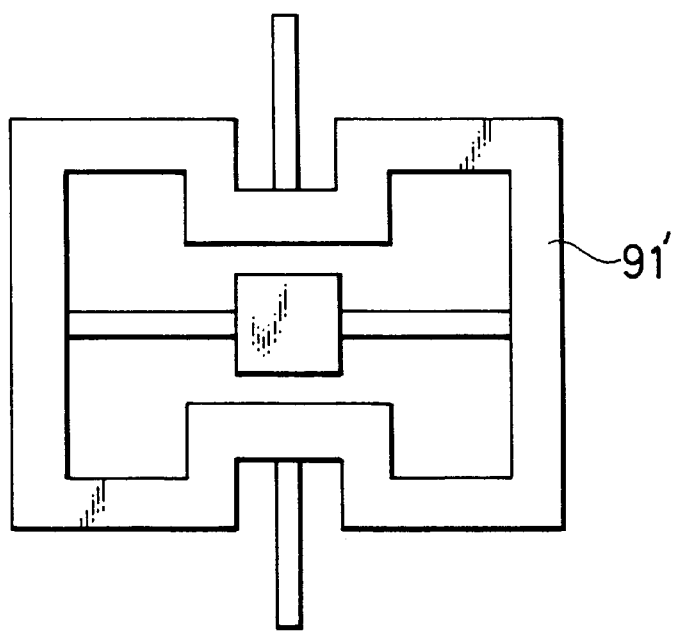
FIG. 9 is is a plan view of an essential part of another modification of the third embodiment of the present invention shown in FIG. 5.
Figure 10:
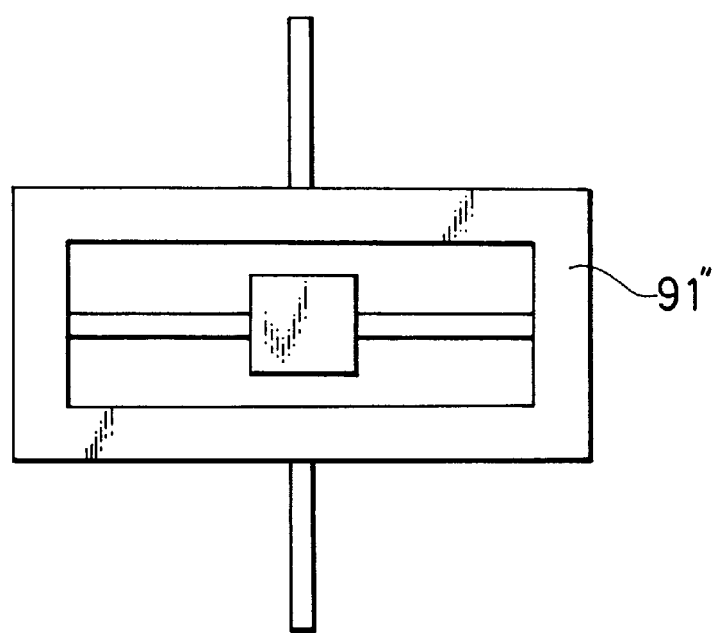
FIG. 10 is a plan view of an essential part of further another modification of the third embodiment of the present invention shown in FIG. 5.

Incidentally, in order to increase the length of each of the X-axis and the Y-axis torsion beams, the additional frame 91 may assume any other suitable shape, for example such as ones shown in FIGS. 9 and 10. Namely, in the one shown in FIG. 9, the additional frame 91' has its opposite X-axis sides (which are perpendicular to the Y axis) be longer than the other opposite Y-axis sides (which are perpendicular to the X axis), and has each of the X-axis sides bulged inwardly in the center. On the other and, in the other one shown in FIG. 10, the additional frame 91" merely has its opposite X-axis sides be longer than the other opposite Y-axis sides. In any one of these modifications, it is also possible to integrally produce the central fixed board 61, X-axis torsion beams 65*a*' and 65*b*', additional frame 91, Y-axis torsion beams 71*a*', 71*b*' and the weight board 67 from a single board.

Figure 11:
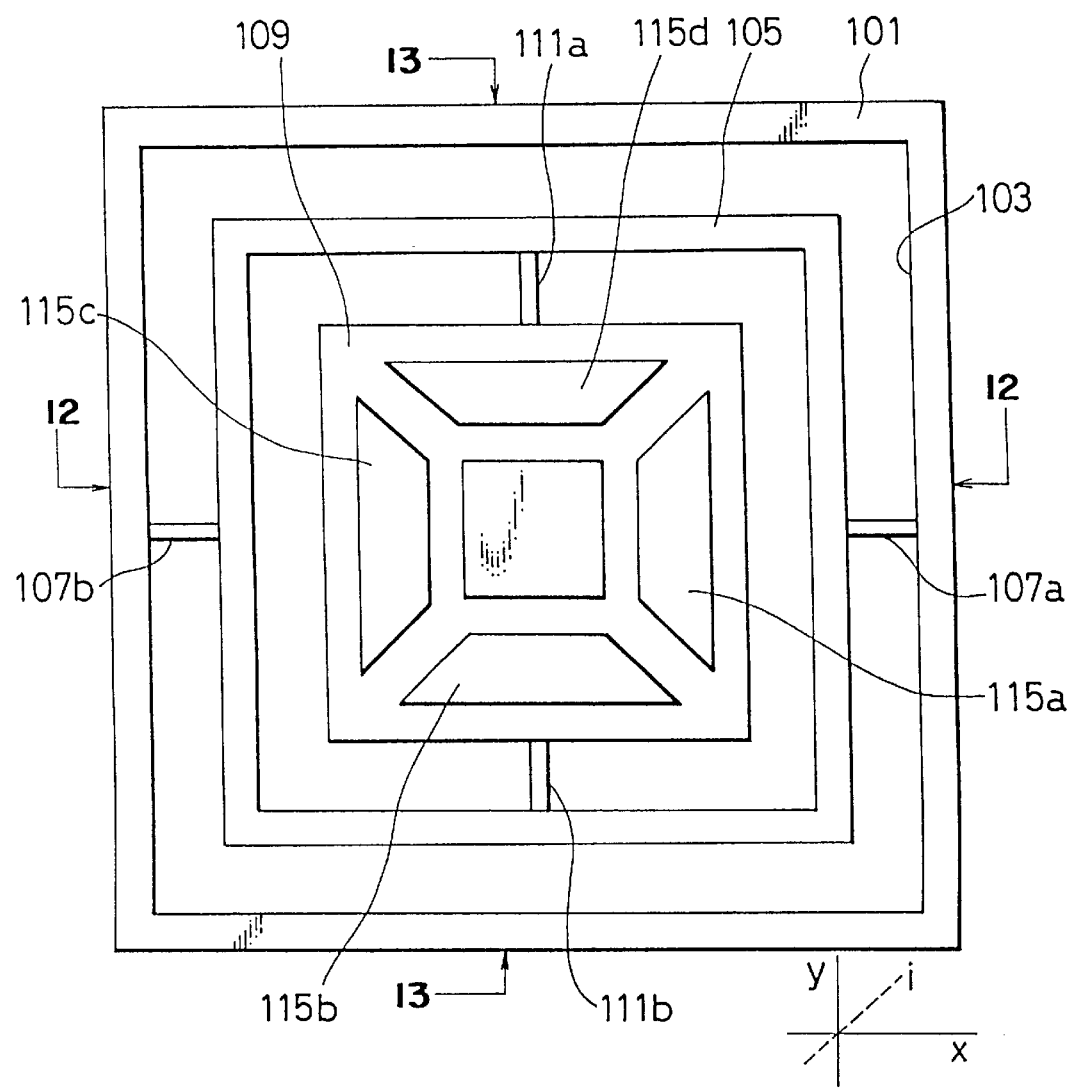
FIG. 11 is a plan view of an essential part of a fourth embodiment of the acceleration sensor according to the first aspect of the present invention.
Figure 12:
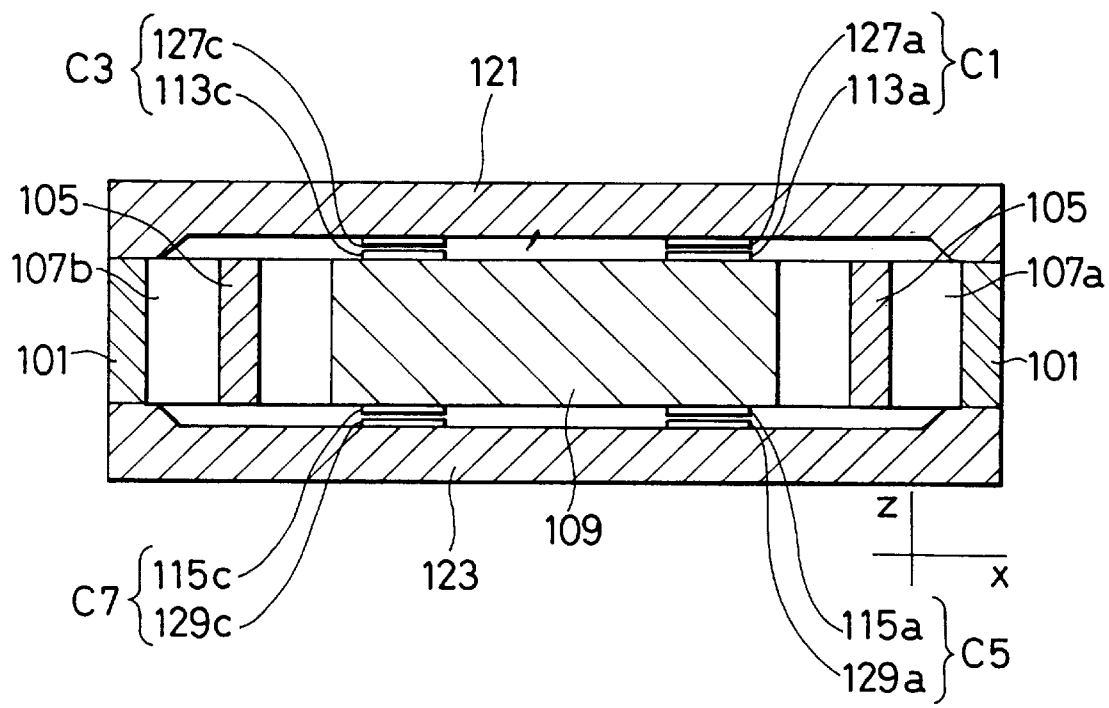
FIG. 12 is a cross-sectional view of the essential part of the acceleration sensor of the present invention, taken along the line A—A of FIG. 11.
Figure 13:
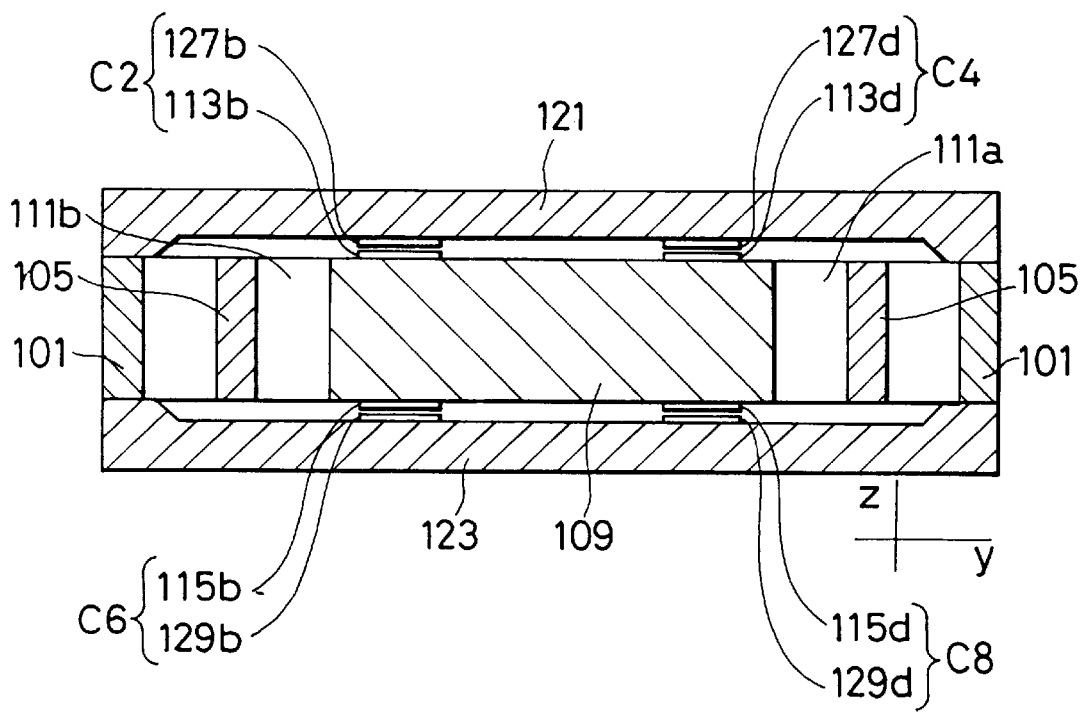
FIG. 13 is a cross-sectional view of the essential part of the acceleration sensor of the present invention, taken along the line B—B of FIG. 11.

FIG. 11 shows a plan view of an essential part of a fourth embodiment of the acceleration sensor according to the first aspect of the present invention. FIG. 12 shows a cross-sectional view of the fourth embodiment, taken along the line A—A of FIG. 11. FIG. 13 shows a cross-sectional view of the fourth embodiment, taken along the line B—B of FIG. 11. Now, the fourth embodiment of the present invention will be described with reference to FIGS. 11 to 13. The outer frame or outer fixed frame board 101 is provided with the window 103 for receiving both the additional frame 105 and the weight board 109 therein. As shown in FIG. 11, the window 103 has the centers of inner surfaces of its opposite Y-axis sides (which are perpendicular to the X axis) fixedly connected or bonded to the ends of the X-axis torsion beams 107*a*, 107*b*.

The additional frame 105 has the centers of outer surfaces of its opposite Y-axis sides (which are perpendicular to the X axis) fixedly connected or bonded to the other ends of the X-axis torsion beams 107*a*, 107*b*. Namely, the X-axis torsion beams 107*a*, 107*b* are fixedly and integrally connected or bonded between the centers of inner surfaces of the opposite Y-axis sides of the outer fixed frame board 109 and the centers of outer surfaces of the opposite Y-axis sides of the window 103 of the outer fixed frame board 101. Each of the X-axis torsion beams 107*a*, 107*b* is narrow in with (i.e., in a direction parallel to the Y axis, and has the same thickness as that of the outer fixed frame board 101, the thickness being measured in the Z axis, which makes the X-axis torsion beams 107*a*, 107*b* more resilient in their twisting operation about the X axis, and, therefore more sensitive to the angular acceleration about the X axis. On the other hand, the additional frame 105 receives the weight board 109 (described later) therein, and has the centers of inner surfaces of its opposite sides (which are perpendicular to the Y axis) fixedly and integrally connected or bonded to the ends of the Y-axis torsion beams 111*a*, 111*b*.

The weight board 109 assumes a flat plate-like shape, and has the centers of outer surfaces of its opposite sides (which are perpendicular to the Y axis) fixedly and integrally connected or bonded to the other ends of the Y-axis torsion beams 111*a*, 111*b*. Namely, the Y-axis torsion beams 111*a*, 111*b* are fixedly and integrally connected or bonded between the centers of inner surfaces of the opposite X-axis sides of the additional frame 105 and the centers of outer surfaces of the opposite X-axis sides of the weight board 109. Each of the Y-axis torsion beams 111a, 111b is narrow in with (i.e., in a direction parallel to the X axis, and has the same thickness as that of the outer fixed frame board 101, the thickness being measured in the Z axis, which makes the Y-axis torsion beams 111a, 111b more resilient in their twisting operation about the Y axis, and, therefore more sensitive to the angular acceleration about the Y axis.

As is clear from FIGS. 11 and 12, The weight board 109 forms a weight portion as a whole, and is provided with a plurality of the electrodes 113a, 113b, 113c, 113d and 115a, 115b, 115c, 115d in the front and the rear surface of each of its X-axis and Y-axis opposite sides.

Incidentally, it is possible to integrally product the above-described components such as the outer fixed frame board 101, X-axis torsion beams 107a, 107b, additional frame 105, Y-axis torsion beams 111a, 111b, and the weight board 109 from a single board, for example, by using anisotropic etching techniques to permit these components to have the same thickness, the thickness being measured in the Z axis.

As shown in FIG. 12, the outer cover 125 constructed of the upper board 121 and the lower board 123 is disposed outside the outer fixed frame board 101 so as to be adjacent to the frame board 101 in a direction parallel to the Z axis. Each of the upper and lower boards 121, 123 assumes a flat plate-like shape provided with a concave portion in its inner surface. A plurality of the electrodes 127a, 127b, 127c and 127d are fixedly mounted on the bottom of the concave portion of the upper board 121 to correspond to a plurality of the electrodes 113a, 113b, 113c and 113d fixedly mounted on the upper surface of the weight portions of the board 109, respectively. On the other hand, as viewed in FIG. 12, a plurality of the electrodes 129a, 129b, 129c and 129d are fixedly mounted on the bottom of the concave portion of the lower board 123 to correspond to a plurality of the electrodes 115a, 115b, 115c and 115d fixedly mounted on the lower surface of the weight portions of the weight board 109, respectively. As is clear from FIG. 12: the electrodes 113a, 127a forms the capacitor C1. The electrodes 113b, 127b forms the capacitor C2. The electrodes 113c, 127c forms the capacitor C3. The electrodes 113d, 127d forms the capacitor C4. The electrodes 115a, 129a forms the capacitor C5. The electrodes 115d, 129d forms the capacitor C6. The electrodes 115c, 129c forms the capacitor C7. The electrodes 115d, 129d forms the capacitor C8. A standard value of the gap in each of the capacitors C1, C2, C3, C4, C5, C6, C7 and C8 is dependent on a distance between the bottoms of the concave portions of the upper board 121 and the lower board 123, as viewed in FIG. 12. Incidentally, as is clear from FIG. 12, in case that the outer fixed frame board 101 is larger in thickness than that of the weight board 109, it is possible to omit the provision of the concave portion in each of the upper and the lower board 121, 123. As for wiring to the measurement circuits (not shown), a predetermined number of through-holes are formed in positions corresponding to those of the electrodes 127a, 127b, 127c, 127d and 129a, 129b, 129c, 129d of the upper and the lower board 121, 123 to permit the wiring to access these electrodes.

In operation, for example, when the acceleration sensor of the present invention is subjected to an angular acceleration about the longitudinal axis of the X-axis torsion beams 107a, 107b parallel to the X axis, the weight board 109 rotates about the longitudinal axis of the X-axis torsion beams 107a, 107b parallel to the X axis to twist the beams 107a, 107b against their resiliency, so that the weight board 109 stops at an angular position in which the moment energy of the weight board 109 balances the resilient torsional force exerted by the thus twisted X-axis torsion beams 107a, 107b. In this twisting operation of the X-axis torsion beams 107a, 107b, when the gap of each of the capacitors C2, C8 increases so that these capacitors C2, C8 decrease in capacitance, the capacitors C4, C6 increase in capacitance while decreasing the gaps thereof. On the other hand, when the weight board 109 rotates in the opposite direction about the longitudinal axis of the X-axis torsion beams 107a, 107b, the opposite action takes place. Namely, when the gap of each of the capacitors C2, C8 decreases so that the capacitors C2, C8 increase in capacitance, the capacitors C4, C6 decrease in capacitance while increasing the gaps thereof. In the measurement circuits, variations in capacitance of the capacitors C2, C4, C6, C8 are measured so that the inclination of the weight board 109 and the inclination direction thereof are calculated, whereby the angular acceleration about the X axis, to which the acceleration sensor of the present invention is subjected, is determined.

On the other hand, for example, when the acceleration sensor of the present invention is subjected to an angular acceleration about the longitudinal axis of the Y-axis torsion beams 111a, 111b parallel to the Y axis, the weight board 109 rotates about the longitudinal axis of the Y-axis torsion beams 111a, 111b parallel to the Y axis to twist the beams 111a, 111b against their resiliency, so that the weight board 109 stops at an angular position in which the moment energy of the weight board 109 balances the resilient torsional force exerted by the thus twisted Y-axis torsion beams 111a, 111b. In this twisting operation of the Y-axis torsion beams 111a, 111b, when the gap of each of the capacitors C1, C7 increases so that these capacitors C1, C7 decrease in capacitance, the capacitors C3, C5 increase in capacitance while decreasing the gaps thereof. On the other hand, when the weight board 109 rotates in the opposite direction about the longitudinal axis of the Y-axis torsion beams 111a, 111b, the opposite action takes place. Namely, when the gap of each of the capacitors C1, C7 decreases so that the capacitors C1, C7 increase in capacitance, the capacitors C3, C5 decrease in capacitance while increasing the gaps thereof. In the measurement circuits, variations in capacitance of the capacitors C1, C3, C5, C7 are measured so that the inclination of the weight board 109 and the inclination direction thereof are calculated, whereby the angular acceleration about the Y axis, to which the acceleration sensor of the present invention is subjected, is determined.

Further, for example, when the acceleration sensor of the present invention is subjected to an angular acceleration about the i axis (shown in dotted line in FIG. 11, the i axis passing through an intersection point at which the longitudinal axis of the X-axis torsion beams 107a, 107b intersects with the longitudinal axis of the Y-axis torsion beams 111a, 111b, to bisect an angle defined by both the longitudinal axes), the weight board 109 rotates about the i axis to twist these beams 107a, 107b, 111a, 111b against their resiliency, so that the weight board 109 stops at an angular position in which the moment energy of the weight board 109 balances the resultant resilient torsional force exerted by the thus twisted X-axis and the Y-axis torsion beams 107a, 107b, 111a, 111b. In this twisting operation of the X-axis and the Y-axis torsion beams 107a, 107b, 111a, 111b, when the gap of each of the capacitors C1, C2, C7, C8 increases so that these capacitors C1, C2, C7, C8 decrease in capacitance, the capacitors C3, C4, C5, C6 increase in capacitance while decreasing the gaps thereof. On the other hand, when the weight board 109 rotates in the opposite direction about the i axis, the opposite action takes place. Namely, when the gap of each of the capacitors C1, C2, C7, C8 decreases so that the capacitors C1, C2, C7, C8 increase in capacitance, the capacitors C3, C4, C5, C6 decrease in capacitance while increasing the gaps thereof. In the measurement circuits, variations in capacitance of the capacitors C1, C2, C3, C4, C5, C6, C7 are measured so that the inclination of the weight board 109 and the inclination direction thereof are calculated, whereby the angular acceleration about the i axis, to which the acceleration sensor of the present invention is subjected, is determined.

As described above, in the embodiment of the present invention: the additional frame 105 is connected with the inner peripheral surface of the outer fixed frame board 101 through the X-axis torsion beams 107a, 107b extending in the X axis; the weight board 109 is connected with the inner peripheral surface of the additional frame 105 through the Y-axis torsion beams 111a, 111b extending in the Y axis; and, the weight board 109 assumes a suitable shape symmetric about both the longitudinal axes of these torsion beams 107a, 107b, 111a, 111b, and is provided with the electrodes 113a to 113d and 115a to 115d in its front and rear surfaces. Consequently, in production of each set of the electrodes 113a to 113d and 115a to 115d by using printing techniques, it is possible to produce a set of the electrodes 113a to 113d or a set of the electrodes 115a to 115d through a single printing path (i.e., a front-surface path for the latter set or a rear-surface path for the former set) in printing process, which makes it possible to simplify the manufacturing process of the acceleration sensor of the present invention. This also makes it possible to simplify the wiring work in production of the acceleration sensor. Further, when the acceleration sensor is subjected to the same amount of angular acceleration about each of the X and the Y axis simultaneously, the moment energy of the weight board 109 about the X axis is substantially equal to that of the weight board 109 about the Y axis. Namely, when the weight board 109 rotates at the same angular acceleration about each of the X and the Y axis simultaneously, it is possible to obtain a precise calculation result without involving any error with respect to each of the X and the Y axis. Consequently, in the acceleration sensor of the present invention, it is possible to omit a measurement circuit for compensating a possible error occurring in measurement of the angular acceleration, which makes it possible to produce a precision acceleration sensor at low cost.

Figure 14:
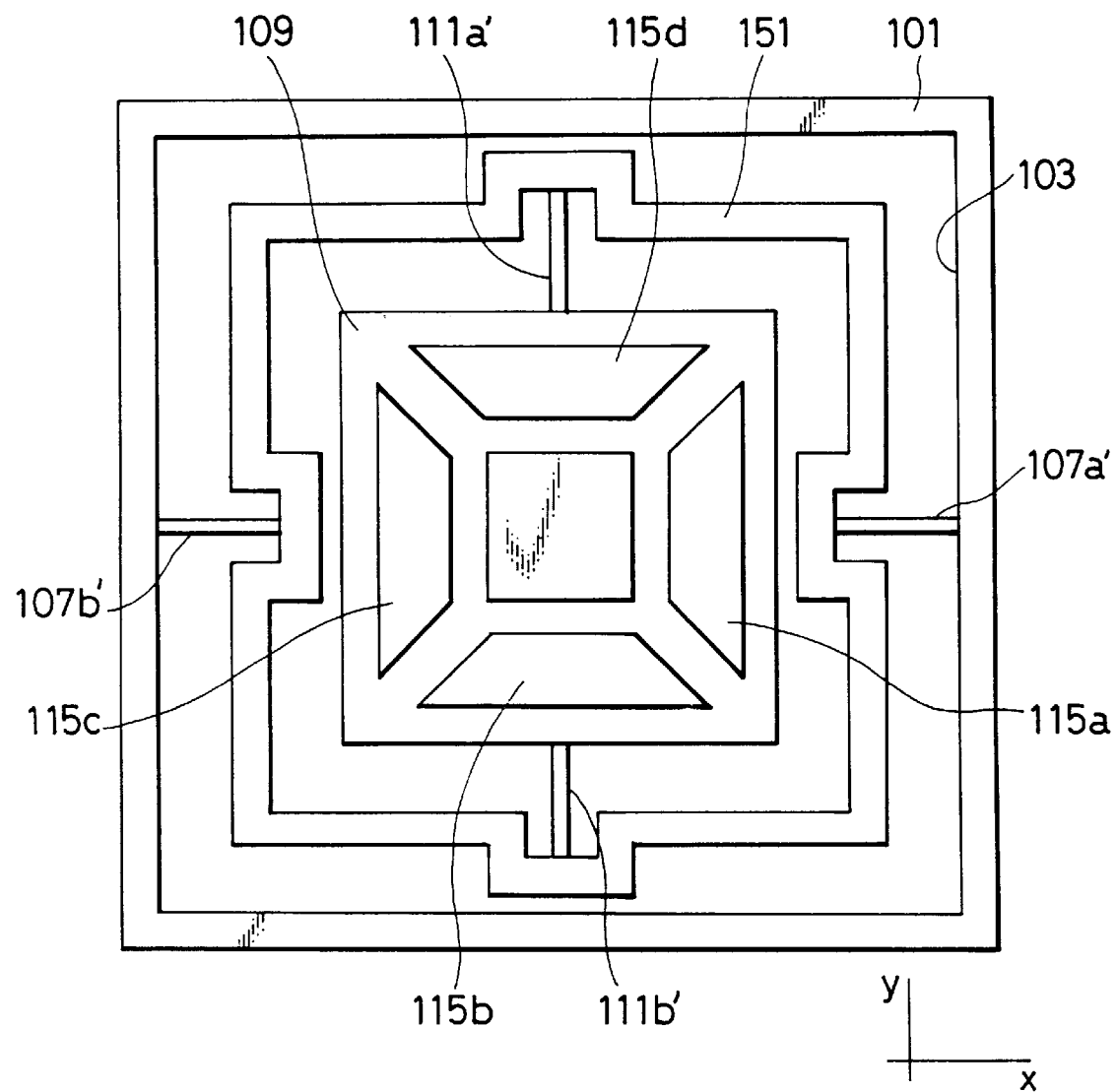
FIG. 14 is a plan view of an essential part of a modification of the fourth embodiment of the present invention shown in FIG. 11.

FIG. 14 shows a plan view of an essential part of a modification of the fourth embodiment of the acceleration sensor shown in FIG. 11. Incidentally, like reference characters apply to similar parts throughout FIGS. 11 to 14. This modification differs from the fourth embodiment shown in FIG. 11 in shape of the additional frame and in size or length of both the X-axis and the Y-axis torsion beams. As is clear from FIG. 14, in contrast with the additional frame 105 of the fourth embodiment shown in FIG. 11, the additional frame 151 of the modification shown in FIG. 14 has each of its opposite sides (which are perpendicular to the X axis) bulged inwardly in the center to increase a distance between an outer surface of the center and the corresponding inner surface of each of opposite sides (which are perpendicular to the X axis) of the outer fixed frame board 101. Consequently, each of the X-axis torsion beams 107a' and 107b' fixedly and integrally connected or bonded between the outer fixed frame board 101 and the additional frame 151 of the modification is larger in length than each of the X-axis torsion beams 107a and 107b of the fourth embodiment shown in FIG. 11, which makes the X-axis torsion beams of the modification more sensitive to the angular acceleration about the X axis and improves these X-axis torsion beams of modification in fatigue strength in their twisting operation. Further, in contrast with the additional frame 105 of the fourth embodiment shown in FIG. 11, the additional frame 151 of the modification has each of its the other opposite sides (which are perpendicular to the Y axis) bulged outwardly in the center to increase a distance between an inner surface of the center and the corresponding outer surface of opposite sides (which are perpendicular to the Y axis) of the weight board 109. Consequently, each of the Y-axis torsion beams 111a' and 111b' fixedly and integrally connected or bonded between the outer surfaces of the opposite sides of the weight board 109 and the corresponding inner surfaces of the centers of the additional frame 151 of the modification is larger in length than each of the Y-axis torsion beams 111a and 111b of the fourth embodiment shown in FIG. 11, which makes the Y-axis torsion beams of the modification more sensitive to the angular acceleration about the Y axis and improves these Y-axis torsion beams of modification in fatigue strength in their twisting operation.

Incidentally, also in the modification having the above construction, it is possible to integrally produce the outer fixed frame board 101, X-axis torsion beams 107a' and 107b', additional frame 151, Y-axis torsion beams 111a' and 111b' and the weight board 109 from a single board.

Of the above embodiments and the modifications of the acceleration sensor of the present invention, one shown in FIGS. 1 and 2 has the weight board provided with the window in its central portion, in a central portion of which window there is provided the central fixed board so that the torsion beams are provided between the centers of the opposite inner surfaces of the window of the weight board and the centers of the opposite outer sides of the central fixed board. Consequently, when the acceleration sensor is downsized as a whole by reducing the width of the central fixed board thereof, the torsion beams increase in length, which improves the torsion beams in fatigue strength in their twisting operation, and, therefore improves the acceleration sensor in quality and reliability.

Further, in the embodiment of the present invention shown in FIGS. 1 and 2, when the distance between the outer peripheral surface of the weight board and the inner peripheral surface of the outer frame is reduced, it is possible to increase the entire length of each of the torsion beams. Consequently, it is possible to improve the acceleration sensor in sensitivity to the angular acceleration, which makes it possible for the thus down-sized acceleration sensor to be improved in sensitivity.

Still further, in the embodiment of the present invention shown in FIGS. 1 and 2, when both the torsion beams and the weight board are produced from a single board having a constant thickness, it is possible to prevent the portions between the torsion beams and the weight board from being impaired in mechanical strength, i.e., the torsion beams are improved in fatigue strength in their twisting operation.

In another embodiment of the present invention shown in FIGS. 3 and 4: the notch portions are provided in the outer surfaces of the opposite X-axis sides of the weight board, the opposite X-axis sides being perpendicular to the Y axis; and, the torsion beams are integrally provided between the centers of the notch portions and the centers of the inner surfaces of the opposite X-axis sides of the outer fixed frame board. Consequently, when the acceleration sensor is reduced in size as a whole by increasing the depth of each of the notch portions, it is possible to increase the entire length of each of the torsion beams, which improves the torsion beams in fatigue strength in their twisting operation, and, therefore improves the acceleration sensor in quality and reliability.

Further, in this case, since it is possible to increase the entire length of each of the torsion beams without increasing the distance between the outer peripheral surface of the weight board and the inner peripheral surface of the outer fixed frame board, it is possible to improve the torsion beams in fatigue strength in their twisting operation, which improves the thus down-sized acceleration sensor in sensitivity to the angular acceleration.

In further another embodiment of the present invention shown in FIGS. 5 to 7: the additional frame is connected with the outer peripheral surface of the central fixed board through the X-axis torsion beams extending in a direction parallel to the X axis; the outer peripheral surface of the additional frame is connected with the weight board through the Y-axis torsion beams extending in a direction parallel to the Y axis, the weight board being provided with the window in its central portion in which both the central fixed board and the additional frame are received; and, the weight board assumes a suitable shape symmetric about both the longitudinal axes of the torsion beams, and is provided with the electrodes in its front and rear surfaces. Consequently, in production of each set of the electrodes by using printing techniques, it is possible to produce each set of the electrodes through each single printing path (i.e., each of the front-surface and the rear-surface path for the electrodes) in printing process, which makes it possible to simplify the manufacturing process of the acceleration sensor of the present invention. This also makes it possible to simplify the wiring work in production of the acceleration sensor. Further, when the acceleration sensor is subjected to the same amount of angular acceleration about each of the X and the Y axis simultaneously, the moment energy of the weight board about the X axis is substantially equal to that of the weight board about the Y axis. Namely, when the weight board rotates at the same angular acceleration about each of the X and the Y axis simultaneously, it is possible to obtain a precise calculation result without involving any error with respect to each of the X and the Y axis. Consequently, in the acceleration sensor of the present invention, it is possible to omit a measurement circuit for compensating a possible error occurring in measurement of the angular acceleration, which makes it possible to produce a precision acceleration sensor at low cost.

On the other hand, in the embodiment of the present invention shown in FIGS. 11 to 13: the additional frame is connected with the inner peripheral surface of the outer fixed frame board through the X-axis torsion beams extending in the X axis; the weight board is connected with the inner peripheral surface of the additional frame through the Y-axis torsion beams extending in the Y axis; and, the weight board assumes a suitable shape symmetric about both the longitudinal axes of these torsion beams, and is provided with the electrodes in its front and rear surfaces. Consequently, in production of each set of the electrodes by using printing techniques, it is possible to produce a set of the electrodes through each single printing path (i.e., each of the front-surface and the rear-surface path for the electrode) in printing process, which makes it possible to simplify the manufacturing process of the acceleration sensor of the present invention. This also makes it possible to simplify the wiring work in production of the acceleration sensor.

Further, in this embodiment of the present invention, when the acceleration sensor is subjected to the same amount of angular acceleration about each of the X and the Y axis simultaneously, the moment energy of the weight board about the X axis is substantially equal to that of the weight board about the Y axis. Namely, when the weight board rotates at the same angular acceleration about each of the X and the Y axis simultaneously, it is possible to obtain a precise calculation result without involving any error with respect to each of the X and the Y axis. Consequently, in the acceleration sensor of the present invention, it is possible to omit a measurement circuit for compensating a possible error occurring in measurement of the angular acceleration, which makes it possible to produce a precision acceleration sensor at low cost.

Now, a second aspect of the present invention will be described with reference to FIGS. 15 to 35.

Shown in FIGS. 15 to 29 is a first embodiment of the acceleration sensor and the method of producing the same according to the second aspect of the present invention.

The acceleration sensor of this first embodiment of the present invention is of a three-layer capacity type in which a silicon layer is sandwiched between a pair of glass layers.

Figure 15:
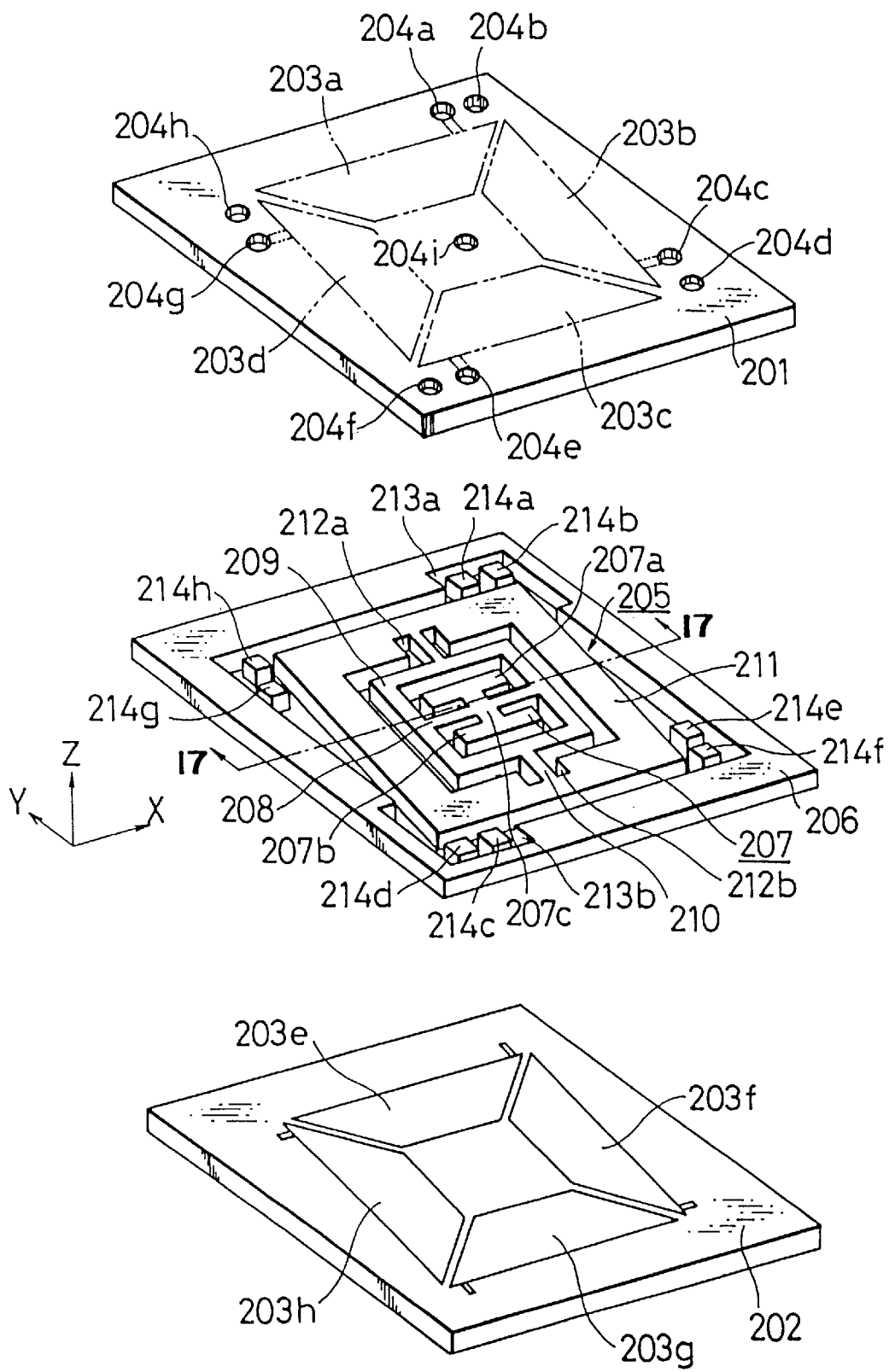
FIG. 15 is an exploded perspective view of a first embodiment according to the second aspect of the present invention.

In other words, as shown in FIG. 15, the acceleration sensor of this embodiment is substantially constructed of: a first glass base board or substrate 201; a second glass substrate 202; the weight portion 205 and a main frame 206 both sandwiched between the first glass substrate 201 and the second glass substrate 202; and, like components.

Each of the first glass substrate 201 and the second glass substrate 202 serves as an insulating substrate. As is clear from FIG. 15, the first glass substrate 201 is provided with a plurality of transparent electrodes 203a, 203b, 203c, 203d in its rear surface, the electrodes being made of indium tin oxide (ITO). On the other hand, the second glass substrate 202 is provided with a plurality of transparent electrodes 203e, 203f, 203g, 203h in its a front surface, so that these electrodes 203e, 203f, 203g and 203h of the front surface of the second glass substrate 202 are disposed from the electrodes 203a, 203b, 203c and 203d of the rear surface of the first glass substrate 201 through a weight 211, respectively. In other words, the electrodes 203e, 203f, 203g and 203h of the second glass substrate 202 correspond in position to the electrodes 203a, 203b, 203c and 203d of the first glass substrate 201, respectively.

Each of the transparent electrode 203a to 203h assumes a substantially trapezoidal shape, and has a small one of a pair of opposite parallel sides of its trapezoidal shape disposed around a center of the glass substrates 201, 202 so as to form a substantially rhomboid diagram surrounding the center, as shown in FIG. 15.

Incidentally, since the transparent electrodes 203a, 203b, 203c, 203d is mounted on the rear surface of the first glass substrate 201, they are shown in two-dot chain lines (i.e., phantom lines) in FIG. 15.

The first glass substrate 201 is also provided with a plurality of wiring-connection through-holes 204a, 204b, 204c, 204d, 204e, 204f, 204g and 204h which ones correspond in position to a plurality of connection portions 214a, 214b, 214c, 214d, 214e, 214f, 214g and 214h, respectively. Further provided in a central portion of the first glass substrate 201 is an additional wiring-connection through-hole 204i which corresponds in position to an end surface of a supporting post 207.

Inserted in each of the wiring-connection through-holes 204a to 204i are a wire (not shown) and packing materials such as aluminum and like metals, so that ohmic contacts are made between such packing materials and the corresponding connection portions 214a to 214h, the connection portions being made of silicon.

The weight portion 205 is flat in its front and rear surfaces which face the rear surface of the first glass substrate 201 and the front surface of the second glass substrate 202, respectively. In the weight portion 205, the supporting post 207 is a substantially H-shaped member which is fixedly and integrally connected or bonded to the weight 211 through the supporting beams 208, supporting frame 209 and the supporting beams 210. These components and the main frame 206 are made of silicon (see FIG. 15). Incidentally, as shown in FIG. 15, the X and the Y axis pass through the center of the supporting post 207 (i.e., the center of the connection portion 207c which will be described later), and are parallel to the opposite end surfaces of the connection portion 207c, the opposite end surfaces are bonded to both the first glass substrate 201 and the second glass substrate 202. The X and Y axis is perpendicular to the Z axis passing through the center of the connection portion 207c.

Figure 16:
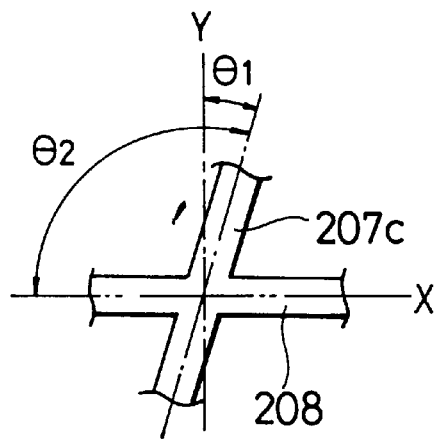
FIG. 16 is an enlarged plan view of an essential part of the first embodiment of the acceleration sensor shown in FIG. 15, illustrating the supporting beam extending in a direction parallel to the X axis and its connected portion.

The supporting post 207 is constructed of: a pair of opposite parallel post members 207a, 207b extending in a direction parallel to the X axis; and, the connection portion 207c through which the parallel post members 207a, 207b are integrally connected with each other. A pair of the supporting beams 208, each of which assumes a rectangular shape in cross-section, extend in opposite directions from the connection portion 207c, the opposite directions being parallel to the X axis. In this embodiment, as shown in FIG. 16, an angle defined between a longitudinal axis of the connection portion 207c and the Y axis is approximately 19.5 degrees, the angle being denoted by the reference character "θ1" in FIG. 16. In other words, an angle defined between a longitudinal axis of the connection portion 207c and the X axis is approximately 109.5 degrees, the angle being denoted by the reference character "θ2" in FIG. 16.

As is clear from FIG. 15, the supporting beams 208, which serve as first supporting members, have their opposite outer end portions integrally connected or bonded to the supporting frame 209 in a manner such that the supporting frame 209 surrounds the supporting post 207, the supporting frame 209 assuming a flat plate-like shape. A pair of opposite sides of the supporting frame 209 serving as a frame-like supporting member are parallel to the X axis, and each of the other pair of opposite sides of the supporting frame 209 is inclined at an angle of 19.5 degrees from the Y axis so as to be parallel to the connection portion 207c of the supporting post 207.

Further, each of the supporting beams 210, which assumes a rectangular shape in cross-section and serves as a second beam member, extends outwardly from each of the outer surfaces of opposite sides of the supporting frame 209 in a direction parallel to the longitudinal direction of the connection portion 207c of the supporting post 207, the opposite sides being parallel to the X axis. The weight 211 is fixedly connected with the opposite outer ends of the supporting beams 210. Consequently, each of the supporting beams 210 is also inclined at an angle of 19.5 degrees from the Y axis as is in the case of the connection portion 207c.

In the above embodiment of the present invention, the reason why both the connection portion 207c and the supporting beams 210 are inclined at the angle of 19.5 degrees from the Y axis is only that these components such as the connection portions 207c and the like are produced by using a so-called wet etching techniques and formed on (111) planes of silicon.

The weight 211 serving as the weight member assumes a flat plate-like shape having opposite parallel sides thereof be parallel to the X axis and the remaining opposite parallel sides thereof be parallel to the supporting beams 210. Further, the weight 211 has each of the inner surfaces of the opposite parallel sides thereof notched in the center to form a pair of notch portions 212a, 212b which are fixedly and integrally connected or bonded to the opposite outer ends of the supporting beams 210, as shown in FIG. 15.

Figure 17:
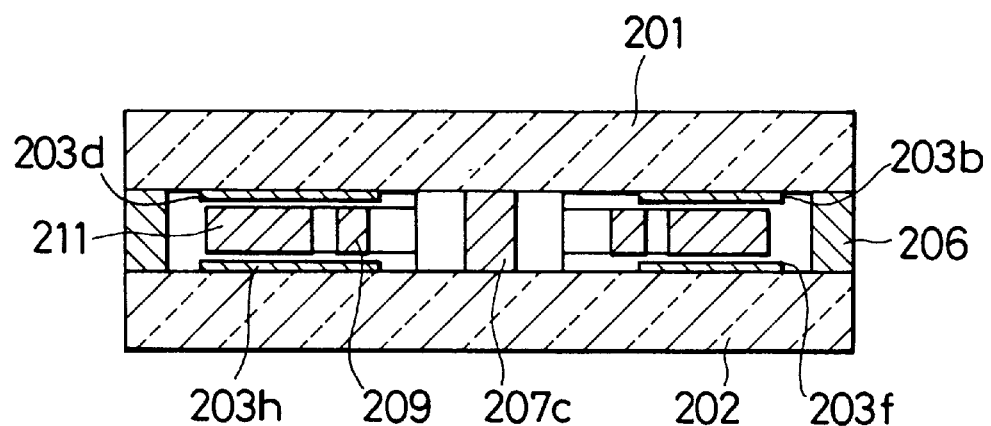
FIG. 17 is a cross-sectional view of the acceleration sensor of the first embodiment shown in FIG. 15, taken along the XZ plane, i.e., taken along the A—A line of FIG. 15.

As shown in FIG. 17, all the supporting beams 208, supporting frame 209, supporting beams 210 and the weight 211 are equal to each other in thickness so as to be smaller in thickness than the supporting post 207, the thickness being measured in the Z axis.

The weight portion 205 having the above construction is disposed inside the main frame 206 which assumes a flat frame-like shape forming a closed circuit-like member, as shown in FIG. 15.

Figure 18:
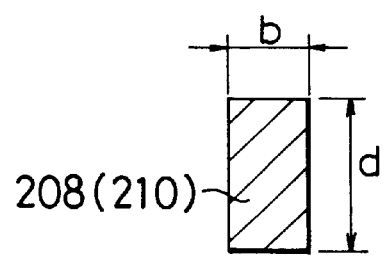
FIG. 18 is a longitudinal sectional view of the supporting beam of the acceleration sensor shown in FIG. 15, taken along the XZ plane of FIG. 15.

On the other hand, in the above embodiment of the present invention, as is clear from FIG. 18, each of the supporting beams 208, 210 assumes a substantially rectangular shape in cross-section, on which the acceleration sensor is dependent in sensitivity. Namely, as for this shape in cross-section shown in FIG. 18, it is possible to control each of the supporting beams 208, 210 in resiliency and fatigue strength by adjusting in amount each of its width "b" (which is parallel to the X axis) and its height "d" (which is parallel to the Z axis).

Figure 19:
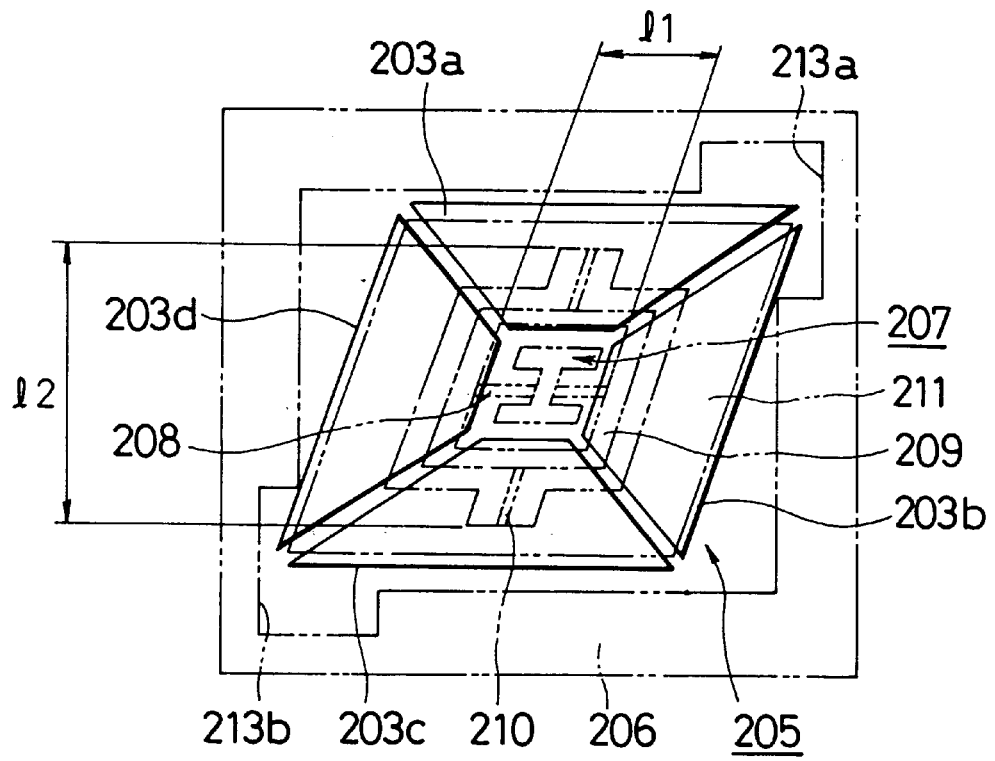
FIG. 19 is a plan view of the acceleration sensor shown in FIG. 15, illustrating the arrangement of transparent electrodes and a weight of the acceleration sensor.
Figure 19:
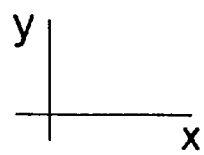

Each of the weight 211 and the supporting frame 209 is parallel to the transparent electrodes 203a to 203h when the acceleration sensor is not subjected to any acceleration. As shown in FIG. 19, in arrangement of the weight 211, supporting frame 209 and the transparent electrodes 203a to 203h in the XY plane, each of the transparent electrodes 203a to 203h sufficiently covers both of the weight 211 and the supporting frame 209. Incidentally, as is clear from FIG. 19, the transparent electrodes 203a to 203d are shown in solid lines, while the weight portion 205 is shown in two-dot chain lines (i.e., phantom lines). The remaining transparent electrodes 203e to 203h are omitted in illustration from FIG. 19. Also omitted in illustration from FIG. 19 are the connection portions 214a to 214h.

The main frame 206 serving as the closed circuit-like member has the same thickness as that of the supporting post 207 (which thickness is measured in the Z axis), assumes a substantially square shape with an outer and an inner peripheral surface in the XY plane, and closes an outer peripheral opening area defined between the first glass substrate 201 and the second glass substrate 202, the inner peripheral surface assumes a substantially square shape as is clear from FIG. 15. Further, the main frame 206 has a pair of its opposite corners notched to form a pair of notches 213a, 213b. Provided in the vicinities of these notches 213a, 213b are the connection portions 214a to 214d, each of which is made of silicon and assumes a so-called island-like shape, as shown in FIGS. 15 and 19.

Provided in the vicinities of a pair of the remaining opposite corners of the main frame 206 are the remaining connection portions 214e to 214h, each of which assumes the island-like shape as is in the case of the connection portions 214a to 214d. Incidentally, any of the connection portions 214a to 214h has the substantially same thickness as that of the supporting post 207, the thickness being measured in the Z axis.

Connected to these connection portions 214a to 214h are the corresponding transparent electrodes 203a to 203h through suitable conductors which are made of, for example such as aluminum and like materials.

Figure 20:
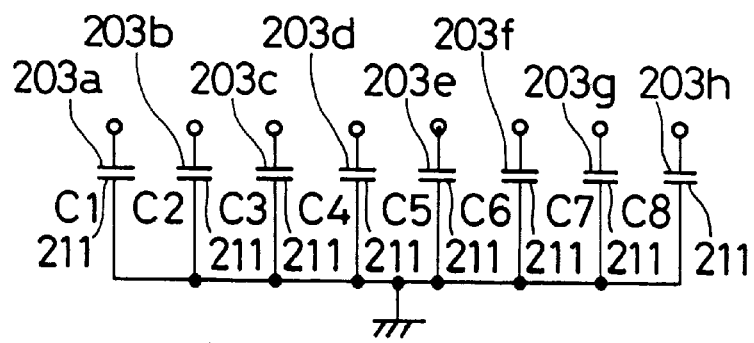
FIG. 20 is a schematic diagram of an electrical equivalent circuit of the acceleration sensor of the present invention shown in FIG. 15.

On the other hand, the supporting post 207 is grounded outside the acceleration sensor through a suitable wire (not shown) which passes outward through the wiring-connection through-hole 204i of the first glass substrate 201. Namely, in the embodiment of the present invention having the above construction, the transparent electrodes 203a to 203h and the weight 211 are so combined as to form an equivalent circuit constructed of the capacitors C1 to C8, as shown in FIG. 20.

Now, the method of producing the acceleration sensor of the present invention having the above construction will be described with reference to FIGS. 21 to 24.

Figure 21A:
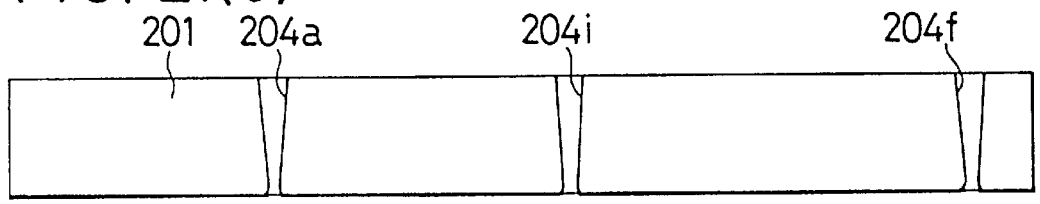
FIGS. 21(a) to 21(d) are schematic diagrams illustrating the manufacturing process of a first glass base board used in the acceleration sensor of the present invention shown in FIG. 15.

As for the production process of the first glass substrate 201 and the transparent electrodes 203a to 203d, as shown in FIG. 21(a), the first glass substrate 201 is subjected to a so-called electric discharge machining operation to form the connection-wiring through-holes 204a to 204i therein.

A series of processing steps in this production process are schematically shown in FIGS. 21(a), 21(b), 21(c) and 21(d). These components such as the connection-wiring through-holes 204a to 204h and the like shown in FIGS. 21(a) to 21(d) do not correspond in precise position to those shown in FIGS. 15 and 16. Consequently, the reference numerals appearing in FIGS. 21(a) to 21(d) are used only for convenience of description of the present invention.

Incidentally, as for FIGS. 22(a), 22(b), 22(c), 22(d), 23(a), 23(b), 23(c), 23(d), 24(a) and 24(b), the substantially same thing can be said as is in the case of FIGS. 21(a) to 21(d).

Figure 21B:
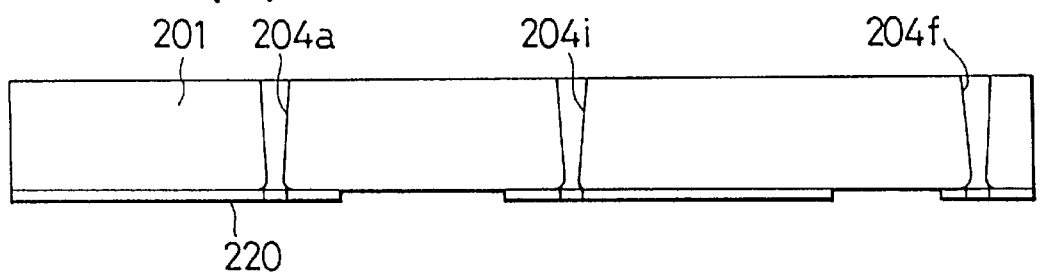

In a subsequent step using photolithographic techniques, as shown in FIG. 21(b), the rear surface of the first glass substrate 201 is entirely covered with a photoresist 220 except area in which the transparent electrodes 203a to 203d are disposed. *3-4*

Figure 21C:
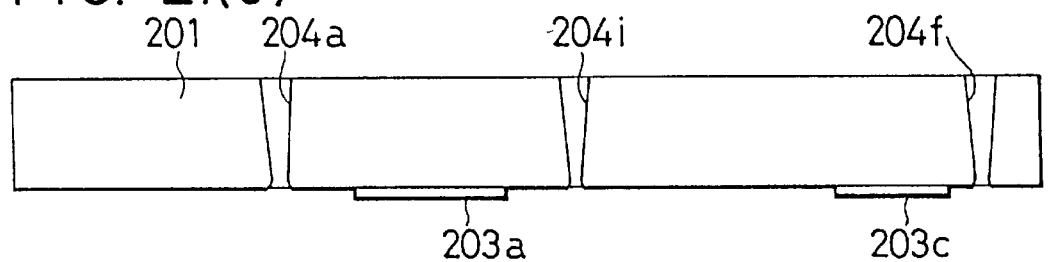
Figure 21D:
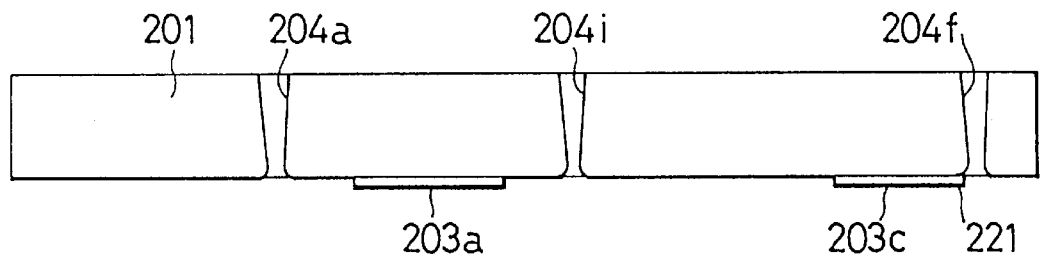

In a step shown in FIG. 21(c) following the above step, ITO (i.e., indium tin oxide) is deposited on the rear surface of the first glass substrate 201 by using sputtering techniques, and then removed except the necessary area such as the transparent electrodes 203a, 203c and the like by using a so-called lift-off techniques.

The second glass substrate 202 has the substantially same construction as that of the first glass substrate 201 except the provision of the wiring-connection through-holes 204a to 204i of the first glass substrate 201, and, is therefore subjected to the substantially same processing as that of the first glass substrate 201 to form the transparent electrodes 203e to 203h on its front surface.

Now, the method of production of the weight portion 205 and the main frame 206 will be described with reference to FIGS. 22(a) to 22(d), 23(a) to 23(d), 24(a) and 24(b).

In an embodiment of the above method of the present invention, by using (110) planes of a silicon base or substrate, the supporting beams 208, 210 are formed on (111) planes of the silicon substrate. Due to this, in order to prevent mistakes in such planes during the production process, a notch 223 is formed in the silicon substrate 222 as a mark for identifying the (110) planes, as shown in FIG. 22(b).

Incidentally, in the following drawings, the notch or mark 223 is omitted for simplifying the drawings in illustration.

Figure 22A:
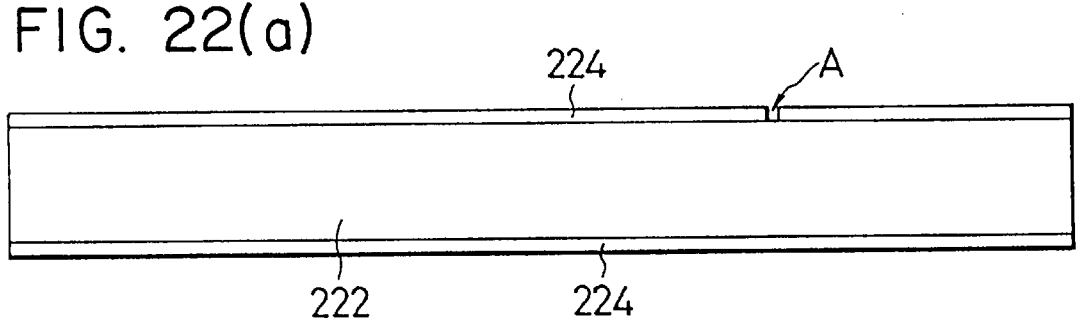
FIGS. 22(a) to 22(d) are schematic diagrams illustrating the manufacturing process of a weight and like components used in the acceleration sensor of the present invention shown in FIG. 15.
Figure 22B:
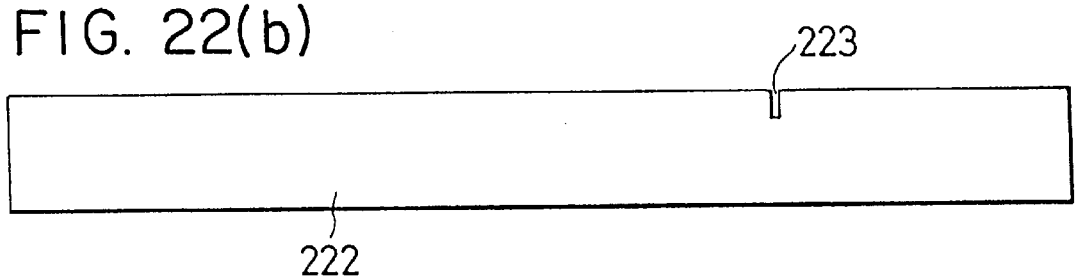
Figure 22C:
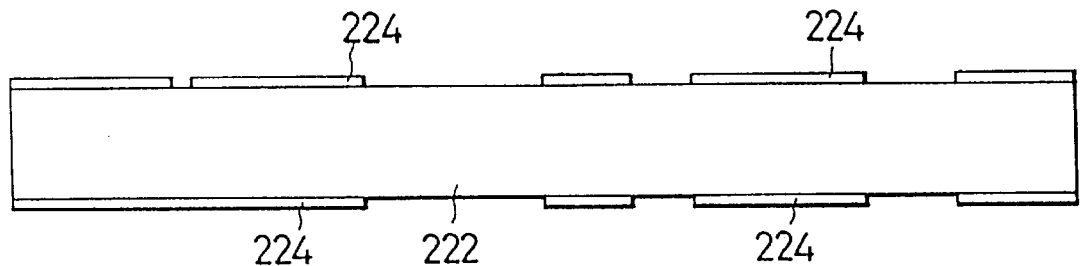
Figure 22D:
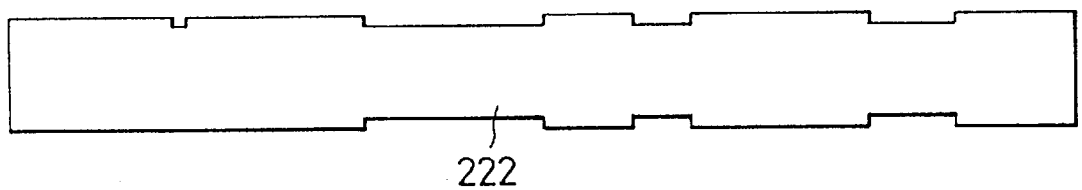

Shown in FIGS. 22(a), 22(b) are the schematic steps for forming the notch or mark 223 in an upper surface of the silicon substrate 222. In such steps, the silicon substrate 222 has each of its opposite surfaces covered with a film 224 of silicon oxide when subjected to a wet-oxidation process (which is one of thermal oxidation processes), the silicon oxide film 224 thus formed having a thickness of, for example, approximately 0.5 micron. Then, the silicon substrate 222 is subjected to a photo-etching process so that the silicon oxide film 224 is removed in a position "A" in which the notch 223 is formed, as shown in FIG. 22(a).

An additional etching operation is conducted in the position "A" of the upper surface of the silicon substrate 222 to form the notch or mark 223 having a predetermined depth (for example, a depth of approximately 50 microns). After that, the silicon oxide film 224 is removed by using the etching techniques, as shown in FIG. 22(b).

In the following steps shown in FIGS. 22(c), 22(d) and FIGS. 23(a) to 23(d), area in surface of the silicon substrate 222 corresponding to the weight portion 205, main frame 206 and the connection portions 214a to 214h are gradually formed into these components. At this time, unnecessary parts of the silicon substrate 222 are removed.

Incidentally, the details of the above-mentioned steps are omitted. Of the essential steps in the production process: one is for forming the outlines of the above components by using the photoetching techniques; and, the remaining ones are for gradually forming the details of these components. In other words, formation and removal of the silicon oxide film 224 and etching of the silicon substrate 222 are repeated to permit the above components to obtain their finished shape and thickness, as shown in FIGS. 22(c), 22(d) and 23(a) to 23(d).

Figure 23A:
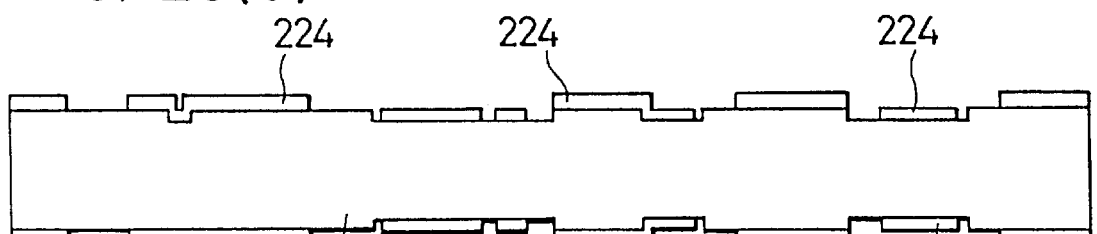
FIGS. 23(a) to 23(d) are schematic diagrams illustrating the manufacturing process of a weight and like components used in the acceleration sensor of the present invention shown in FIG. 15.
Figure 23B:
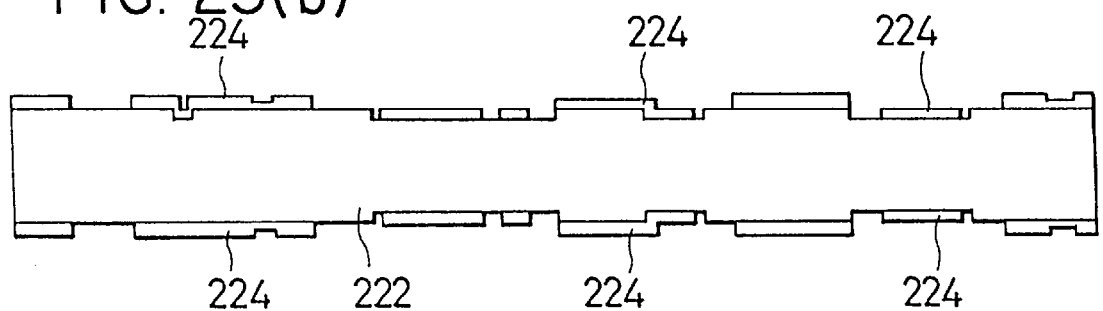
Figure 23C:
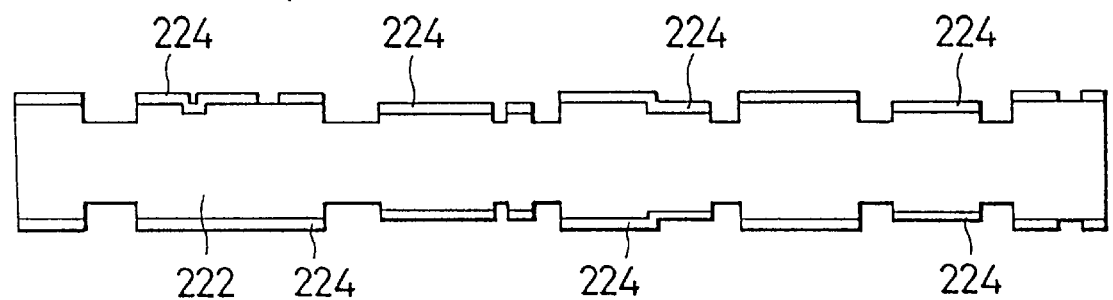
Figure 23D:
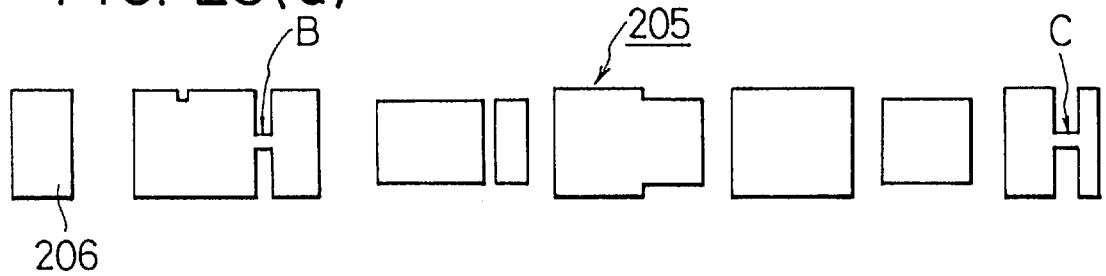

Incidentally, in FIG. 23(d), portions denoted by the reference characters "B" and "C" are cut in a step following the above steps to form an supply port of a getter agent (not shown).

After that, the weight portion 205, main frame 206, the first and the second glass substrate 201, 202 thus formed are bonded to each other.

Such bonding operation of the above components 205, 201, 202 and the like is conducted by using a conventional anode-bonding process. Incidentally, in the anode-bonding process, in general: a predetermined amount of negative voltage is applied to the glass substrate having been heated to a predetermined high temperature in a condition in which the silicon substrate is grounded or kept at a predetermined positive voltage; and, by using an electrostatic force appearing in a boundary between the glass substrate and the silicon substrate, the above bonding operation is conducted.

Figure 24A:
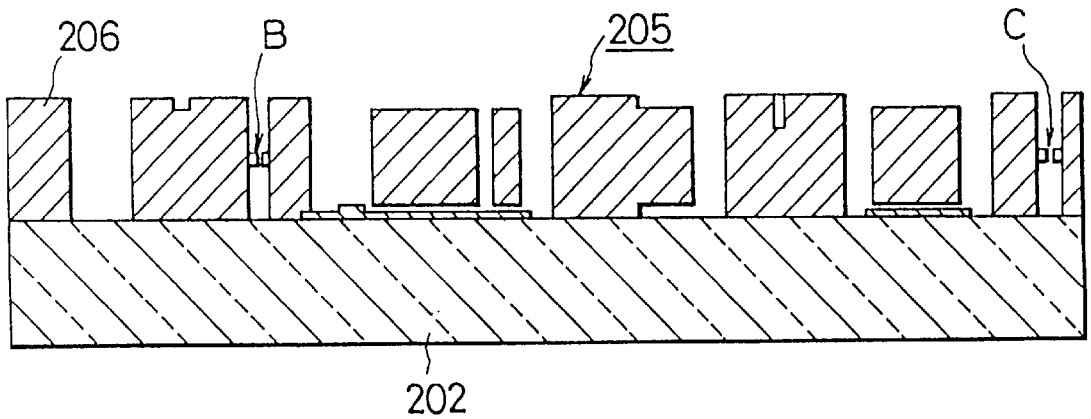
FIGS. 24(a) and 24(b) are schematic diagrams illustrating the bonding process of the first and the second glass base board and the weight used in the acceleration sensor of the present invention shown in FIG. 15.
Figure 24B:
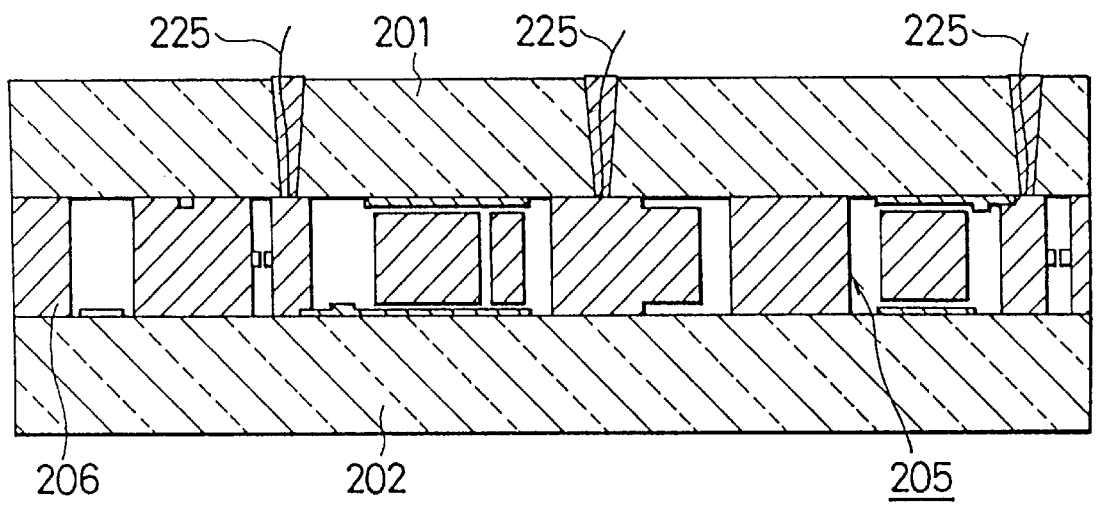

Namely, in such bonding operation: the weight portion 205 and like components already arranged as shown in FIG. 23(d) are mounted on the front surface of the second glass substrate 202, on which front surface the transparent electrodes 203e to 203h are formed; the anode-bonding process is carried out; and, the portions denoted by the reference characters "B", "C" are cut by using a laser unit to form the supply port of the getter agent (not shown), as shown in FIG. 24(a).

In the above embodiment of the present invention, the weight portion 205 is received in a hermetically closed or sealed space defined by the first and the second glass substrate 201, 202 and the main frame 206, the closed space is kept at the substantially same pressure as that of the atmosphere on the ground level.

In the above process, when the first glass substrate 201 is bonded by using the anode-bonding process, gases are produced at the bonded portions, which prevents the closed space receiving the weight portion 205 therein from being kept at a desired pressure. In order to solve this problem, in the embodiment of the present invention, before carrying out the anode-bonding process, the getter agent is supplied to the interior of the acceleration sensor (i.e., to the closed space for receiving the weight portion 205 therein) so as to absorb the gases produced in the anode-bonding process, which permits the closed space to be kept at a desired pressure.

In the above embodiment of the present invention, a non-volatile type getter (for example such as ones of Zr-V-Fe system) is used.

In use, the getter agent having a size of 100×2×0.15 (mm) is cut into a plurality of pieces each of which is wrapped up in a paper to assume a flat shape.

The getter agent thus wrapped up is subjected to ultrasonic waves in an acetone solution so as to remove dust and like foreign matters therefrom, then subjected to an air-drying process or a forced-drying process with hot air having a temperature of up to 50 degrees centigrade, and then supplied to a desired portion such as the closed space described above.

After that, the first glass substrate 201 is mounted on upper surfaces of both the main frame 206 and the supporting post 207 (as viewed in FIG. 24), and the anode-bonding process is carried out so that these components such as the first glass substrate 201, main frame 206, supporting post 207 and the connection portions 214a to 214h are bonded to each other.

Finally, the wires 225 made of electrically conductive materials are inserted into the wiring-connection through-holes 204a to 204i, these through-holes being in turn filled with a suitable material, for example such as aluminum and like materials by using the sputtering techniques, which makes it possible to the wires 225 to be connected with the transparent electrodes 203a to 203h, whereby the acceleration sensor of the present invention is produced.

Incidentally, in the present invention having the above construction, it is also possible to use suitable insulating substrates in place of the first and the second glass substrate 201, 202, the insulating substrates being made of suitable insulating materials. Further, it is also possible to produce the weight 211 by using any other suitable semiconductors and conductors.

Now, operation of the acceleration sensor of the present invention having the above construction will be described with reference to FIGS. 25 to 29.

Figure 25:
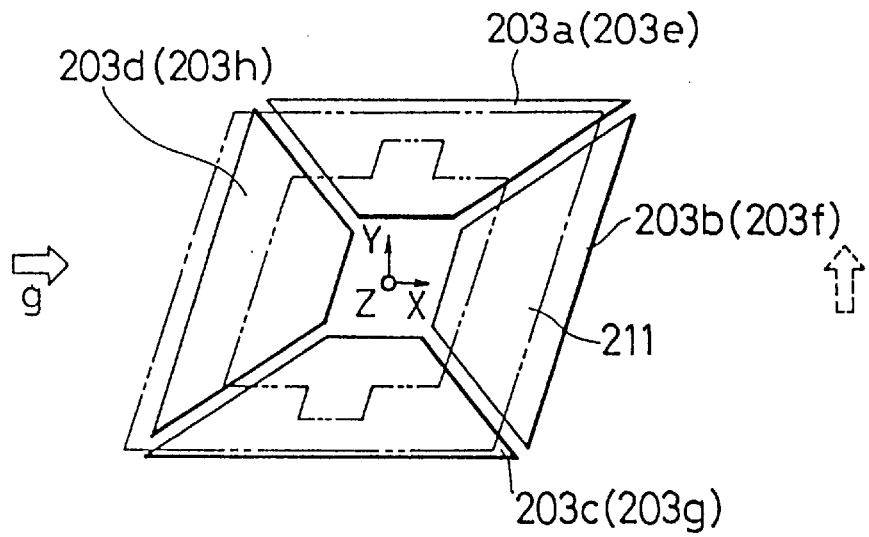
FIG. 25 is a plan view of the transparent electrodes and the weight of the acceleration sensor shown in FIG. 15, illustrating a condition in which a linear acceleration is applied to the acceleration sensor in a direction parallel to the X axis.

First, as shown in FIG. 25, in a condition in which the acceleration sensor of this embodiment of the present invention is placed in a horizontal position so as to have the first and the second glass substrate 201, 202 be parallel to the XY plane, a linear acceleration "g" is applied to the acceleration sensor in a direction of the voided arrow shown in solid line in FIG. 25.

As a result, due to the force of inertia in the weight 211, a parallel displacement of the weight 211 occurs in a direction opposite to the direction of the voided arrow of FIG. 25 to twist the supporting beams 210, so that the weight 211 stops in a position in which the force of inertia of the weight 211 balances a resilient force exerted by the thus twisted supporting beams 210. Incidentally, at this time, since the supporting beams 208 are parallel to the X axis, these beams 208 are free from any twisting operation.

Shown in FIG. 25 is the relationship in arrangement of the transparent electrodes 203a to 203h and the weight 211. Namely, in the above action, the weight 211 displaces leftward relative to the transparent electrodes 203a to 203h, as viewed in FIG. 25. In order to clarify in illustration the relationship between the weight 211 and the transparent electrodes 203a to 203h, both the supporting post 207 and the supporting frame 209 are omitted from FIG. 25.

In order to facilitate understanding of variations in capacitance of the capacitors C1 to C8 constructed of the transparent electrodes 203a to 203h and the weight 211, the capacitors C1 to C8 are so strictly defined as to be constructed of not only the transparent electrodes 203a to 203h and the weight 211 but also the flat surface portions of the supporting frame 209 facing the transparent electrodes 203a to 203h and the flat surfaces portions of the supporting beams 208, 210 facing the transparent electrodes 203a to 203h.

However, in practice, since both the above-mentioned flat surface portions facing the transparent electrodes 203a to 203h are negligible in area size relative to those of the weight 211 and, therefore substantially do not affect in capacitance the capacitors C1 to C8, it is possible to define that the capacitors C1 to C8 are dependent in capacitance on the area size of the weight 211 facing the transparent electrodes 203a to 203h and do not dependent in capacitance on the above-mentioned flat surface portions of the supporting frame 209 and the supporting beams 208, 210.

In the arrangement shown in FIG. 25: the capacitor C2 is constructed of the transparent electrode 203b and the flat surface portion of the weight 211; and, the capacitor C6 is constructed of the flat surface portion of the weight 211 and the transparent electrode 203f. Each of the capacitors C2, C6 is substantially not affected in capacitance by any other components except the supporting beams 208.

In operation, each of the capacitor C4 (which is constructed of the transparent electrode 203d and the flat surface portion of the weight 211) and the capacitor C8 (which is constructed of the transparent electrode 203h and the flat surface portion of the weight 211) decreases in capacitance when subjected to acceleration. Incidentally, as is clear from FIG. 26, the weight 211 is sandwiched between the pair of the capacitors C4 and C8, each of which has the substantially same construction. This is true as to the other pair of the capacitors which sandwich the weight 211 in between them. These capacitors have the substantially same characteristics in variations of capacitance.

When the acceleration sensor having the above construction is subjected to a linear acceleration parallel to the X axis, each of the capacitors C1, C5, C3 and C7 slightly varies in capacitance by the same amount in theoretical value. Due to this fact, it is possible to substantially omit such variations in capacitance in measurement of the linear acceleration parallel to the X axis.

Consequently, it is possible for the acceleration sensor of the present invention to determine the linear acceleration in amount and direction thereof based on the variations in capacitance of the capacitors C4, C8 relative to those in capacitance of the capacitors C2, C6.

When a linear acceleration is applied to the acceleration sensor of the present invention in a direction opposite to that of the voided arrow shown in FIG. 25, the capacitors C2, C4, C6 and C8 act reversely.

Namely, the capacitors C2, C6 decrease in capacitance, which makes it possible to detect the thus applied linear acceleration in direction and in amount.

Figure 28:
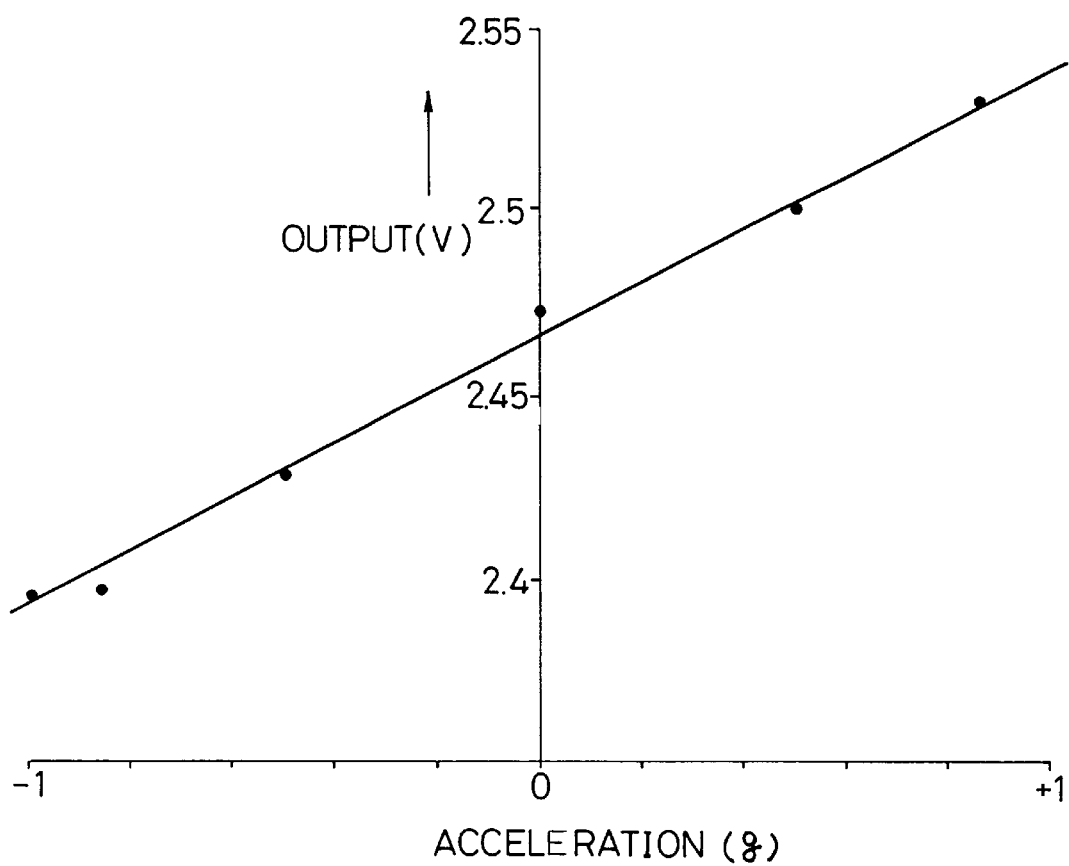
FIG. 28 a graph illustrating variation of output (V) with linear acceleration (g), for the acceleration sensor of the present invention shown in FIG. 15, the variation of output (V) corresponding to the variation in capacitance of the capacitor used in the acceleration sensor.

Shown in FIG. 28 is a graph or characteristic curve of outputs (volts) with linear accelerations (g) of the acceleration sensor of the present invention, the outputs (volts) being dependent on the variations in capacitance of one of the capacitors C1 to C8.

In FIG. 28, measured values are denoted by dots which are substantially aligned along a straight line representing the characteristic curve of the acceleration sensor of the present invention.

Incidentally, variations in capacitance of each of the capacitors C1 to C8 are represented by the following equation:

$$Cg = Co \times (m \times l \times l \times l \times g)/(2 \times E \times b \times d \times d \times d \times do)$$

where:

Cg is a capacitance of the capacitor subjected to a certain amount of acceleration;

Co is an initial capacitance of the capacitor before it is subjected to the acceleration;

m is a mass of the weight 211;

l is a length of each of the supporting beams 208, 210;

g is the amount of the acceleration, to which the capacitor is subjected;

E is the value of Young's modulus for each of the supporting beams 208, 210;

b is a width of each of the supporting beams 208, 210 (see FIG. 18);

d is a height of each of the supporting beams 208, 210; and, do is an initial distance between the weight 211 and each of the transparent electrodes 203a to 203h.

Incidentally, the length "l" of each of the supporting beams 208, 210 is as follows: as for the supporting beams 208, "l"="l1"; and, as for the supporting beams 210, "l"="l2" (see FIG. 19). In the above embodiment of the present invention, "l1" is smaller than "l2".

The above equation clarifies the fact that: when both the width b and the height d are decreased in amount, the capacitance Cg increases. In other words, it is possible to improve the acceleration sensor in sensitivity by changing in cross-sectional configuration each of the supporting beams 208, 210.

More specifically, in order to improve the acceleration sensor in sensitivity to the linear acceleration, it is necessary to decrease the height d.

In operation, for example, as shown in FIG. 25, when the linear acceleration is applied to the acceleration sensor of the present invention in a direction parallel to the Y axis (i.e., in the direction of the voided arrow shown in dotted line of FIG. 25), the weight 211 moves or displaces downward in a direction opposite to that of the linear acceleration due to its mass as is in the above case of the linear acceleration applied in a direction parallel to the X axis. At the same time, the supporting beams 208 also resiliently bend in a direction opposite to the direction of the linear acceleration as is in the case of the supporting beams 208.

Consequently, in this case, variations in capacitance of the capacitors C1, C5 are equal in amount to those of the capacitors C2, C6, while variations in capacitance of the capacitors C3, C7 are equal in amount to those of the capacitors C4, C8, which makes it possible to determine the linear acceleration in direction and in amount.

When the linear acceleration is applied to the acceleration sensor of the present invention in the opposite direction parallel to the Y axis (i.e., in the direction opposite to that of the voided arrow shown in dotted line of FIG. 25), in contrast with the above, the capacitors C1, C5 decrease in capacitance, which makes it possible to determine the linear acceleration in direction and in amount.

Figure 26:
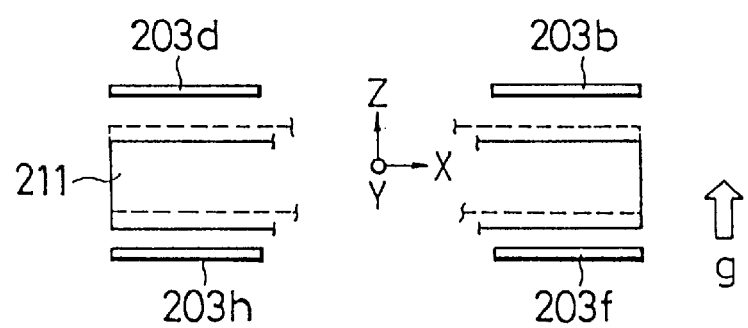
FIG. 26 is a side view of the transparent electrodes and the weight of the acceleration sensor shown in FIG. 15, illustrating a condition in which a linear acceleration is applied to the acceleration sensor in a direction parallel to the Z axis.

As shown in FIG. 26 in which the essential components such as those 203b, 203d, 203f, 203h and 211 of the acceleration sensor of the present invention are enlarged in illustration, when the linear acceleration is applied to the acceleration sensor in the direction of the voided arrow shown in solid line of FIG. 26 (i.e., in a direction parallel to the Z axis), a parallel displacement occurs in the weight 211 due to its mass. At the same time, the supporting beams 208, 210 resiliently bend in a direction opposite to that of the linear acceleration thus applied, so that the weight 211 stops in a position in which a resilient force exerted by the supporting beams 208, 210 thus resiliently bent balances the inertia force of the weight 211 (see FIG. 26). Incidentally, as shown in FIG. 26, an initial position of the weight 211, which is still not subjected to the linear acceleration, is shown in dotted lines.

As a result of application of the above linear acceleration to the acceleration sensor of the present invention, the distance between the weight 211 and each of the transparent electrodes 203a to 203d increases, while that between the weight 211 and each of the transparent electrodes 203e to 203h decreases. Consequently, the capacitors C1 to C4 decrease in capacitance, while the capacitors C5 to C8 increase in capacitance.

When the linear acceleration is applied to the acceleration sensor in a direction opposite to the direction of the voided arrow shown in solid lines of FIG. 26, in contrast with the above case, the distance between the weight 211 and each of the transparent electrodes 203e to 203h increases, while that between the weight 211 and each of the transparent electrodes 203a to 203d decreases. Consequently, the capacitors C1 to C4 increase in capacitance, while the capacitors C5 to C8 decrease in capacitance.

Therefore, through measurement of variations in capacitance of the capacitors C1 to C8, it is possible to determine in direction and in amount the linear acceleration thus applied to the acceleration sensor of the present invention.

Figure 27:
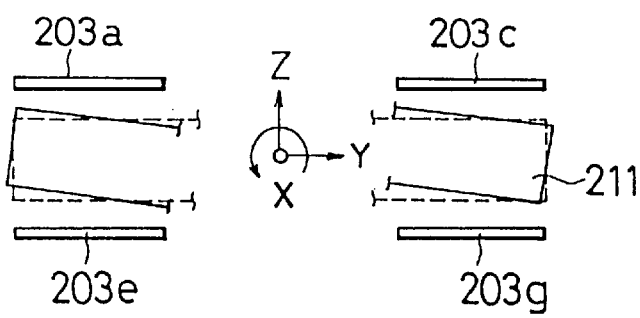
FIG. 27 is a side view of the transparent electrodes and the weight of the acceleration sensor shown in FIG. 15, illustrating a condition in which the acceleration sensor is subjected to an angular acceleration about the Y axis.

As shown in FIG. 27 in which the essential components such as those 203a, 203c, 203e, 203g and 211 of the acceleration sensor of the present invention are enlarged in illustration, when an angular acceleration is applied about the X axis to the acceleration sensor (i.e., in the direction of the arrow shown in solid lines of FIG. 27), the weight 211 rotates about a longitudinal axis of the supporting beams 208 to have one of its opposite sides (which one is interposed between the transparent electrodes 203a, 203e) brought near the transparent electrode 203a, and the other of its opposite sides (the other of which is interposed between the transparent electrodes 203c, 203g) brought near the transparent electrode 203g, so that the weight 211 stops in a position in which a resilient force exerted by the supporting beams 208 thus resiliently bent balances the inertia force of the weight 211, as shown in FIG. 27 in solid lines. Incidentally, In FIG. 27, the initial position of the weight 211, which is still not subjected to the angular acceleration, is shown in dotted lines.

As a result of application of such angular acceleration about the longitudinal axis of the supporting beams 208, each of the capacitors C1, C7 increases in capacitance, while each of the capacitors C3, C5 decreases in capacitance.

When the angular acceleration about the longitudinal axis of the supporting beams 208 is applied to the acceleration sensor in a direction opposite to that of the above case, the weight 211 rotates about such longitudinal axis in the direction opposite to that shown in FIG. 27 to have one of its opposite sides (which one is interposed between the transparent electrodes 203a, 203e) brought near the transparent electrode 203e, and the other of its opposite sides (the other of which is interposed between the transparent electrodes 203c, 203g) brought near the transparent electrode 203c.

As a result, each of the capacitors C1, C7 decreases in capacitance, while each of the capacitors C3, C5 increases in capacitance.

Consequently, it is possible to determine the angular acceleration in direction and in amount based on variations in capacitance of the capacitors C1, C3, C5 and C7.

When the angular acceleration about the Y axis is applied to the acceleration sensor, the substantially same action as that of the above case (in which the angular acceleration about the X axis is applied to the acceleration sensor) occurs. Namely, as is clear from FIG. 27, upon application of the angular acceleration about the Y axis, the weight 211 rotates about the longitudinal axis of the supporting beams 210 to increase the capacitors C2, C4, C6, C8 in capacitance, which makes it possible to determine the thus applied angular acceleration in direction and in amount.

Figure 29:
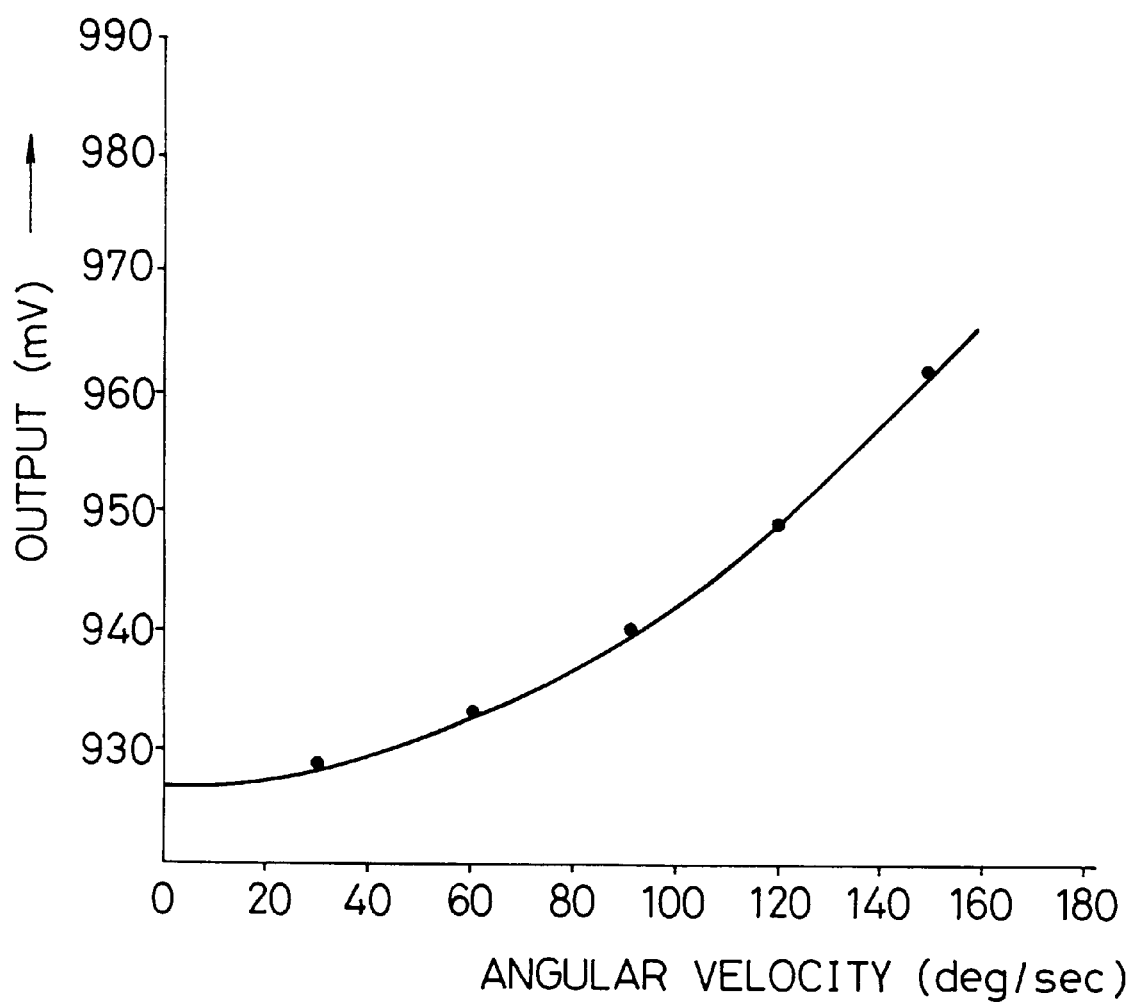
FIG. 29 is a graph illustrating variation of output (mV) with angular velocity (deg/sec), for the acceleration sensor of the present invention shown in FIG. 15, the variation of output (mV) corresponding to the variation in capacitance of the capacitor used in the acceleration sensor.

Shown in FIG. 29 is a graph or characteristic curve of outputs (mV) with angular velocity (deg/sec) of the acceleration sensor of the present invention, the outputs (mV) being dependent on the variations in capacitance of one of the capacitors C1 to C8.

In FIG. 29, measured values are denoted by dots which are substantially aligned along the characteristic curve of the acceleration sensor of the present invention.

Incidentally, the relationship between the angular velocity and the variations in capacitance of each of the capacitors C1 to C8 is represented by the following equation:

$$C\omega = C o \times (l + l(12 \times l \times m \times r \times r \times r \times \omega \times \omega)/(G \times b \times d \times (b \times b + d \times d) \times do)$$

where:

Cω is a capacitance of the capacitor subjected to a certain amount of angular velocity "ω";

Co is an initial capacitance of the capacitor before it is subjected to the acceleration;

m is a mass of the weight 211;

l is a length of each of the supporting beams 208, 210;

ω is the amount of the angular velocity, to which the capacitor is subjected;

G is the value of shear modulus for each of the supporting beams 208, 210;

b is a width of each of the supporting beams 208, 210 (see FIG. 18);

d is a height of each of the supporting beams 208, 210; and, do is an initial distance between the weight 211 and each of the transparent electrodes 203a to 203h.

Incidentally, the length "l" of each of the supporting beams 208, 210 is as follows: as for the supporting beams 208, "l"="l1"; and, as for the supporting beams 210, "l"= "l2" (see FIG. 19). In the above embodiment of the present invention, "l1" is smaller than "l2".

The above equation clarifies the fact that: when both the width b and the height d are decreased in amount, the capacitance Cω increases. In other words, it is possible to improve the acceleration sensor in sensitivity by changing in cross-sectional configuration each of the supporting beams 208, 210.

More specifically, in order to improve the acceleration sensor in sensitivity to both the angular velocity and the linear acceleration, it is necessary to decrease the width b.

Since the angular acceleration represents the rate of change in angular velocity measured in radians per second per second, determination of the angular velocity makes it possible to determine the angular acceleration.

Incidentally, in general, the angular acceleration is accompanied with the linear acceleration substantially without fail. They are combined in the majority of cases.

Consequently, in use, it is preferable for the acceleration sensor of this embodiment of the present invention to be inclined at an angle of 45 degrees with respect to the Z axis, which facilitates analyses of the linear acceleration and the angular acceleration about every axis through determination of variations in capacitance of each of the capacitors C1 to C8.

Now, with reference to FIGS. 30 to 33, a second embodiment of the acceleration sensor according to the second aspect of the present invention will be described.

This second embodiment of the acceleration sensor is of a so-called triplex type in which the weight 232 is sandwiched between a pair of the glass substrates 230, 231 as is in the case of the acceleration sensor shown in FIG. 15, and differs therefrom in the arrangement of capacitors for detecting the linear and the angular acceleration.

Figure 30:
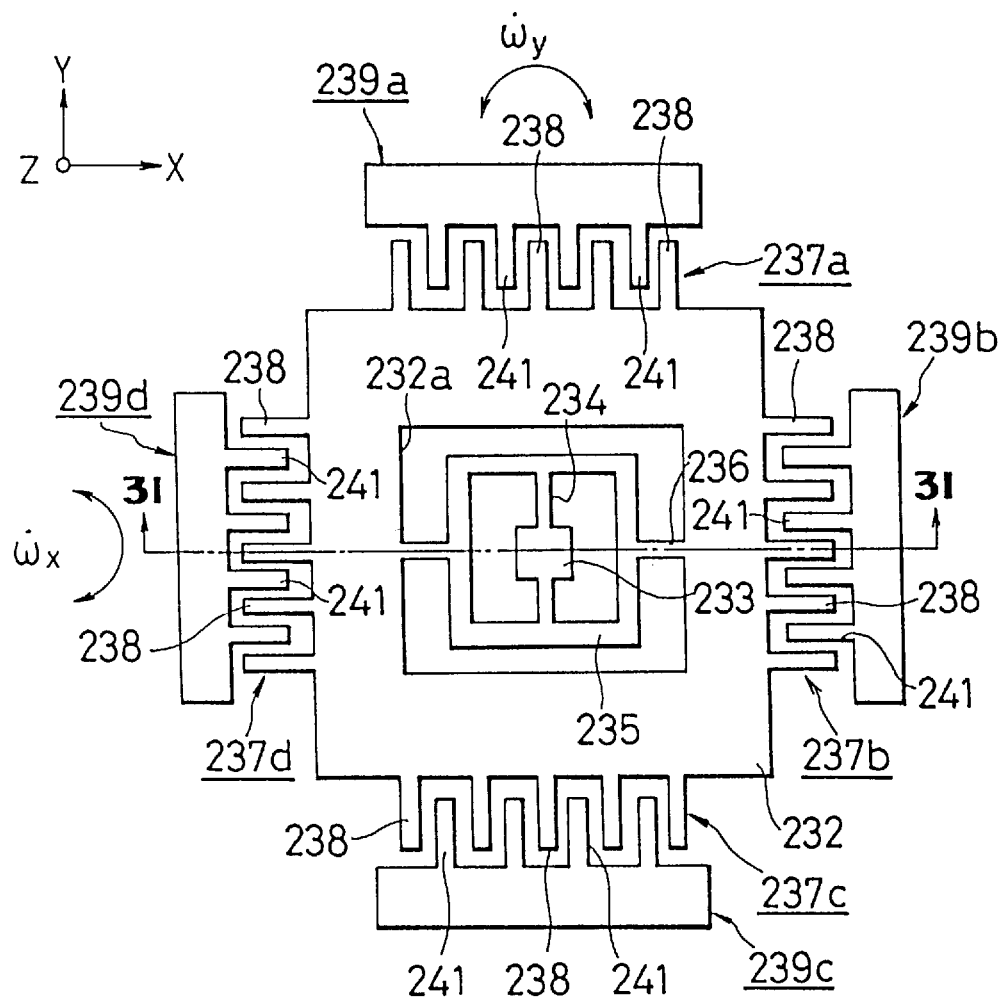
FIG. 30 is a plan view of an essential part of the acceleration sensor of a second embodiment according to the second aspect of the present invention shown in FIG. 15.

Incidentally, as for FIG. 30: the Z axis is perpendicular to the plane of the paper; the X axis is horizontal as viewed in FIG. 30; and, the Y axis is vertical as viewed in FIG. 30.

Sandwiched between the first glass substrate 230 and the second glass substrate 231 is the weight 232 which is displaced when subjected to the linear of the angular acceleration. As described later, a plurality of capacitors are formed in an outer peripheral portion of the weight 232 (see FIGS. 30 and 31).

Figure 31:
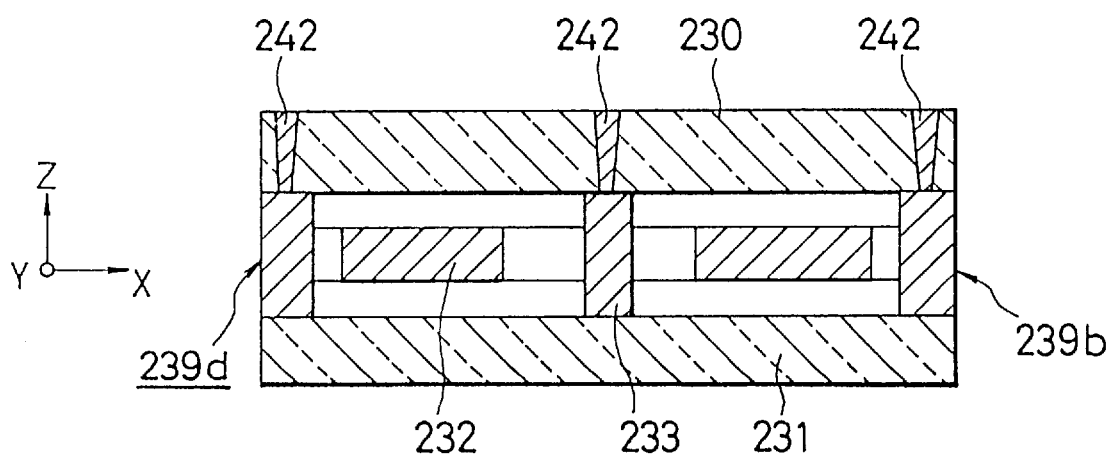
FIG. 31 a cross-sectional view of the acceleration sensor of the second embodiment of the present invention, taken along the line B—B of FIG. 30.

Provided in the center of the weight 232 is the central supporting post 233 which has its opposite end surfaces bonded to the first and the second glass substrate 230, 231 (see FIG. 31).

As shown in FIG. 30, the supporting beams 234 extend from the centers of outer surfaces of the opposite sides of the central supporting post 233 in a direction parallel to the Y axis so as to intersect the longitudinal axis of the central supporting post 233, which longitudinal axis is perpendicular to the plane of the paper in FIG. 30. The supporting frame 235, which assumes a substantially square shape as shown in FIG. 30, is integrally connected or bonded to the opposite outer end portions of the supporting beams 234. Incidentally, the opposite outer end portions of the supporting beams 234 are bonded to the centers of opposite sides of the supporting frame 235, the opposite sides being perpendicular to the Y axis, as shown in FIG. 30.

Further, another pair of the supporting beams 236 extend from the centers of outer surfaces of the other opposite sides of the supporting frame 235 in a direction parallel to the X axis.

Then, the supporting beams 236 has its opposite outer end portions bonded to the centers of inner surfaces of the opposite sides of the opening portion 232a of the weight 232, the opening portion 232a assuming a substantially square shape.

The weight 232 assumes a flat frame-like shape and is provided with a plurality of comb-type electrodes 237a, 237b, 237c, 237d in its outer peripheral portion.

Each of the comb-type electrodes 237a to 237d is constructed of a plurality of electrode segments 238 which extend outward in a direction perpendicular to the outer peripheral surface of the weight 232. Each of the electrode segments 238 assumes a flat rectangular shape in the XY and the YZ plane. These electrode segments 238 are parallelly spaced apart from each other at equal intervals and extend perpendicularly from the outer surface of the weight 232.

Incidentally, all the supporting beams 234, supporting frame 235, supporting beams 236, weight 232 and the comb-type electrodes 237a to 237d are the same in thickness (which is measured in the Z axis). This thickness is smaller than that of the central supporting post 233, as shown in FIG.

31. In production, all the central supporting post 233, supporting beams 234, supporting frame 235, supporting beams 236, weight 232 and the comb-type electrodes 237a to 237d are integrally produced from a single piece of silicon.

On the other hand, as is clear from FIG. 30, a plurality of fixed comb-type electrodes 239a to 239d are disposed outside the weight 232 so as to surround the same, and combined with the above-mentioned comb-type electrodes 237a to 237d to form a plurality of capacitors.

Figure 32:
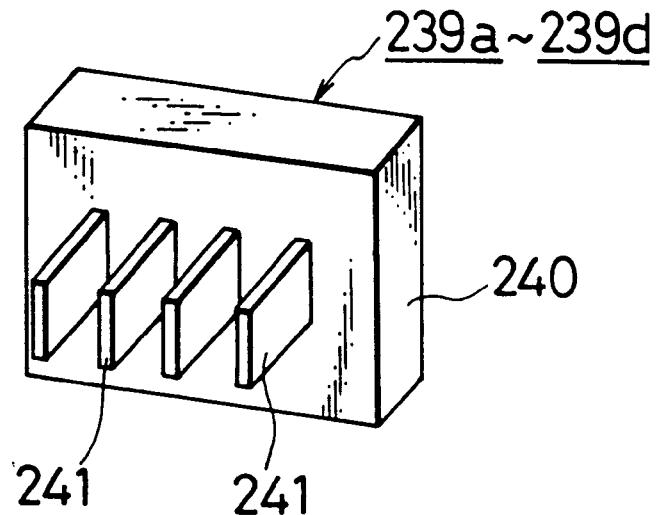
FIG. 32 is a perspective view of a comb-type fixed electrode of the acceleration sensor of the present invention shown in FIG. 30.

These fixed comb-type electrodes 239a to 239d are also made of silicon. As shown in FIG. 32, each of these electrodes 239a to 239d is provided with a base portion 240 forming a rectangular parallelepiped. A plurality of electrode segments 241, each of which has the substantially same shape as that of each of the electrode segments 238 forming the comb-type electrodes 237a to 237d, extend perpendicularly from an inner surface of each of the fixed comb-type electrodes 239a to 239d in a condition in which they are parallelly spaced apart from each other by equal intervals.

The base portion 240 has the same thickness as that of the central supporting post 233, the thickness being measured in the Z axis. The base portion 240 has its opposite end surfaces bonded to the first and the second glass substrate 230, 231, as shown in FIG. 31.

Incidentally, in this embodiment of the present invention, the number of the electrode segments 238 forming the comb-type electrodes 237a to 237d is five, which is larger than the number of the electrode segments 241 by one, the segments 241 forming the fixed comb-type electrodes 239a to 239d by one.

In assembly operations, as is clear from FIG. 30, each of the electrode segments 238 of the comb-type electrodes 237a to 237d is interposed between a pair of adjacent ones of the electrode segments 241 of the fixed comb-type electrodes 239a to 239d, and vice versa.

Further, in the above assembly operations, the front-end portions of the electrode segments 238 of the comb-type electrodes 237a to 237d are slightly spaced apart from the corresponding front-end portions of the electrode segments 241 of the comb-type electrodes 239a to 239d (see FIG. 30).

As described above, these comb-type electrodes make it possible to increase an effective area of the opposite electrodes of each of the so-called plate capacitors in a minimum space.

In a condition in which both the central supporting post 233 and the base portion 240 of the fixed comb-type electrodes 239a to 239d are bonded to the first and the second glass substrate 230, 231 so as to be sandwiched therebetween, both the central supporting post 233 and the fixed comb-type electrodes 239a to 239d are connected with external circuits (not shown) through wires passing through the wiring-connection through-holes 242 of the first glass substrate 230 (see FIG. 31).

Namely, inserted in each of the wiring-connection through-holes 242 are a wire (not shown) and packing materials such as aluminum and like electrically-conductive materials, so that ohmic contacts are made between such packing materials and the corresponding central supporting post 233 made of silicon and the corresponding base portion 240 of the fixed comb-type electrodes 239a to 239d, the base portion 240 being made of silicon, whereby the wire are electrically connected with the central supporting post 233 and the fixed comb-type electrodes 239a to 239d.

Figure 33:
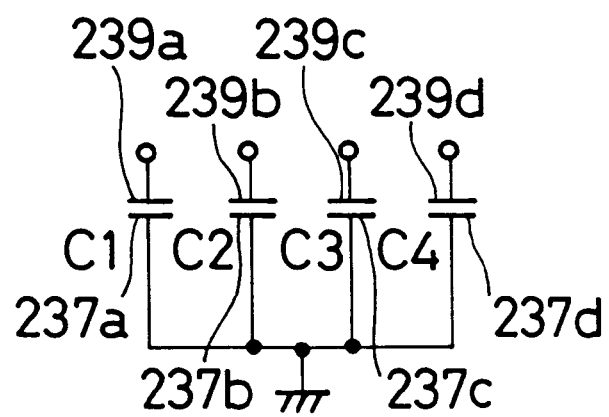
FIG. 33 is a schematic diagram of an electrical equivalent circuit of the acceleration sensor of the present invention shown in FIG. 30.

The central supporting post 233 is ground in the outside through wire (not shown). A a result, the comb-type electrodes 237a to 237d and the fixed comb-type electrodes 239a to 239d are so combined as to form an equivalent circuit construction of the capacitors C1 to C4, as shown in FIG. 33.

Incidentally, all the central supporting post 233, supporting beams 234, supporting frame 235, supporting beams 236, weight 232, comb-type electrodes 237a to 237d and fixed comb-type electrodes 239a to 239d are hermetically sealed between the first glass substrate 230 and the second glass substrate 231, because an opening portion (not shown) between the first and the second glass substrate 230, 231 are closed by a suitable member made of silicon and the like.

Further, in the acceleration sensor of the present invention having the above construction, it is also possible to replace the first and second glass substrate 230, 231 with any other suitable insulating substrates made of suitable material. The weight 232, which is made of silicon, may be made of any other suitable material such as semiconductors and conductors.

Then, the embodiment of the present invention having the above contraction will be described in operation.

When a linear acceleration is applied to the acceleration sensor of the present invention in a direction parallel to the Z axis, the weight 232 moves in a direction opposite to that of the linear acceleration due to its mass, and stops in a position in which the inertia force of the weight 232 balances with a resilient force exerted by the supporting beams 234, 236, which are resiliently twisted under the influence of the linear acceleration thus applied.

The electrode segments 238 and 241 of the comb-type and the fixed comb-type electrodes 237a to 237d and 239a to 239d decrease in their facing area size as the weight 232 moves, so that the capacitors C1 to C4 decrease in capacitance, which makes it possible to determine the amount of the linear acceleration thus applied.

When an angular acceleration about the Y axis is applied to the acceleration sensor, the supporting beams 234 are resiliently twisted to permit the weight 232 to rotate on the longitudinal axis of the supporting beams 234.

In this case, for example, when an angular acceleration is applied to the acceleration sensor clockwise as viewed in FIG. 31, a left half of the weight 232 is displaced downward relative to the central supporting post 233 (i.e., in a direction opposite to the angular acceleration) due to a mass of the weight 232, while a right half of the weight 232 is displaced upward by the same amount of that of the left half, so that the weight 232 stops in a position in which the inertia force of the weight 232 balances with a resilient force exerted by the thus twisted supporting beams 234.

As a result, the electrode segments 238 and 241 of the comb-type and the fixed comb-type electrodes 237b, 237d and 239b, 239d decrease in their facing area size as the weight 232 moves, so that the capacitors C2 to C4 decrease in capacitance. At this time, also the electrode segments 238 and 241 of the comb-type and the fixed comb-type electrodes 237a, 237c and 239a, 239c decrease in their facing area size so that the capacitors C1, C3 decrease in capacitance by certain amounts smaller than those of the capacitors C2, C4. This is because the comb-type electrodes 237a, 237c are smaller in amount of displacement than the comb-type electrodes 237b, 237d.

Consequently, it is possible to determine the amount of the angular acceleration about the Y axis by comparing the variations in capacitance of the capacitors C1, C3 with those in capacitance of the capacitors C2, C4.

On the other hand, when the acceleration sensor is subjected to an angular acceleration about the X axis, the supporting beams 236 are resiliently twisted in place of the supporting beams 234 to permit the weight 232 rotates on the longitudinal axis of the supporting beams 236. The effect of this twisting operation is the substantially same as that of the twisting operation of the supporting beams 234 twisted on the longitudinal axis parallel to the Y axis, and, therefore will not be described again in detail. This twisting operation differs from the former only in that the capacitors C1, C3 are larger in variation of capacitance than the capacitors C2, C4 in contrast with the above case, which makes it possible to identify the thus applied acceleration as an angular acceleration about the X axis and to determine the amount thereof.

Incidentally, clearances between the electrodes segments 238 of the comb-type electrodes 237a to 237d and those 241 of the fixed comb-type electrodes 239a to 239d are so defined as to prevent adjacent ones of the electrode segments from contacting each other even when a maximum possible linear acceleration or angular acceleration is applied to the acceleration sensor.

In general, the linear acceleration accompanies the angular acceleration. In most cases, they are combined in action. Consequently, by previously analyzing variations in capacitance of the capacitors C1 to C4 when these capacitors are subjected to known-amount linear and angular accelerations simultaneously, it is possible to identify various types of linear and angular accelerations even when these accelerations applied the acceleration sensor simultaneously.

As described above, in the acceleration sensor of this embodiment, it is possible to detect a linear acceleration in a direction parallel to one axis and a pair of angular accelerations about a pair of axes.

Incidentally, also in this embodiment, it is possible to control in sensitivity of the acceleration sensor by changing in cross-sectional shape of each of the supporting beams 234, 236, taken along the Z axis.

Now, a third embodiment of the acceleration sensor according to the second aspect of the present invention will be described with reference to FIGS. 34, 35(a) and 35(b).

In this third embodiment of the present invention: the weight is sandwiched between a pair of the glass substrates; and, the transparent electrodes are mounted on the glass substrates to cooperate with the weight so as to form the capacitors therebetween. In this respect, the third embodiment of the acceleration sensor has the substantially same construction as that of the acceleration sensor shown in FIG. 15, except the provision of a plurality of through-holes in predetermined portions in the third embodiment for controlling the capacitors in capacitance as described later.

The weight 250 serving as a weight member is supported in the same manner as shown in FIG. 30. Consequently, the same reference characters as those used in FIG. 30 will be also used in FIG. 34 as to the same components, description of which will be therefore omitted to clarify differences between the embodiment shown in FIG. 30 and the embodiment shown in FIG. 34.

Figure 34:
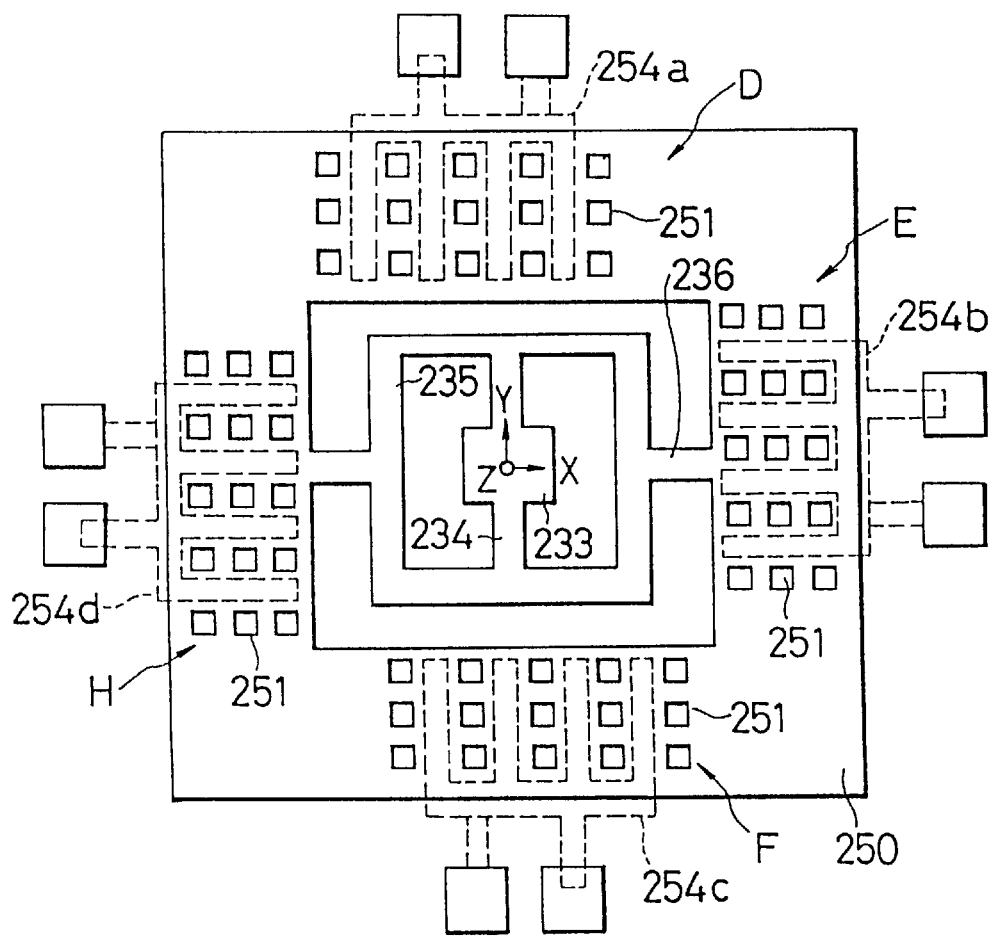
FIG. 34 is a plan view of an essential part of a third embodiment according to the second aspect of the present invention.

As is clear from FIG. 34, the weight 250, which is made of silicon, assumes a substantially square shape provided with four sides D, E, F and G, in each of which sides a plurality of through-holes 251 are provided.

On the other hand, a plurality of the comb-type electrodes 254a to 254h are mounted on an inner surface of each of the first glass substrate 252 and the second glass substrate 253 so as to sandwich each of the four sides D, E, F and G of the weight 250 therebetween, and are connected with the outside circuit (not shown) through a suitable wiring (not shown).

Each of the through-holes 251 of the weight 250 is disposed in a position corresponding to a center of adjacent ones of a plurality of branch segments 255 of the comb-type transparent electrodes 254a to 254h in a condition in which the weight 250 is free from any acceleration. Incidentally, as shown in FIG. 34, the comb-type transparent electrodes 254a to 254d are shown in dotted lines.

On the other hand, the central supporting post 233 is grounded in the outside as is in the embodiment shown in FIG. 30, so that the capacitors C1 to C8 are formed between the comb-type transparent electrodes 254a to 254h and the corresponding surfaces of the weight 250.

Figure 35A:
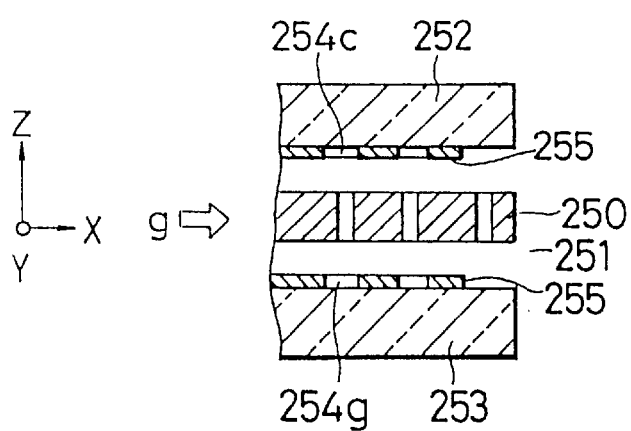
FIG. 35(a) is a partially broken side view of the transparent comb-type electrodes and the weight of the acceleration sensor of the present invention shown in FIG. 34 in a condition in which the acceleration sensor is still not subjected to a linear acceleration in a direction parallel to the X axis.

As for the acceleration sensor of the present invention having the above construction, for example, when the sensor is subjected to a linear acceleration in the direction of the voided arrow of FIG. 35(a) parallel to the X axis, the weight 250 is displaced leftward opposite to the direction of the voided arrow due to its mass and stops in its balanced position. As a result, as shown in FIG. 35(b), each of the through-holes 251 of the weight 250 moves into a position corresponding to a center of each of a plurality of branch segments 255 of the comb-type transparent electrodes 254a to 254h.

Figure 35B:
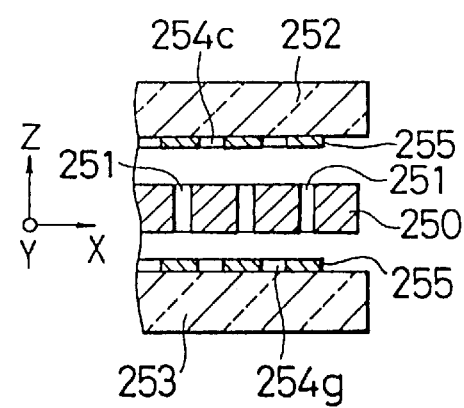
FIG. 35(b) is a partially broken side view of the transparent comb-type electrodes and the weight of the acceleration sensor of the present invention shown in FIG. 34 in a condition in which the acceleration sensor is already subjected to a linear acceleration in a direction parallel to the X axis.

At this time, when the weight 250 reaches its maximum displacement point, as shown in FIG. 35(b), the through-holes 251 are sandwiched between: the comb-type transparent electrodes 254a and 254e; and, the comb-type transparent electrodes 254c and 254g, respectively. When the amount in displacement of the weight 250 decreases, the sandwiched area size of the through-holes 251 also decreases.

As a result, the capacitors C1, C3, C5, C7 vary in capacitance, which makes it possible to determine the thus applied linear acceleration in amount.

When the linear acceleration is applied to the acceleration sensor in a direction parallel to the Y axis, the capacitors C2, C4, C6, C8 vary in capacitance as is in the case of the above capacitors subjected to the linear acceleration applied in a direction parallel to the X axis, which makes it possible to determine the linear acceleration in amount.

Incidentally, as described above, through-holes 251 function to control the capacitors in capacitance. In addition to this, the through-holes 251 also function to damp the displacement movement of the weight 250. In other words, it is possible to control the movement of the weight 250 by controlling the number of the through-holes 251.

When the linear acceleration is applied to the acceleration sensor in a direction parallel to the Z axis, the weight 250 moves in a direction opposite to the direction of the linear acceleration due to its mass. Consequently, as is clear from FIGS. 35(a) and 35(b), the clearances between the comb-type electrodes 254a–e and the weight 250 decrease, while the clearances between the comb-type electrodes 254a–d and the weight 250 increase. Consequently, the capacitors constructed of the comb-type transparent electrodes 254e–h and the weight 250 increase in capacitance, while the capacitors constructed of the comb-type transparent electrodes 254a–d and the weight 250 decrease in capacitance, which makes it possible to determine the linear acceleration in amount and direction thereof.

In FIG. 34, when an angular acceleration about the X axis is applied to the acceleration sensor counterclockwise, the weight 250 rotates on the longitudinal axis of the supporting beams 236 clockwise due to its mass relative to the central supporting post 233. Namely, in a direction perpendicular to the paper, an upper half of the weight 250 moves down and a lower half of the same moves up in FIG. 34.

As a result, the capacitors C3, C5 increases in capacitance while the capacitors C1, C7 decrease in capacitance, which makes it possible to determine the angular acceleration in amount and direction thereof.

Incidentally, when the angular acceleration about the X axis is applied to the acceleration sensor clockwise, the weight rotate counter clockwise on the longitudinal axis of the supporting beams 236. As a result, the capacitors C1, C7 increase in capacitance while the capacitors C3, C5 decrease in capacitance, which makes it possible to determine the angular acceleration in amount and direction thereof.

When an angular acceleration about the Y axis is applied to the acceleration sensor, the weight rotates on the longitudinal axis of the supporting beams 234, so that the substantially same action as that in the above case occurs. Therefore, detailed description of such action may be omitted.

As a result, it is possible to determine the angular acceleration about the Y axis in amount and direction thereof as is in the case of the angular acceleration about the X axis.

When an angular acceleration about the Z axis is applied to the acceleration sensor, both the supporting beams 234, 236 are resiliently deformed to permit the weight 250 to move in a direction opposite to the direction of the angular acceleration due to its mass. In other words, the weight 250 rotates on the longitudinal axis of the central supporting post 233 to vary in sandwiched area size the through-holes 251 between the comb-type transparent electrodes 254a to 254h.

Namely, the capacitors C1 to C8 decrease in capacitance as the weight 250 is displaced, the decreases in capacitance making it possible to determine the angular acceleration in amount.

As described above, the acceleration sensor of the third embodiment according to the second aspect of the present invention is relatively simple in construction, and capable of detecting the linear acceleration in at least two directions and the angular acceleration about at least three axes, and further capable of saving the number of components for detecting the linear and the angular acceleration in a plurality of directions and about a plurality of axes, which enables the acceleration sensor of the present invention to be produced at low cost.

Incidentally, also in this embodiment of the present invention, as is in the acceleration sensor shown in FIG. 15, it is possible to control the sensor in sensitivity by controlling each of the supporting beams 234, 236 in cross-sectional shape.

Further, in the acceleration sensor having the above construction, it is also possible to use any other suitable insulating substrates in place of the first and the second glass substrate 252, 253. It is also possible to replace the weight 250 with any other suitable weight member made of semiconductors or electrically-conductive materials. As described above, in the acceleration sensor of the present invention: the weight is made of semiconductors or electrically-conductive materials; and, the weight is mounted between a pair of the insulating substrates so as to be movable. Consequently, as for the weight made of semiconductors, it is possible to use a so-called micromachining techniques in production of the acceleration sensor of the present invention, which makes it possible to produce the acceleration sensor on a large-scale basis.

Further, it is possible for a single piece of acceleration sensor of the present invention to detect a linear acceleration together with a plurality of angular acceleration about at least two axes. Consequently, in case that information of both the linear acceleration and the angular accelerations about each of axes with respect to the moving object such as automobiles in a three-dimensional coordinate system is required, it is possible to meet such requirement by combining three pieces of the acceleration sensors of the present invention, the number of which is far smaller than that of the conventional acceleration sensors.

According to the method of producing the acceleration sensor of the present invention described with reference to FIGS. 21(a) to 24(b), in hermetically sealing process of the interior of the acceleration sensor, gases produced inside the acceleration sensor are absorbed by the getter agent to prevent a pressure in the interior of the acceleration sensor from varying. Consequently, it is possible for the acceleration sensor of the present invention to keep the interior thereof at a predetermined pressure, which improves the acceleration sensor of the present invention in production yield and in quality.

Further, in the acceleration sensor of the second embodiment according to the second aspect of the present invention, both the electrodes mounted on the weight and the fixed electrodes are formed into comb-type shapes oppositely disposed from each other. Consequently, it is possible for the acceleration sensor of the present invention to increase its effective area size while saving the space thereof, which increases the capacitance of the acceleration sensor to facilitate detecting variations in capacitance, i.e., to improve the acceleration sensor in sensitivity.

Further, in the acceleration sensor of the third embodiment according to the second aspect of the present invention, the capacitors are formed between the electrodes and the corresponding flat surfaces of the weight, so that: in addition to the variations in capacitance of the capacitors due to variations in clearance size between the electrodes and such flat surfaces (which occur when the weight is displaced), additional variations in capacitance of the capacitors also occur by the provision of the comb-type electrodes and the provision of the through-holes in the flat surfaces of the weight, even when the weight is displaced in a direction parallel to the electrodes. Consequently, it is possible for the acceleration sensor of the present invention to detect linear accelerations in at least three directions and angular accelerations about at least three axes by the use of a possible minimum components, which makes it possible to reduce the manufacturing cost of the acceleration sensor of the present invention.

Now, a first embodiment of the acceleration sensor according to a third aspect of the present invention will be described with reference to FIGS. 36 to 42(b), particularly FIGS. 36 to 38(b).

Figure 36:
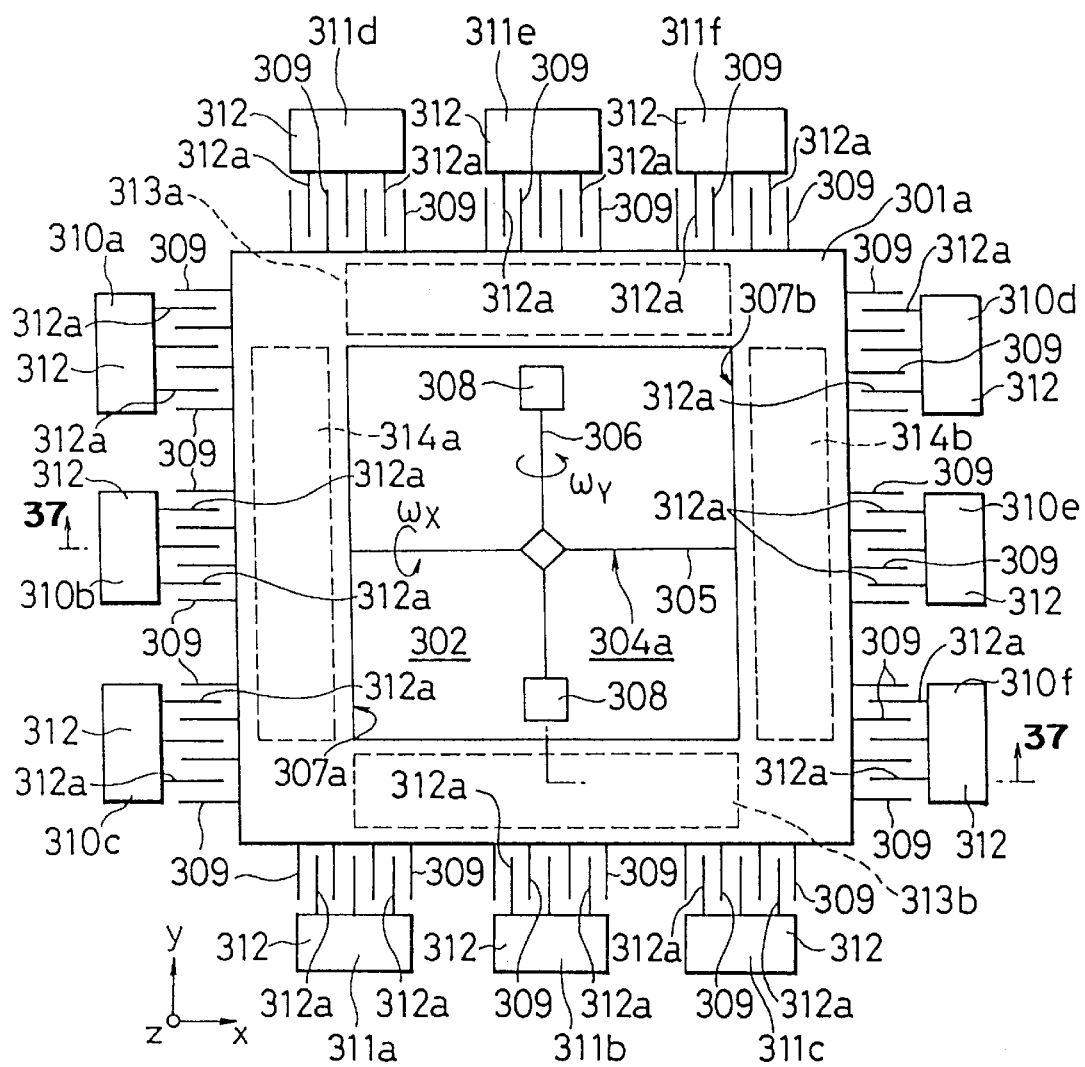
FIG. 36 is a plan view of an essential part of a multi-axis acceleration sensor of a first embodiment according to a third aspect of the present invention.

Incidentally, for convenience of description, in FIG. 36: a horizontal line extends in a direction parallel to the X axis; a vertical line extends in a direction parallel to the Y axis; and, the Z axis is perpendicular to the paper.

In this multi-axis acceleration sensor, the weight and like components are produced by using the anisotropic etching process of polycrystalline silicon substrate.

Namely, as is clear from FIG. 36, the weight 301a assumes a flat plate-like rectangular shape in the XY plane. In this embodiment of the acceleration sensor, it assumes a substantially square shape in outline thereof and is provided with an opening portion 302 in its central portion. The opening portion 302 also assumes a substantially square shape.

This weight 301a is supported by the supporting beam 304a so as to be spaced apart from an upper surface of the silicon substrate 303a by a predetermined distance.

The supporting beam 304a is a cross-shaped single-piece member provided with a first axle portion 305 and a second axle portion 306, which intersects the first axle portion 305 at right angles. Opposite outer ends of the first axle portion 305 of the supporting beam 304a are bonded to the substantially central points of corresponding opposite inner walls 307a, 307b of the opening portion 302 of the weight 301a. On the other hand, opposite outer ends of the second axle portion 306 of the supporting beams 304a are bonded to a pair of supporting projections or posts 308. As is clear from FIG. 37, the supporting posts 308 are perpendicular to the upper surface of the silicon substrate 303a and project upward therefrom. Further, the first axle portion 305 has its longitudinal axis aligned with a horizontal center line of the weight 301a, as viewed in FIG. 36. Incidentally, it is possible to control the amount of displacement of the weight by controlling both the first and the second axle portion 305, 306 in length, width and thickness, whereby the acceleration sensor is controlled in sensitivity.

Integrally projected from an outer peripheral surface of the weight 301a are a plurality of fin-like electrode segments 309, parallelly disposed between adjacent ones of which segments 309 is each of the electrode segments 312a of the X-axis electrodes 310a to 310f and the Y-axis electrodes 311a to 311f to provide a capacitance.

In this embodiment of the present invention, three sets of four pieces of the electrode segments 309 are provided in each of four outer sides of the weight 301 so as to be spaced apart from each other at predetermined equal intervals. In each of the sets of four pieces of the electrode segments 309, the electrode segments 309 are also spaced apart from each other at predetermined equal intervals.

Each of the electrode segments 309 assumes a rectangular shape in the XZ or the YZ plane, while assuming a fin-like shape in the XY plane as viewed in FIG. 36.

A plurality of the X-axis electrodes 310a to 310f and the Y-axis electrodes 311a to 311f are fixedly mounted on the upper surface of the silicon substrate 303a so as to surround the weight 301a. More specifically, the first to the third ones 310a to 310c of the X-axis electrodes and the fourth to the sixth ones 310d to 310f of the X-axis electrodes, each of which is made of polycrystalline silicon, are provided in the vicinities of opposite outer Y-axis sides of the weight 301a, the Y-axis sides being parallel to the Y axis.

On the other hand, the first to the third ones 311a to 311c of the Y-axis electrodes and the fourth to the sixth ones 311d to 311f of the Y-axis electrodes, each of which is made of polycrystalline silicon, are provided in the vicinities of opposite outer X-axis sides of the weight 301a, the X-axis sides being parallel to the X axis.

Each of the first to the sixth X-axis electrodes 310a to 310f and the first to the sixth Y-axis electrodes 311a to 311f is constructed of three parallel pieces of the electrode segments 312a which are spaced apart from each other at predetermined equal intervals in an inner surface of each of the rectangular-solid base portions 312. Namely, as for the first to the sixth X-axis electrodes 310a to 310f, the above-mentioned inner surface extends in a direction parallel to the Y axis. On the other hand, as for the first to the sixth Y-axis electrodes 311a to 311f, the above-mentioned inner surface extends in a direction parallel to the X axis. These electrode segments 312a extend inwardly from the above-mentioned inner surfaces to assume the substantially same shape as those of the electrode segments 309 of the weight 301a described above.

More specifically, as is clear from FIG. 36, in each of the base portions 312, the electrode segments 312a are spaced parallelly and alternately with the electrode segments 309 projecting from the the outer side of the weight 301a.

Figure 37:
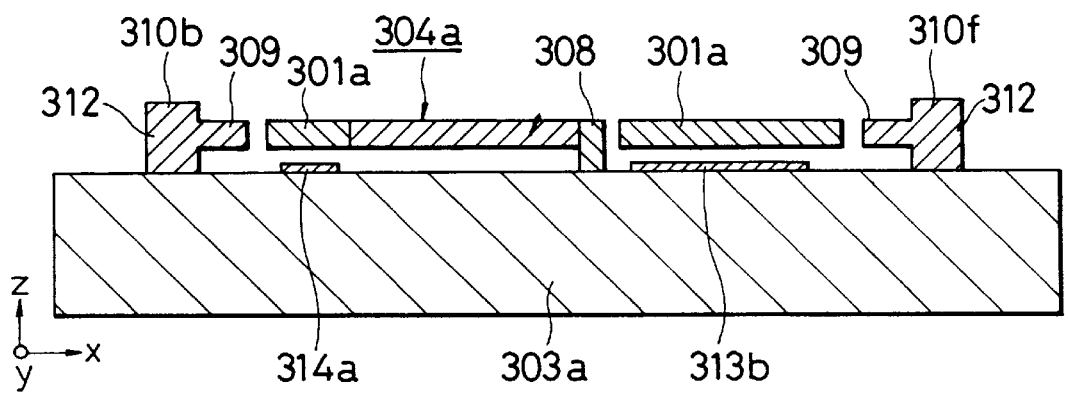
FIG. 37 is a cross-sectional view of the multi-axis acceleration sensor of the present invention, taken along the line A—A of FIG. 36.

Further, the first to the sixth X-axis electrodes 310a to 310f and the first to the sixth Y-axis electrodes 311a to 311f have the inner ends of their electrode segments 312a spaced apart from the outer peripheral surfaces of the weight 301a by a predetermined distance, and are fixedly mounted on the upper surface of the silicon substrate 303a, as shown in FIGS. 36 and 37.

Consequently, a capacitance is provided between: each of the first to the sixth X-axis electrodes 310a to 310f and the first to the sixth Y-axis electrodes 311a to 311f; and, the corresponding one of the electrode segments 309 of the weight 301a, which makes it possible to determine the linear acceleration and the angular velocity base on variations of the above capacitance.

As shown in FIG. 36 in dotted lines, further mounted on the upper surface of the silicon substrate 303a are: a pair of X-axis angular velocity electrodes 313a, 313b, which are made of polycrystalline silicon and oppositely disposed from the lower surfaces of opposite X-axis side portions of the weight 301a; and, a pair of Y-axis angular velocity electrodes 314a, 314b, which are made of polycrystalline silicon and oppositely disposed from the lower surfaces of opposite Y-axis side portions of the weight 301a. These angular velocity electrodes 313a, 313b, 314a, 314b cooperate with the weight 301a to provide a capacitance, variations in amount of which capacitance makes it possible to determine the angular acceleration.

In operation, when a linear acceleration is applied to the acceleration sensor upward in a direction perpendicular to the paper in FIG. 36, the weight 301a is displaced downward due to its mass or inertia force.

As a result, clearances between the weight 301a and the X-axis angular velocity electrodes 313a, 313b vary to vary the capacitance therebetween, which makes it possible to determine in amount the linear acceleration (which is applied in a direction parallel to the Z axis) by detecting the variations in capacitance through an external circuit.

Incidentally, variations in capacitance due to variations in clearance between the weight 301a and the Y-axis angular velocity electrodes 314a, 314b are the substantially same in effect as those in the X-axis angular velocity electrodes 313a, 313b. Consequently, it is possible to determine the linear acceleration by detecting variation in capacitance between the weight 301a and the Y-axis angular velocity electrodes 314a, 314b.

When the linear acceleration is applied to the acceleration sensor in a direction perpendicular to the paper in FIG. 36 downward, the weight 301a is displace upward to decrease in capacitance relative to the capacitance in its neutral position.

When the linear acceleration is applied to the acceleration sensor in a direction perpendicular to the paper upward, the weight 301 is displaced downward to increase in capacitance relative to the capacitance in its neutral position.

Consequently, it is possible to determine the linear acceleration in direction by detecting variations in capacitance of the acceleration sensor.

When the linear acceleration is applied in a direction parallel to the X axis (i.e., in a horizontal direction in FIG. 36), the first axle portion 305 of the supporting beam 304a is substantially free from any deformation since the linear acceleration is applied in a direction parallel to a longitudinal axis of the first axle portion 305. In contrast with this, the second axle portion 306 of the supporting beam 304a is resiliently as a whole so that the amount of displacement of the weight 301a is dependent on the amount of the linear acceleration thus applied.

Due to the displacement of the weight 301a in a direction parallel to the X axis, the capacitance between the electrode segments 309 of the weight 301*a* and the first to the sixth electrodes 310*a* to 310*f* varies, which makes it possible to identify the linear acceleration as that applied in a direction parallel to the X axis.

For example, the linear acceleration is applied in a horizontal direction rightward in FIG. 36, the weight 301*a* is displaced leftward due to its inertia force, which increases an effective facing area size between the electrode segments 309 and the first to the third X-axis electrodes 310*a* to 310*c* so as to increase the capacitance of the acceleration sensor.

On the other hand, an effective facing area size between the electrode segments 309 of the weight 301*a* and the fourth to the sixth X-axis electrodes 310*d* to 310*f* decreases so that the capacitance decreases. Consequently, it is possible to determine the linear acceleration in direction and in amount based on the variations in capacitance and the amount thereof.

Further, when the acceleration sensor is subjected to the linear acceleration applied leftward in FIG. 36, the weight 301*a* is displaced rightward in FIG. 36 due to its inertia force. As a result, an effective facing area size between the weight 301*a* and the first to the third X-axis electrodes 310*a* to 310*c* decreases to decrease the capacitance. In contrast with this, an effective facing area size between the weight 301*a* and the fourth to the sixth X-axis electrodes 310*d* to 310*f* increases to increase the capacitance.

This makes it possible to identify the thus applied linear acceleration as one having a direction opposite to that of the former case and to determine the amount of the linear acceleration.

When the linear acceleration is applied to the acceleration sensor in a direction parallel to the Y axis, the substantially same action as that in the above case, in which the linear acceleration is applied in a direction parallel to the X axis, occurs.

More specifically, when the linear acceleration is applied upward as viewed in FIG. 36, the capacitance between the first to the third Y-axis electrodes 311*a* to 311*c* and the electrode segments 309 of the weight 301*a* increases, while the capacitance between the fourth to the sixth Y-axis electrodes 311*d* to 311*f* and the electrode segments 309 of the weight 301*a* decreases.

On the other hand, when the linear acceleration is applied downward as viewed in FIG. 36, the capacitance between the first to the third Y-axis electrodes 311*a* to 311*c* and the electrode segments 309 of the weight 301*a* decreases, while the capacitance between the fourth to the sixth Y-axis electrodes 311*d* to 311*f* and the electrode segments 309 of the weight 301*a* increases, which makes it possible to determine the thus applied linear acceleration in direction and in amount.

Now, detection of the angular acceleration will be described.

Figure 38:
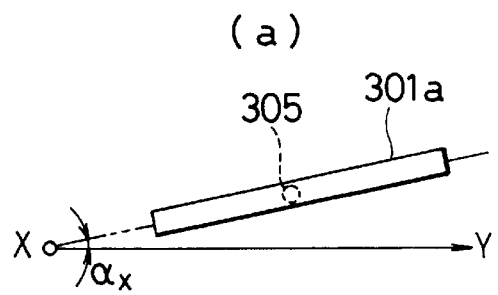
FIG. 38(a) is a schematic diagram illustrating the displacement of the weight of the acceleration sensor of the present invention shown in FIG. 36 when the weight is subjected to an angular acceleration about the X axis.
FIG. 38(b) is a schematic diagram illustrating the displacement of the weight of the acceleration sensor of the present invention shown in FIG. 36 when the weight is subjected to an angular acceleration about the Y axis.
Figure 38:
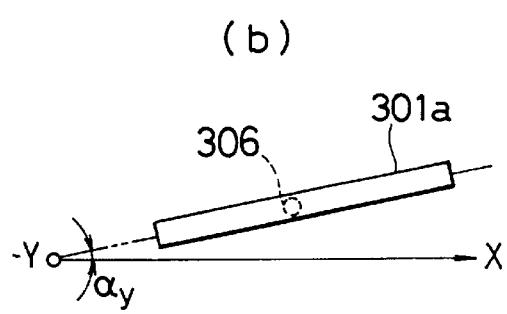

When an angular velocity $\omega_x$ about the X axis is applied to the acceleration sensor, the weight 301*a* rotates on a longitudinal axis of the first axle portion 305 of the supporting beam 304*a* in a direction opposite to that of the angular velocity so that a tilt angle $\alpha_x$ is defined between the Y axis and a plane of the weight 301*a*, as shown in FIG. 38(*a*). Incidentally, in FIG. 38(*a*), the X axis is perpendicular to the paper.

Consequently, when the clearances between: the electrode segments 309 of the weight 301*a*; and, the X-axis angular velocity electrodes 313*a*, 313*b* or the Y-axis angular velocity electrodes 314*a*, 314*b* vary, the capacitance thereof also varies.

For example, as shown in FIG. 36, When the angular velocity $\omega_x$ is applied in the direction of the arrow shown in solid lines, one of opposite side surfaces of the weight 301*a* facing the X-axis angular velocity electrode 313*a* is displaced to near the X-axis angular velocity electrode 313*a*, while the other of the opposite side surfaces of the weight 301*a* facing the X-axis angular velocity electrode 313*b* is displaced to separate from the X-axis angular velocity electrode 313*b*.

Consequently, the capacitance between the X-axis angular velocity electrode 313*a* and the weight 301*a* increases, while the capacitance between the X-axis angular velocity electrode 313*b* and the weight 301*a* decreases, which makes it possible to determine the angular velocity $\omega_x$ in direction and in amount.

When the angular velocity $\omega_x$ is applied in a direction opposite to the direction of the arrow shown in solid lines in FIG. 36, in contrast with the above, the capacitance between the X-axis angular velocity electrode 313*a* and the weight 301*a* decreases, while the capacitance between the X-axis angular velocity electrode 313*b* and the weight 301*a* increases, which makes it possible to determine the angular velocity $\omega_x$ in direction and in amount.

When the angular velocity $\omega_y$ about the Y axis is applied to the acceleration sensor, as schematically illustrated in FIG. 38(*b*), the weight 301*a* rotates on a longitudinal axis of the second axle portion 306 of the supporting beam 394*a* to that a tilt angle $\alpha_y$ is defined between the X axis and a plane of the weight 301*a*. Such displacement mechanism of the weight 301*a* about the Y axis is the substantially same as that of the weight 301*a* about the X axis in the above case, and, therefore will not be described again. Only variations in capacitance will be described hereinbelow.

Incidentally, in FIG. 38(*b*), the Y axis is perpendicular to the paper.

When the angular velocity $\omega_y$ about the Y axis is applied to the acceleration sensor in the direction of the arrow shown in solid lines in FIG. 36, the capacitance between the Y-axis angular velocity electrode 314*a* and the weight 301*a* increases, while the capacitance between the Y-axis angular velocity electrode 314*b* and the weight 301*a* decreases.

When the angular velocity $\omega_y$ is applied in a direction opposite to the direction of the arrow shown in solid lines in FIG. 36, in contrast with the above case, the capacitance between the Y-axis angular velocity electrode 314*a* and the weight 301*a* decreases, while the capacitance between the Y-axis angular velocity electrode 314*b* and the weight 301*a* increases.

Consequently, such variations in capacitance and the amount thereof make it possible to determine the angular velocity $\omega_y$ in direction and in amount.

Although detection of the liner acceleration and the angular velocity described above is of a single linear acceleration or a single angular velocity, it is also possible to a plurality of linear accelerations and a plurality of angular velocities simultaneously by detecting variations in capacitance as to every axis and direction. For example, by previously analyzing variations in capacitance when a compound linear acceleration (which is composed of a plurality of unit liner accelerations in every direction) is applied to the acceleration sensor, it is possible to identify a single linear acceleration in each of directions even when a plurality of linear accelerations are applied simultaneously. This is true as to a plurality of angular velocities applied to the acceleration sensor simultaneously.

In the first embodiment described above, a so-called passive sensing technique is used to directly detect the variation in capacitance between the weight 301*a* and the individual electrodes by means of outside circuits. It is also possible to replace this technique with a so-called servo-detection technique.

Namely, a feedback circuit (i.e., servo circuit) is constructed so that: by using the second and the forth X-axis electrodes 310b, 310e and the second and the forth Y-axis electrodes 311b, 311e as driving electrodes, and, according to the variations in capacitance detected by the other X-axis (or Y-axis) electrodes depending on displacement of the weight 301a as described above, a so-called servo voltage is applied to the second and the fourth X-axis electrodes 310b, 310e or the second and the fourth Y-axis electrodes 311b, 311e, whereby the weight 301a is kept in its neutral position. In this case, the linear acceleration and the angular velocity are determined based on the amount of the servo voltage.

Now, the second embodiment of the acceleration sensor according to the third aspect of the present invention will be described with reference to FIGS. 39 to 42(b). Incidentally, for convenience of description, as viewed in FIG. 39: a horizontal line is parallel to the X axis; a vertical line is parallel to the Y axis; and, the Z axis is perpendicular to the paper.

In the first embodiment of the acceleration sensor according to the third aspect of the present invention shown in FIG. 36, the weight 301a is so disposed as to surround the supporting beam 304a in construction. In contrast with this, in the second embodiment of the acceleration sensor shown in FIG. 39: the weight 301b is disposed in a central portion of the acceleration sensor; and, the supporting beams are disposed outside the weight 301b to keep a clearance between the the weight 301b and the silicon substrate 303b at a predetermined value.

Hereinbelow, a concrete construction of the second embodiment of the acceleration sensor shown in FIG. 39 will be described in detail.

Figure 39:
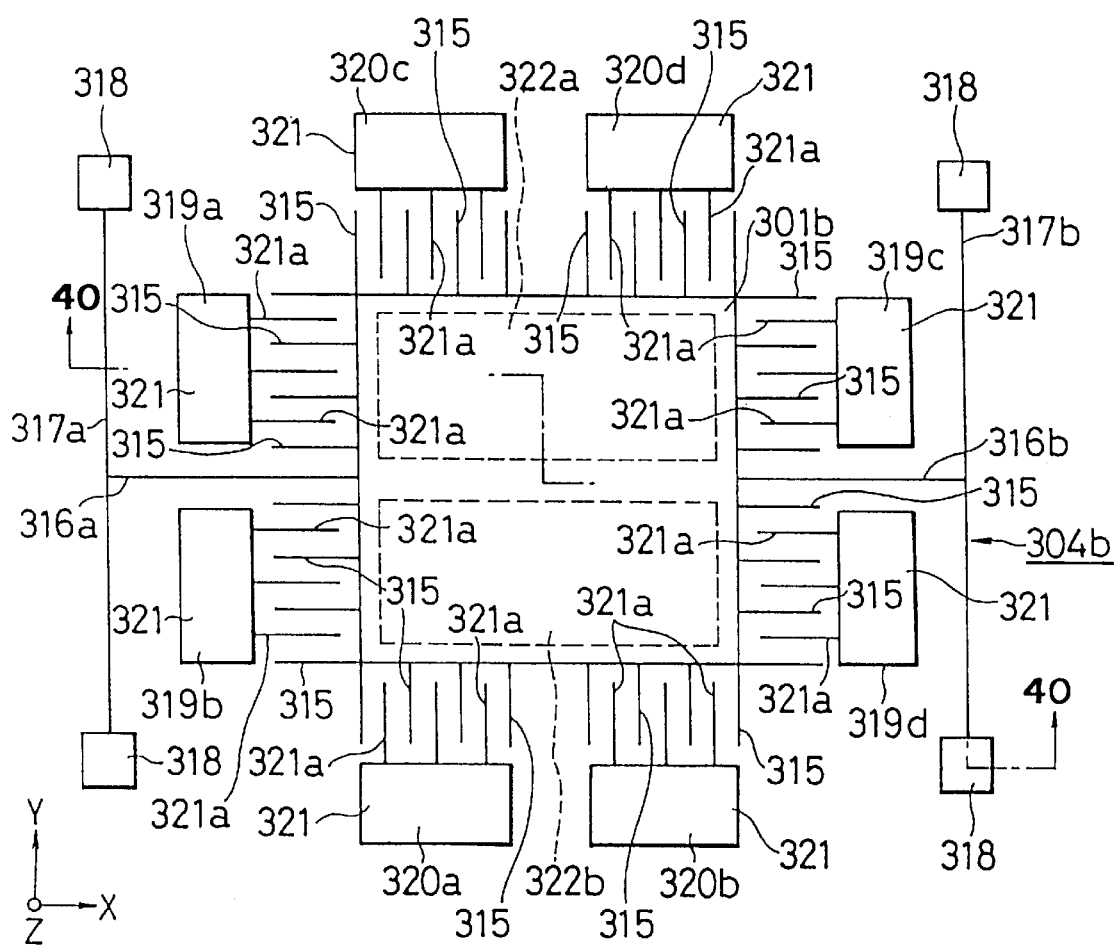
FIG. 39 is a plan view of a second embodiment of the multi-axis acceleration sensor according to the third aspect of the present invention.
Figure 40:
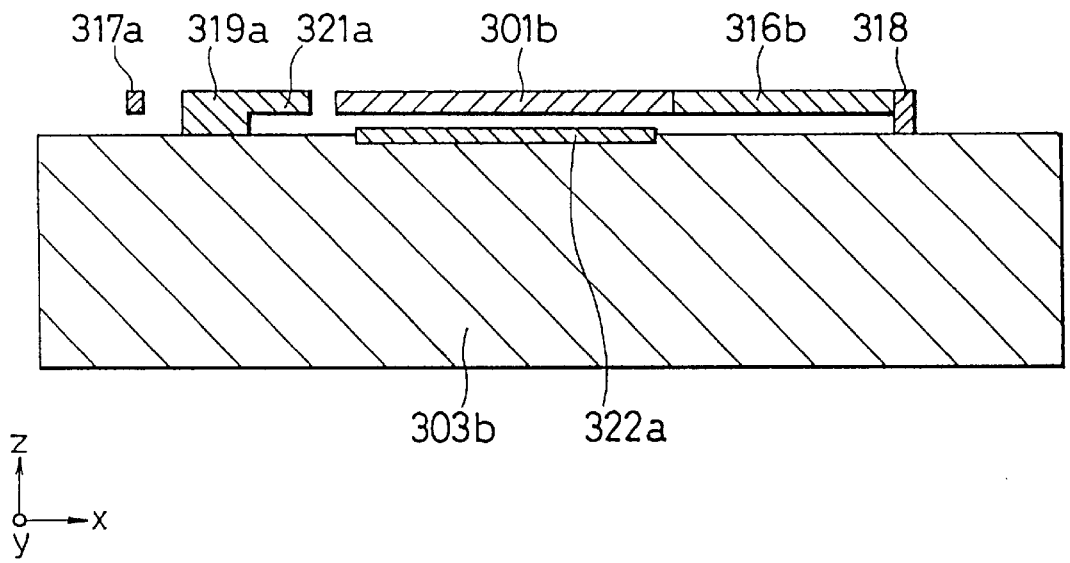
FIG. 40 is a cross-sectional view of the multi-axis acceleration sensor, taken along the line B—B of FIG. 39.

The weight 301b is made of polycrystalline silicon, assumes a substantially flat square shape parallel to the XY plane, and is provided with a plurality of electrode segments 315 in each of its four outer peripheral side surfaces, in each of which side surfaces the electrode segments 315 are spaced apart from each other at predetermined equal intervals to project outward from the side surface, as shown in FIGS. 39 and 40.

Each of the electrode segments 315 assumes a rectangular shape in cross-section taken along the XZ or the YZ plane, assumes a thin shape in the XY plane, and is essentially equal in shape to the electrode segment 309 used in the first embodiment shown in FIGS. 36 and 37.

Bonded to a substantially central portion of each of opposite Y-axis sides of the weight 301b is an outer end of each of the first axle portions 316a, 316b of the supporting beam 304b which has the weight 301b spaced parallelly apart from the silicon substrate 303b by a predetermined distance.

Namely, the supporting beam 304b is constructed of the first axle portions 316a, 316b and the second axle portions 317a, 317b. Both the first axle portions 316a, 316b are parallel to the X axis. The first axle portions 316a, 316b have inner end portions thereof bonded to the substantially central portions of opposite Y-axis side surfaces of the weight 301b, and the other, i.e., outer end portions thereof bonded to the substantially central portions of the second axle portions 317a, 317b. The Y-axis side surfaces are parallel to the Y axis.

On the other hand, the second axle portions 317a, 317b have their opposite end portions bonded to a plurality of post-like supporting projections 318. These projections 318 are fixedly mounted on an upper surface of the silicon substrate 303b, as shown in FIGS. 39 and 40, to have the first and the second axle portions 316a, 316b and 317a, 317b spaced apart from the upper surface of the silicon substrate 303b, as shown in FIG. 40.

This enables the weight 301b to move in a direction parallel to each of the X, Y and Z axes and/or rotate about the X axis, which facilitates detection of the linear acceleration in a direction parallel to each of the above axes and also facilitates detection of the angular velocity about the X axis. Incidentally, by controlling both the first and the second axle portions 316a, 316b and 317a, 317b in length, width and thickness, it is possible to control the amount of displacement of the weight 301b, which makes it possible to control the acceleration sensor in sensitivity.

The first to the fourth X-axis electrodes 319a to 319d and the first to the fourth Y-axis electrodes 320a to 320d are so arranged as to surround the weight 301b of polycrystalline silicon on the silicon substrate 303b in the substantially same manner as that in the first embodiment of the acceleration sensor shown in FIGS. 36 to 37.

Namely, each of the first to the fourth X-axis electrodes 319a to 319d and the first to the fourth Y-axis electrodes 320a to 320d is provided with the rectangular-parallelepiped base portion 321 which has one of its opposite long sides provided with three pieces of the electrode segments 321a. In construction, these electrode segments 321a are spaced apart from each other at predetermined equal intervals and project outward from such long side of the base portion 321, as shown in FIG. 39. Incidentally, each of the electrode segments 321a has the substantially same shape as that of the electrode segments 315 used in the weight 301b, as shown in FIG. 39.

As is clear from FIGS. 39 and 40, each of three electrode segments 321a used in each of the X-axis electrodes 319a to 319d and the Y-axis electrodes 320a to 320d is parallelly interposed between adjacent ones of the electrode segments 315 (which project outward from the outer peripheral side surfaces of the weight 301b), and disposed at a suitable level over the silicon substrate 303b.

Further, in each of of the first to the fourth X-axis electrodes 319a to 319d and the first to the fourth Y-axis electrodes 320a to 320d, the electrode segments 321a are fixedly mounted on the silicon substrate 303b so as to have their front ends spaced apart from the outer peripheral surface of the weight 301b, as shown in FIGS. 39 and 40.

Consequently, a capacitance appears between: each of the first to the fourth X-axis electrodes 319a to 319d and the first to the fourth Y-axis electrodes 320a to 320d; and, the electrode segments 315 of the weight 301b.

Further, the X-axis angular velocity electrodes 322a, 322b, both of which are made of polycrystalline silicon, are fixedly mounted on the upper surface of the silicon substrate 303b so as to face the flat portions of the weight 301b in a condition in which these electrodes 322a, 322b are spaced apart from each other by a suitable distance in a direction parallel to the Y axis, whereby a capacitance appears between the weight 301b and each of the X-axis angular velocity electrodes 322a, 322b.

Now, the method of producing the multi-axis acceleration sensor of the present invention having the above construction will be described with reference to FIGS. 41(a) to 42(b).

This multi-axis acceleration sensor is produced by using a so-called micro-machining technique which is carried out as follows.

Figure 41A:
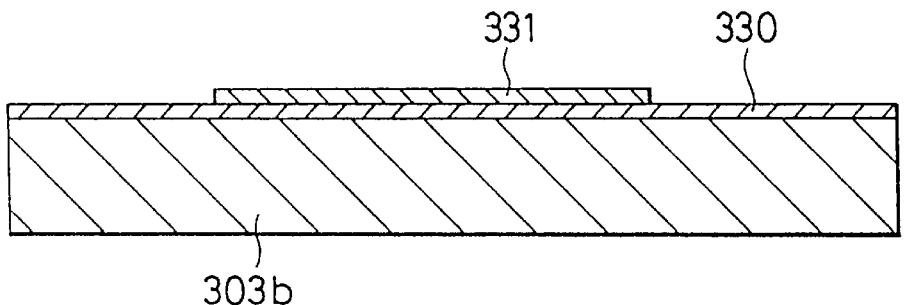
FIGS. 41(a) and 41(b) are schematic diagrams illustrating the manufacturing process of the multi-axis acceleration sensor of the present invention shown in FIG. 39.

First of all, a first nitride layer 330 (silicon nitride) serving as a surface protective layer is formed on the silicon substrate 303b. Then, as shown in FIG. 41(a), a first polycrystalline silicon layer 331 is deposited on the first protective layer 330 over a predetermined area. The first polycrystalline silicon layer 331 is finally formed into the X-axis angular velocity electrodes 322a, 322b.

Figure 41B:
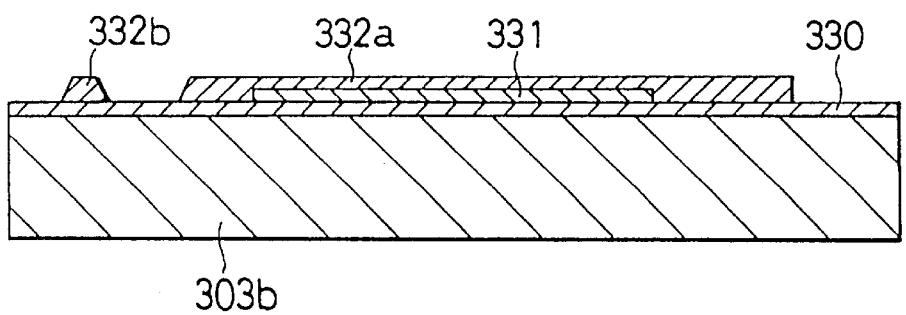

After that, as shown in FIG. 41(b), another protective layer 332a is formed so as to entirely cover the first polycrystalline silicon layer 331, and a similar protective layer 332b is formed in an area between the supporting beam 304b (which is formed later) and the silicon substrate 303b.

Figure 42A:
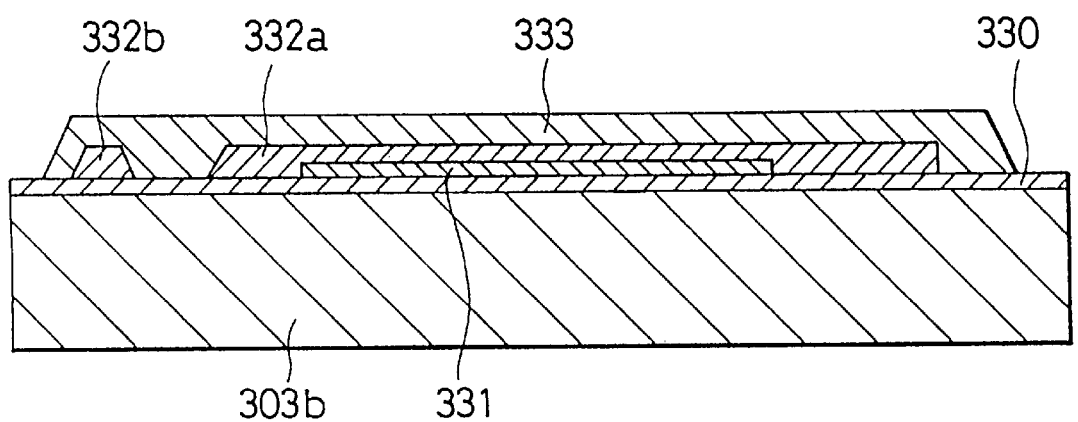
FIGS. 42(a) and 42(b) are schematic diagrams illustrating the manufacturing process of the multi-axis acceleration sensor of the present invention shown in FIG. 39.
Figure 42B:
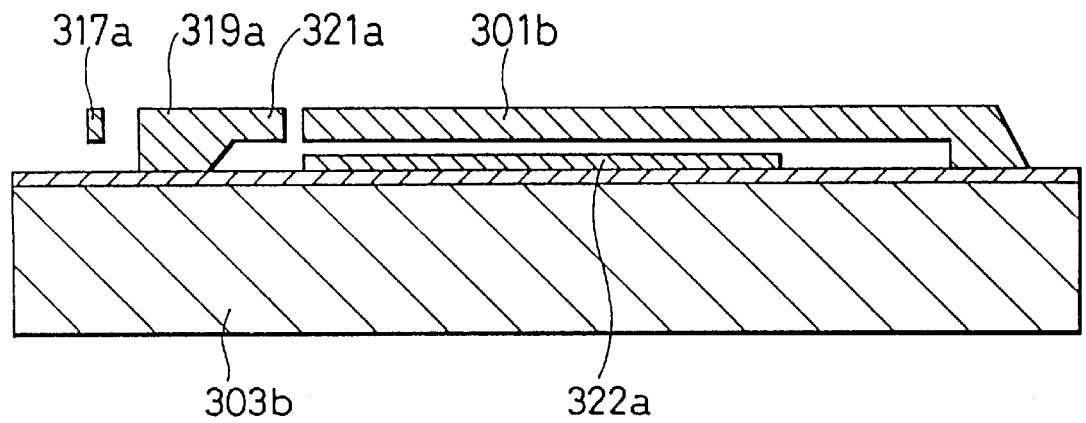

Then, as shown in FIG. 42(a), a second polycrystalline silicon layer 333 is deposited on all these layers 330, 332a, 332b so as to entirely cover them. This second polycrystalline silicon layer 333 is finally formed into the weight 301b, X-axis electrodes 319a to 319d, Y-axis electrodes 320a to 320d and like components of the acceleration sensor.

Thereafter, the second polycrystalline silicon layer 333 is subjected to the anisotropic etching process so that portions corresponding to the weight 301b, X-axis electrodes 319a to 319d, Y-axis electrodes 320a to 320d and like components are formed. At this time, parts of the protective layers 332a, 332b are removed so that the method of producing the acceleration sensor is completed.

Incidentally, although the method of producing the multi-axis acceleration sensor of the first embodiment shown in FIGS. 36 and 37 is not described in the above, the method is the substantially same in production steps as that of the method shown in FIGS. 40 to 42(b).

In operation, when the linear acceleration is applied to the acceleration sensor in a direction parallel to the Z axis (i.e., in a direction perpendicular to the paper in FIG. 39), the weight 301b is displaced in a direction opposite to the direction of the linear acceleration thus applied.

For example, when the weight 301b is displaced upward in a direction perpendicular to the paper in FIG. 39, a clearance between the weight 301b and each of the X-axis angular velocity electrodes 322a, 322b increases so that the capacitance therebetween decreases. On the other hand, when the weight 301b is displaced downward in a direction perpendicular to the paper in FIG. 39, a clearance between the weight 301b and each of the X-axis angular velocity electrodes 322a, 322b decreases so that the capacitance therebetween increases.

Consequently, it is possible to determine the thus applied linear acceleration in amount and in direction by detecting the variations in capacitance with the use of outside circuits.

When the linear acceleration is applied to the acceleration sensor in a direction parallel to the X axis, the second axle portions 317a, 317b of the supporting beam 304b is resiliently bent in a direction opposite to the direction of the thus applied linear acceleration, so that the weight 301b is also displaced in a direction opposite to the direction of the thus applied linear acceleration.

For example, when the weight 301b is displaced rightward as viewed in FIG. 39, the capacitance between the weight 301b and each of the first and the second X-axis electrodes 319a, 319b decreases. On the other hand, the capacitance between the weight 301b and each of the third and the fourth X-axis electrodes 319c, 319d increases.

When the weight 301b is displaced leftward as viewed in FIG. 39, the capacitance between the weight 301b and each of the first and the second X-axis electrodes 319a, 319b increases. On the other hand, the capacitance between the weight 301b and each of the third and the fourth X-axis electrodes 319c, 319d decreases.

Consequently, it is possible to determine the thus applied linear acceleration in amount and in direction.

When the linear acceleration is applied to the acceleration sensor in a direction parallel to the Y axis, the first axle portions 316a, 316b of the supporting beam 304b are resiliently twisted in a direction opposite to the direction of the liner acceleration. At this time, the weight 301b is also displaced in a direction opposite to the direction of the liner acceleration.

For example, when the weight 301b is displaced upward as viewed in FIG. 39, the capacitance between the weight 301b and each of the first and the second Y-axis electrodes 320a, 320b decreases. On the other hand, the capacitance between the weight 301b and each of the third and the fourth Y-axis electrodes 320c, 320d increases.

When the weight 301b is displaced downward as viewed in FIG. 39, the capacitance between the weight 301b and each of the first and the second Y-axis electrodes 320a, 320b increases. On the other hand, the capacitance between the weight 301b and each of the third and the fourth Y-axis electrodes 320c, 320d decreases.

Consequently, it is possible to determine the thus applied linear acceleration in amount and in direction.

When an angular acceleration about the X axis is applied to the acceleration sensor, the weight 301b rotates on the longitudinal axis of the first axle portions 316a, 316b in a direction opposite to the direction of the thus applied angular acceleration.

For example, when the angular acceleration about the X axis is applied to the acceleration sensor to cause the weight 301b to rotate on the longitudinal axis of the first axle portions 316a, 316b so that a first portion of the weight 301b facing the X-axis angular acceleration electrode 322a is displaced upward in a direction perpendicular to the paper in FIG. 39 (i.e., a second portion of the weight 301 oppositely disposed from the above first portion is displaced downward in a direction perpendicular to the paper in FIG. 39), the capacitance between the weight 301b and the X-axis angular velocity electrode 322a decreases. At the same time, the capacitance between the weight 301b and the X-axis angular acceleration electrode 322b increases.

When the angular acceleration about the X axis is applied to the acceleration sensor in the opposite direction to cause the weight 301b to rotate on the longitudinal axis of the first axle portions 316a, 316b so that a first portion of the weight 301b facing the X-axis angular acceleration electrode 322a is displaced downward in a direction perpendicular to the paper in FIG. 39 (i.e., a second portion of the weight 301 oppositely disposed from the above first portion is displaced upward in a direction perpendicular to the paper in FIG. 39), the capacitance between the weight 301b and the X-axis angular velocity electrode 322a increases. At the same time, the capacitance between the weight 301b and the X-axis angular acceleration electrode 322b decreases.

Consequently, it is possible to determine the thus applied angular acceleration in amount and in direction.

Although detection of the liner acceleration and the angular velocity described above is of a single linear acceleration or a single angular velocity, it is also possible to a plurality of linear accelerations and a plurality of angular velocities simultaneously by detecting variations in capacitance as to every axis and direction. For example, by previously analyzing variations in capacitance when a compound linear acceleration (which is composed of a plurality of unit liner accelerations in every direction) is applied to the acceleration sensor, it is possible to identify a single linear acceleration in each of directions even when a plurality of linear accelerations are applied simultaneously. This is true as to a plurality of angular velocities applied to the acceleration sensor simultaneously.

As for detection of the variations in capacitance, it is also possible to use the servo-detection technique in addition to the passive sensing technique as is in the first embodiment of the acceleration sensor described above. Incidentally, in case of the servo-detection technique, for example, the second and the fourth X-axis electrodes 319a, 319b and the second and the fourth Y-axis electrodes 320a, 320b are used as driving power supplies for supplying a servo voltage used in keeping the weight 301b in a neutral position thereof.

As described above, it is possible for the present invention to detect a plurality of linear and angular accelerations simultaneously, which accelerations are applied in and about a plurality of directions and axes. Consequently, in case that information as to the linear and the angular accelerations in and about a plurality of directions and axes is required, it is possible to use a single piece of acceleration sensor of the present invention in place of a plurality of conventional acceleration sensors, which enables the user to save the cost of the sensors.

Further, since the acceleration sensor of the present invention is produced by using semiconductors on the silicon substrate, it is possible to produce the acceleration sensor of the present invention by using the micro-machining techniques, which facilitates downsizing of the acceleration sensor of the present invention.

What is claimed is:

1. A multi-axis acceleration sensor comprising:

a base plate;

two supporting posts extending vertically from an upper surface of said base plate;

a supporting beam comprising a first axle portion and a second axle portion which intersects said first axle portion at right angles, wherein said second axle portion has opposite ends which are connected to said supporting posts, respectively;

a weight supported by said supporting beam such that a clearance is provided between said second axle portion and said base plate to allow movement of said weight relative to said base plate, said weight being formed in the shape of a frame defining an opening, wherein said first and second axle portions are disposed within the opening, and opposite ends of the first axle portion are connected to inner peripheral side surfaces of the frame at central portions thereof;

a plurality of electrode segments fixedly mounted on an outer peripheral surface of said weight so as to extend outwardly therefrom;

a first electrode provided with a plurality of electrode segments which are parallel to said electrode segments extending from said weight, said first electrode being fixedly mounted on said base plate in the vicinity of said weight; and a second electrode fixedly mounted on said base plate and facing a flat surface of said weight, wherein displacement of said weight is determined by using a variation in capacitance between said electrode segments of said weight and said first and second electrodes.

2. A multi-axis acceleration sensor as claimed in claim 1, wherein:

said first and second axle portions of said supporting beam are integrally formed with each other so as to intersect at a right angle to each other at their centers.

3. A multi-axis acceleration sensor as claimed in claim 1, wherein said first axle portion of said supporting beam is aligned with a center line of said weight.

4. A multi-axis acceleration sensor as claimed in claim 1, wherein said posts are disposed within the perimeter of the opening portion of said weight.

5. A multi-axis acceleration sensor comprising:

a base plate;

two supporting posts extending vertically from an upper surface of said base plate;

a first supporting beam comprising a first axle portion and a second axle portion arranged perpendicularly to said first axle portion, wherein a first end of said first axle portion is connected to a central portion of said second axle portion, a second end of said first axle portion is connected to an outer periphery of said second axle portion, and opposite ends of said second axle portion are connected to said supporting posts;

a weight supported by said first supporting beam such that a clearance is provided between said second axle portion and said base plate to allow movement of said weight above said base plate, a plurality of electrode segments fixedly mounted on an outer peripheral surface of said weight so as to extend outwardly therefrom;

a first electrode provided with a plurality of electrode segments which are parallel to said electrode segments extending from said weight, said first electrode being fixedly mounted on said base plate in the vicinity of said weight; and a second electrode fixedly mounted on said base plate and facing a flat surface of said weight, wherein displacement of said weight can be determined by using a variation in capacitance between said electrode segments of said weight and said first and second electrodes.

6. A multi-axis acceleration sensor as claimed in claim 5, further comprising a second support beam connected to an opposite side of said weight relative to said first support beam.

* * * * *

UNITED STATES PATENT AND TRADEMARK OFFICE
CERTIFICATE OF CORRECTION

PATENT NO. : 6,082,197
DATED : July 4, 2000
INVENTOR(S) : Jun Mizuno et al.

It is certified that error appears in the above-identified patent and that said Letters Patent is hereby corrected as shown below:

Claim 5, Column 48,
Lines 25-27, delete "a second end of said first axle portion is connected to an outer periphery of said second axle portion,".
Line 32, after "plate," insert --wherein a second end of said first axle portion is connected to an outer periphery of said weight;--.

Claim 6, Column 48,
Line 52, change "support" to --supporting--.
Line 53, change "support" to --supporting--.

Signed and Sealed this

Nineteenth Day of June, 2001

Attest:

NICHOLAS P. GODICI
*Attesting Officer*    *Acting Director of the United States Patent and Trademark Office*